United States Patent
Raviv et al.

(10) Patent No.: US 6,592,461 B1
(45) Date of Patent: Jul. 15, 2003

(54) MULTIFUNCTIONAL COMPUTER INTERACTIVE PLAY SYSTEM

(76) Inventors: Roni Raviv, 13 Simtat Dalia, Nes Ziona 74061 (IL); Omri Rothschild, 31 Barak Street, Zahala, Tel Aviv 69937 (IL)

( * ) Notice: Subject to any disclaimer, the term of this patent is extended or adjusted under 35 U.S.C. 154(b) by 0 days.

(21) Appl. No.: 09/499,328

(22) Filed: Feb. 4, 2000

(51) Int. Cl.[7] .......................... G06F 19/00; G09G 5/00
(52) U.S. Cl. ........................................ 463/37; 345/179
(58) Field of Search ............... 463/1–2, 5, 7, 463/30–34, 36–37, 43–44; 345/156, 157, 173, 179–184, 207; 434/22–23, 20, 337; 356/3.05, 3.07, 3.11, 3.16; 250/227.13; 235/472.03; 178/18.01; 358/478; 369/173

(56) References Cited

U.S. PATENT DOCUMENTS

| | | |
|---|---|---|
| 3,505,561 A | 4/1970 | Ward et al. ............... 315/18 |
| 3,506,875 A | 4/1970 | Watanabe et al. .......... 315/12 |
| 3,543,240 A | 11/1970 | Miller et al. ............. 340/172.5 |
| 3,551,896 A | 12/1970 | Baskin et al. ............ 340/172.5 |
| 3,576,574 A | 4/1971 | Baskin .................... 340/324 |
| 3,594,608 A | 7/1971 | Mutton .................... 315/24 |
| 3,651,509 A | 3/1972 | Ngo ....................... 340/324 R |
| 3,659,281 A | 4/1972 | Mori ...................... 340/324 A |
| 3,758,717 A | 9/1973 | Granzotti ................. 178/6.8 |
| 3,832,693 A | 8/1974 | Ishizaki et al. ........... 340/172.5 |
| 3,944,988 A | 3/1976 | Mayer ..................... 340/172.5 |
| 3,993,861 A | 11/1976 | Baer ...................... 178/5.6 |
| 3,997,891 A | 12/1976 | Iwamura et al. ........... 340/324 AD |
| 4,017,680 A | 4/1977 | Anderson et al. .......... 358/242 |
| 4,053,765 A | 10/1977 | Kuffer .................... 250/227 |
| 4,109,146 A | 8/1978 | Hillman ................... 250/227 |
| 4,126,851 A | 11/1978 | Okor ...................... 340/324 AD |
| 4,129,858 A | 12/1978 | Hara ...................... 340/324 AD |
| 4,146,880 A | 3/1979 | Arizabalaga .............. 340/707 |
| 4,185,825 A | 1/1980 | Bromley .................. 273/101.2 |
| 4,190,831 A | 2/1980 | Stahle et al. ............. 340/707 |
| 4,190,851 A | 2/1980 | Finnila et al. ............ 357/30 |
| 4,205,847 A | 6/1980 | Steiger et al. ............ 273/313 |
| 4,210,329 A | 7/1980 | Steiger et al. ............ 273/313 |
| 4,243,972 A | 1/1981 | Toussaint ................ 340/146.3 SY |
| 4,263,592 A | 4/1981 | Takahashi et al. ......... 340/707 |
| 4,277,783 A | 7/1981 | Sampieri et al. .......... 340/708 |
| 4,367,465 A | 1/1983 | Mati et al. ............... 340/707 |
| 4,377,810 A | 3/1983 | Wolff .................... 340/707 |
| 4,395,045 A | 7/1983 | Baer ..................... 273/312 |
| 4,454,417 A | 6/1984 | May ...................... 250/216 |
| 4,565,947 A | 1/1986 | Minn ..................... 313/467 |
| 4,591,841 A | 5/1986 | Gunderson et al. ........ 340/707 |
| 4,602,907 A | 7/1986 | Foster ................... 434/337 |
| 4,608,601 A | 8/1986 | Shreck et al. ............ 358/146 |
| 4,620,107 A | 10/1986 | Frame ................... 250/566 |
| 4,642,459 A | 2/1987 | Caswell et al. .......... 250/277 |
| 4,675,665 A | 6/1987 | Halliwell ................ 340/707 |
| 4,677,428 A | 6/1987 | Bartholow ............... 340/708 |
| 4,697,175 A | 9/1987 | Macdonald .............. 340/707 |
| 4,789,836 A | 12/1988 | May ..................... 328/117 |
| 4,802,722 A | 2/1989 | Persson ................. 350/96.1 |
| 4,812,828 A | 3/1989 | Nishi et al. ............. 340/706 |
| 4,813,682 A | 3/1989 | Okada ................... 273/312 |
| 4,815,733 A | 3/1989 | Yokoi ................... 273/1 E |
| 4,922,236 A | 5/1990 | Heady ................... 340/710 |
| 4,923,401 A | 5/1990 | Marshall et al. .......... 434/22 |
| 4,956,639 A | 9/1990 | Uemura et al. ........... 340/707 |
| 4,979,029 A | 12/1990 | Lemelson ............... 358/93 |
| 4,984,073 A | 1/1991 | Lemelson ............... 358/93 |
| 4,999,617 A | 3/1991 | Uemura et al. ........... 340/706 |
| 5,051,736 A | 9/1991 | Bennett et al. ........... 340/707 |

(List continued on next page.)

FOREIGN PATENT DOCUMENTS

WO    WO 99/59125    11/1999

*Primary Examiner*—Kim Nguyen
(74) *Attorney, Agent, or Firm*—Ladas & Parry

(57) ABSTRACT

This invention discloses an interactive play system including a computer including a display and operating play software, a multifunctional physical tool operative in conjunction with the computer and receiving at least an optical input from the display, the multifunctional physical tool being manipulable by a user to select different functions thereof.

60 Claims, 54 Drawing Sheets

U.S. PATENT DOCUMENTS

| | | | |
|---|---|---|---|
| 5,119,075 A | 6/1992 | Smith | 340/707 |
| 5,134,389 A | 7/1992 | Furuta et al. | 340/707 |
| 5,138,304 A | 8/1992 | Bronson | 340/707 |
| 5,151,688 A | 9/1992 | Tanaka et al. | 340/707 |
| 5,179,368 A | 1/1993 | Lippincott | 340/707 |
| 5,184,115 A | 2/1993 | Black et al. | 340/708 |
| 5,187,467 A | 2/1993 | Myers | 340/707 |
| 5,194,008 A | 3/1993 | Mohan et al. | 434/22 |
| 5,227,622 A | 7/1993 | Suzuki | 250/221 |
| 5,248,150 A | 9/1993 | Koma | 273/313 |
| 5,310,192 A | 5/1994 | Miyake | 273/310 |
| 5,572,251 A | 11/1996 | Ogawa | 348/207 |
| 5,600,348 A | 2/1997 | Bartholow et al. | 345/180 |
| 5,610,629 A | 3/1997 | Baur | 345/104 |
| 5,646,650 A | 7/1997 | Miller et al. | 345/179 |
| 5,652,412 A | 7/1997 | Lazzouni et al. | 178/18 |
| 5,691,749 A | 11/1997 | Sugiyama | 345/181 |
| 5,764,224 A * | 6/1998 | Lilja et al. | 345/179 |
| 5,831,601 A | 11/1998 | Vogeley et al. | 345/175 |
| 5,852,434 A | 12/1998 | Sekendur | 345/179 |
| 5,877,752 A | 3/1999 | Puthuff et al. | 345/180 |
| 5,881,366 A | 3/1999 | Bodenmann et al. | 455/66 |
| 5,929,444 A | 7/1999 | Leichner | 250/341.7 |
| 5,945,981 A | 8/1999 | Paull et al. | 345/180 |
| 6,133,906 A * | 10/2000 | Geaghan | 345/179 |

* cited by examiner

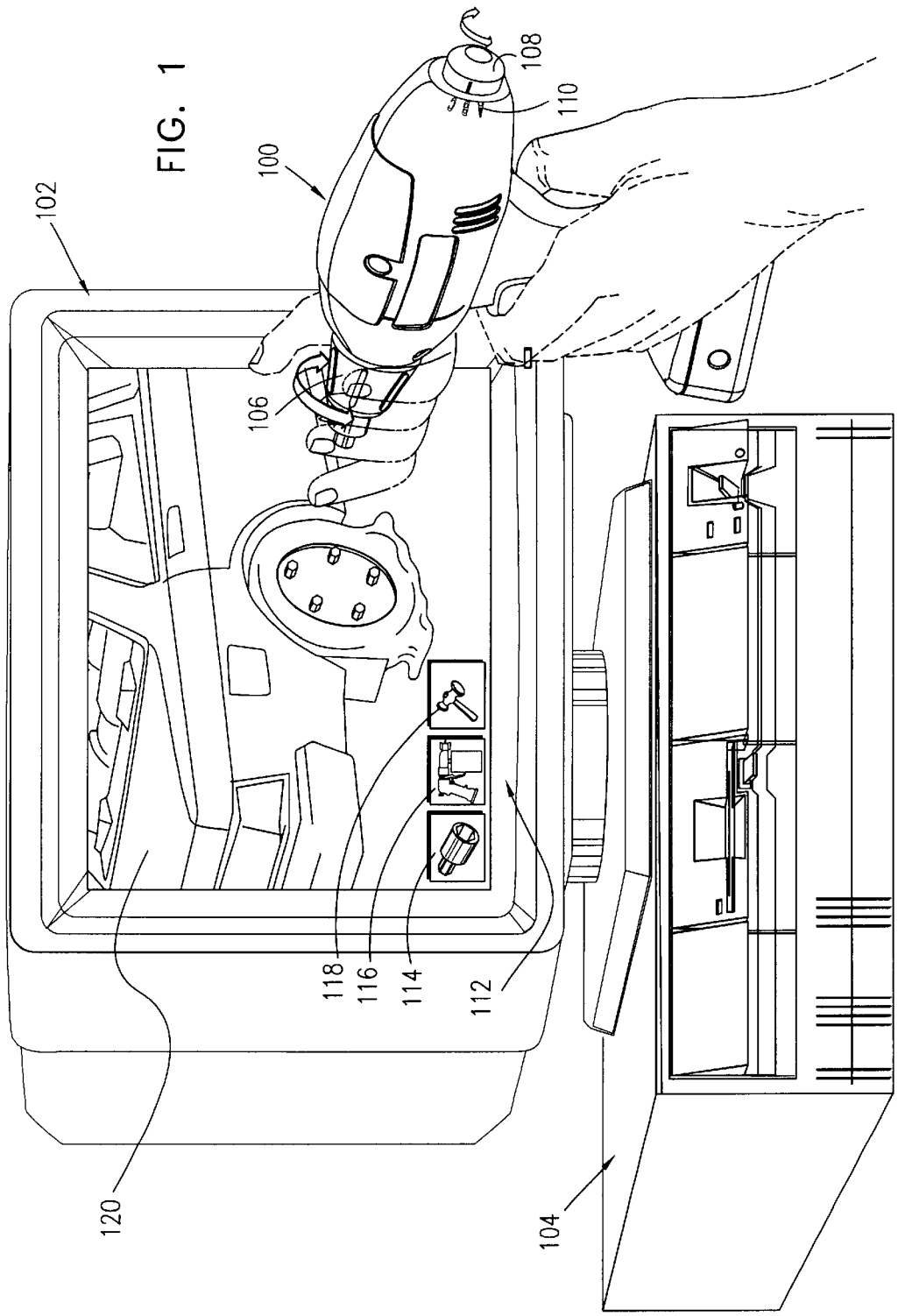

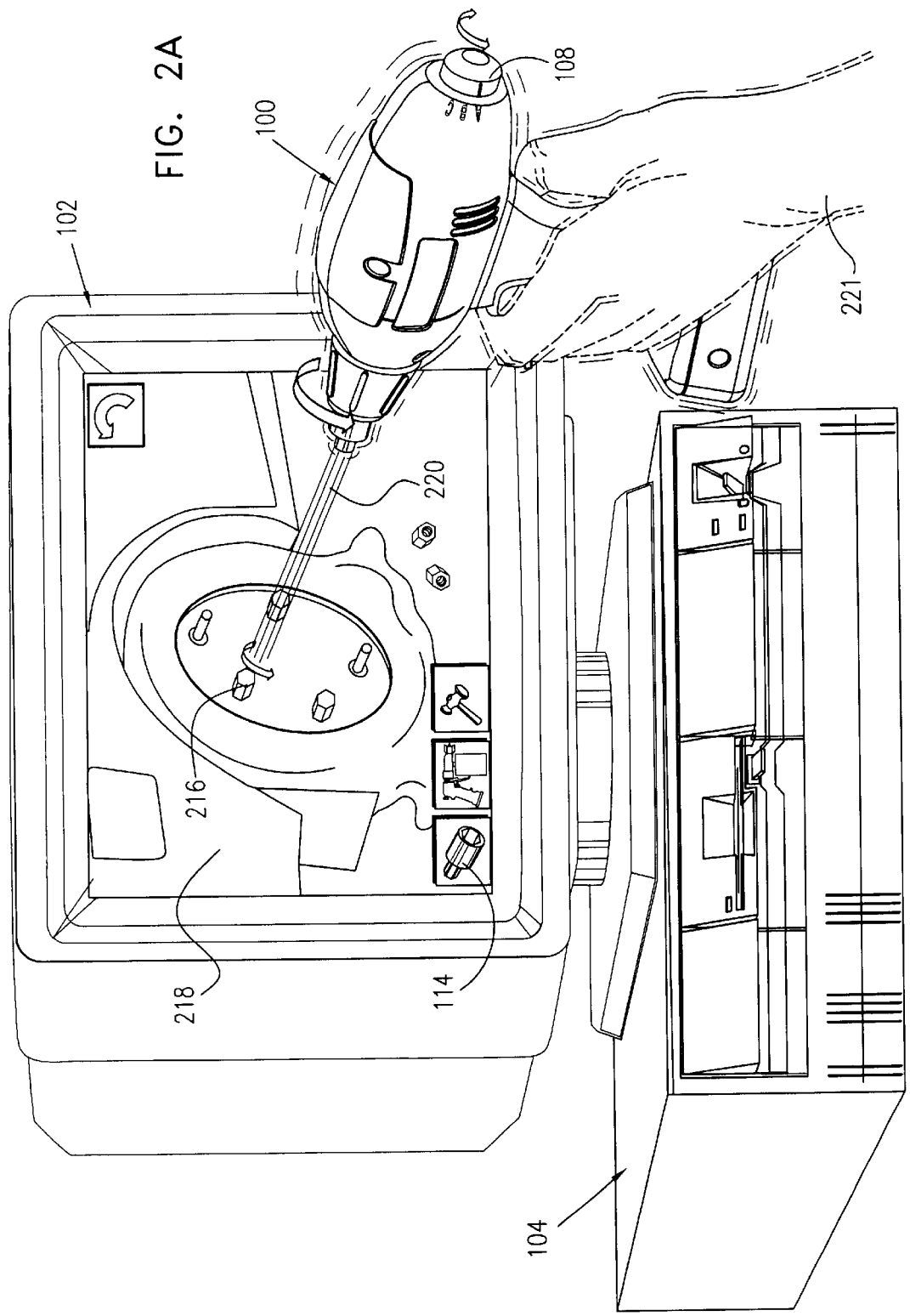

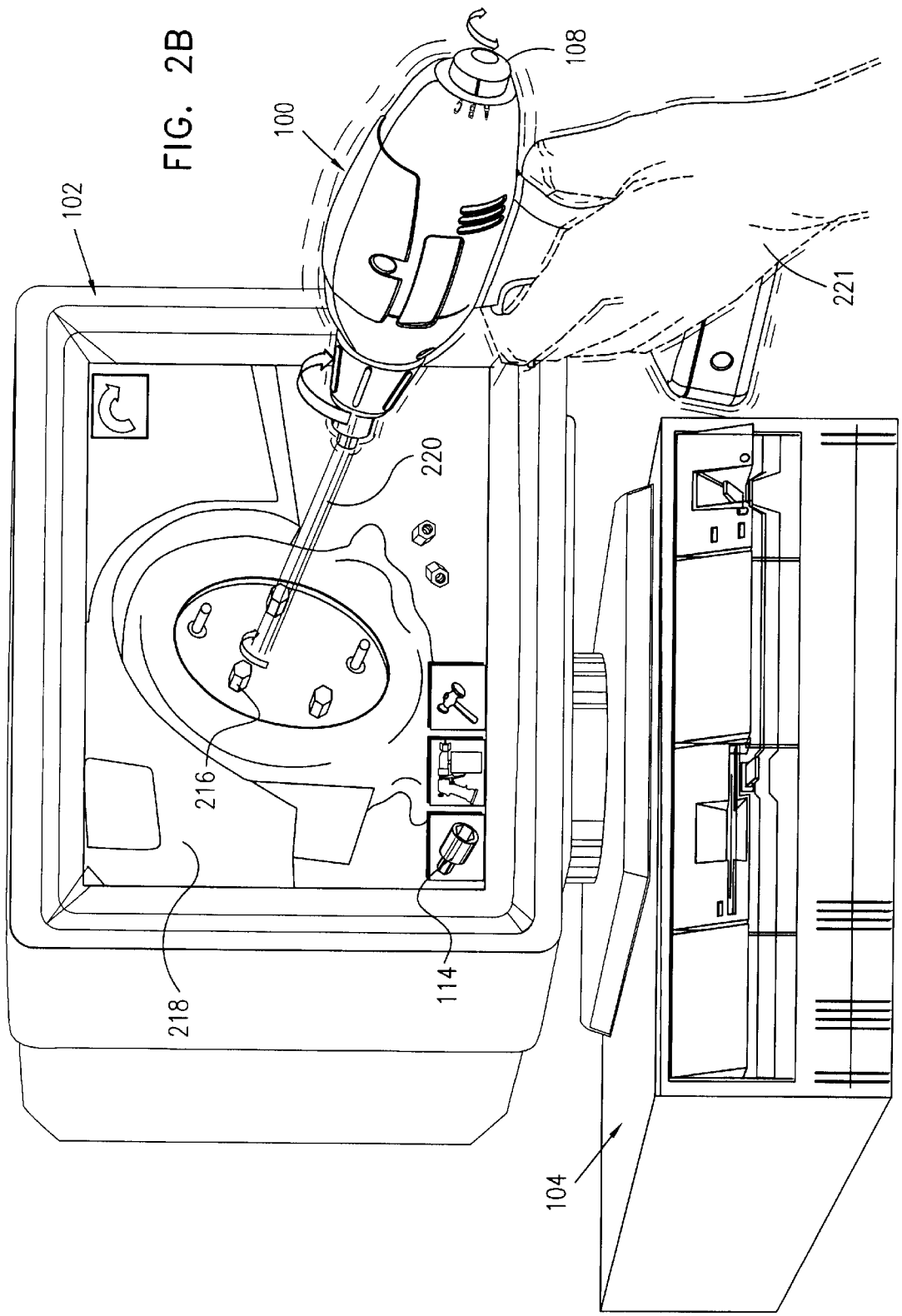

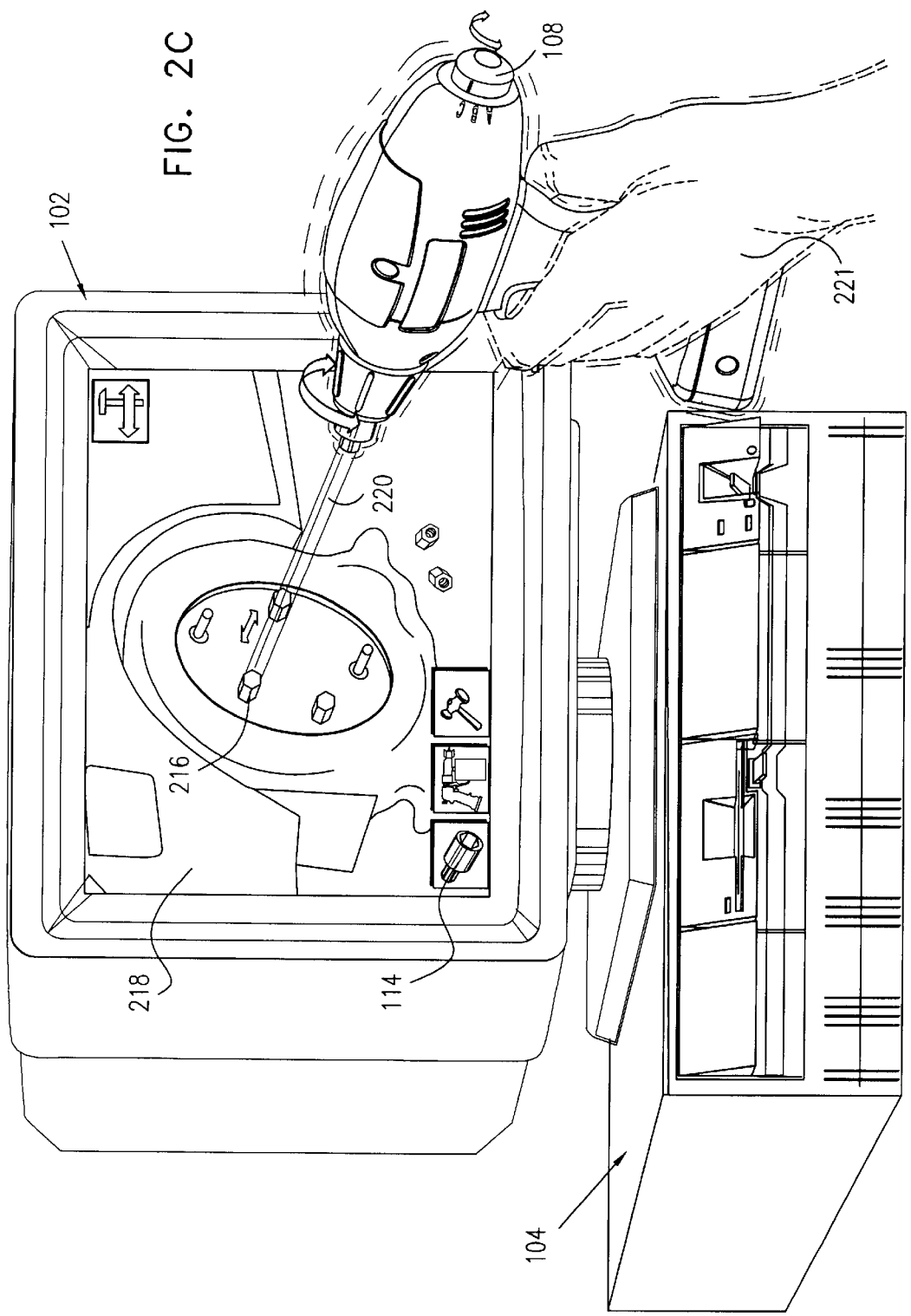

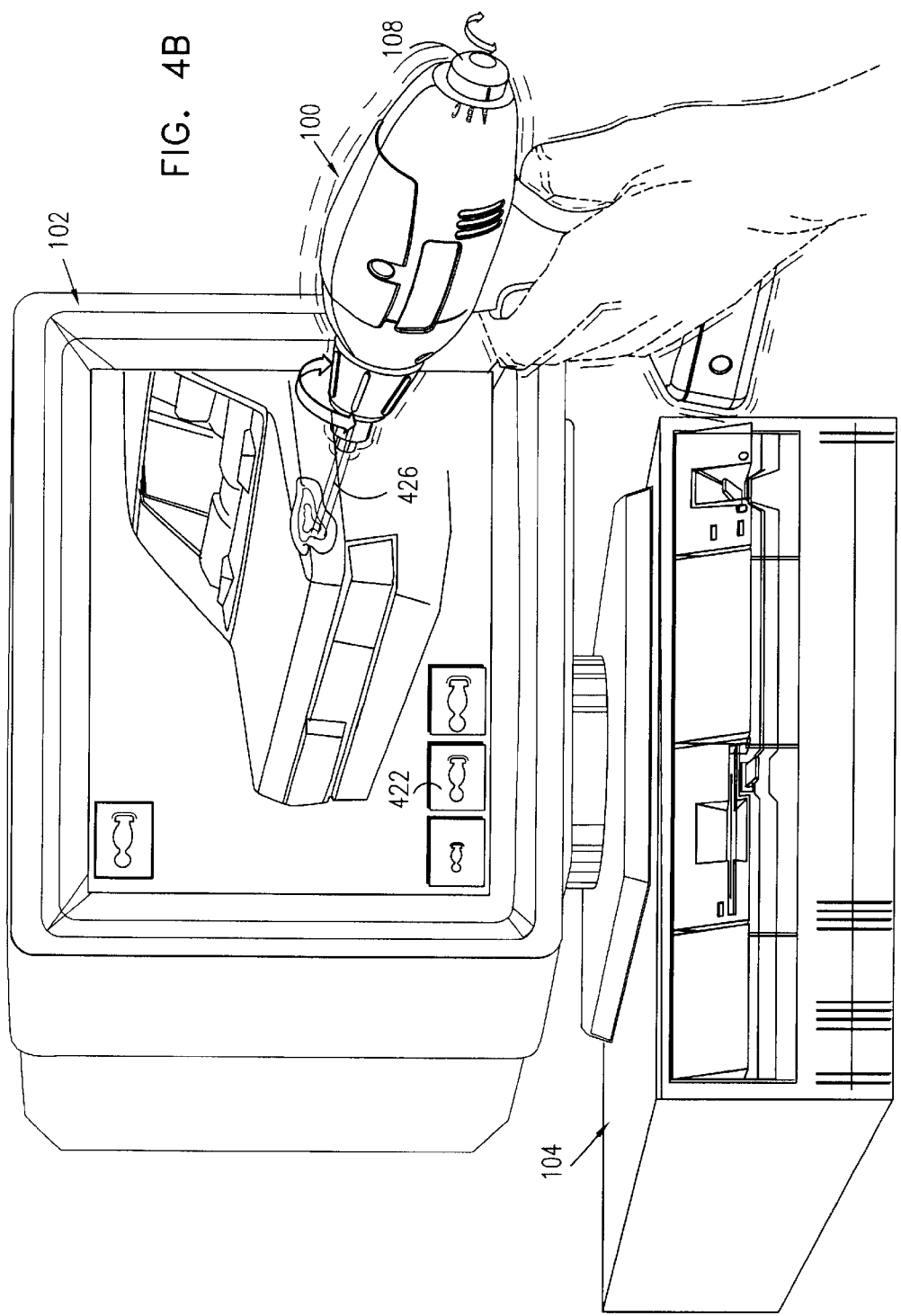

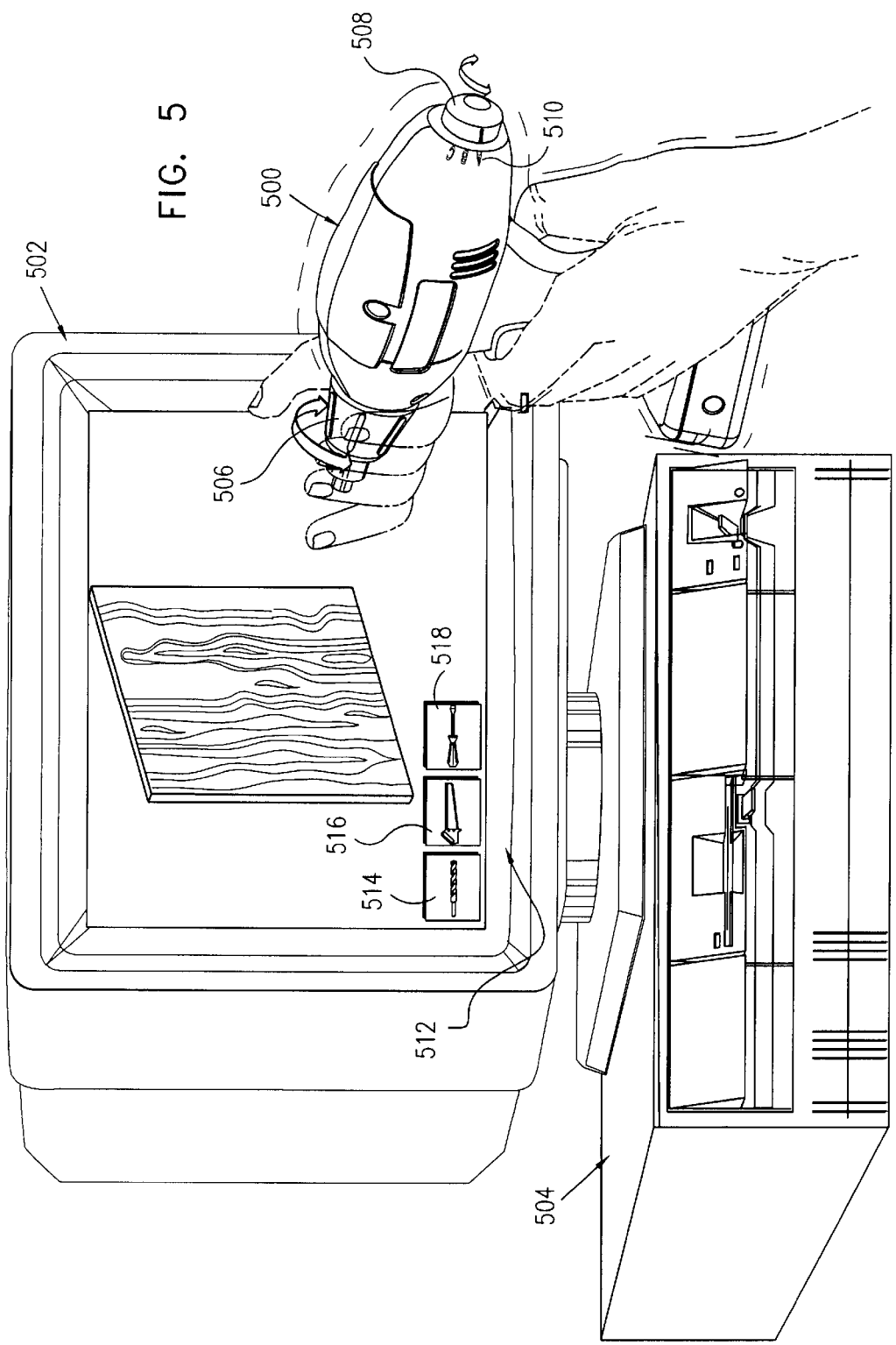

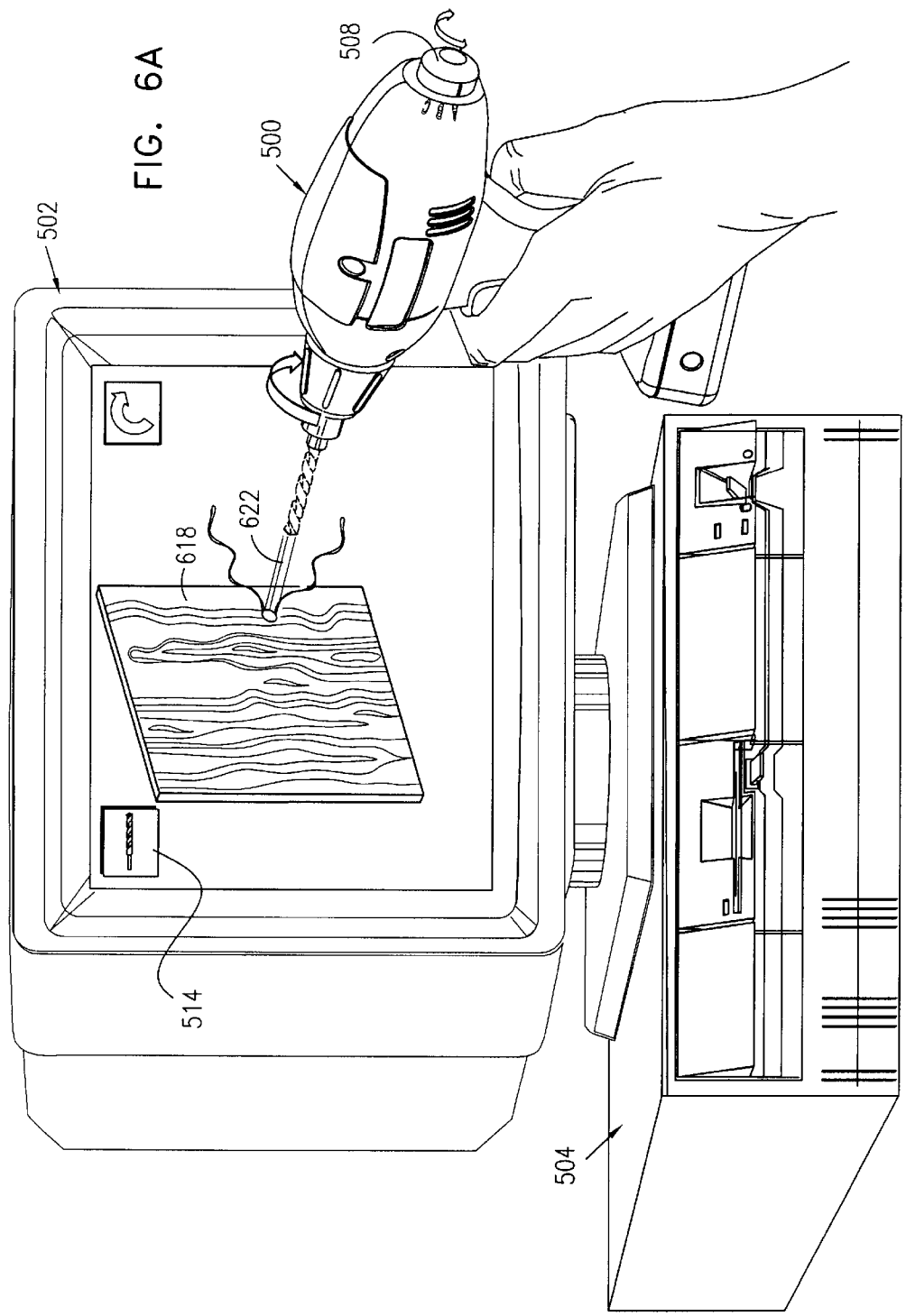

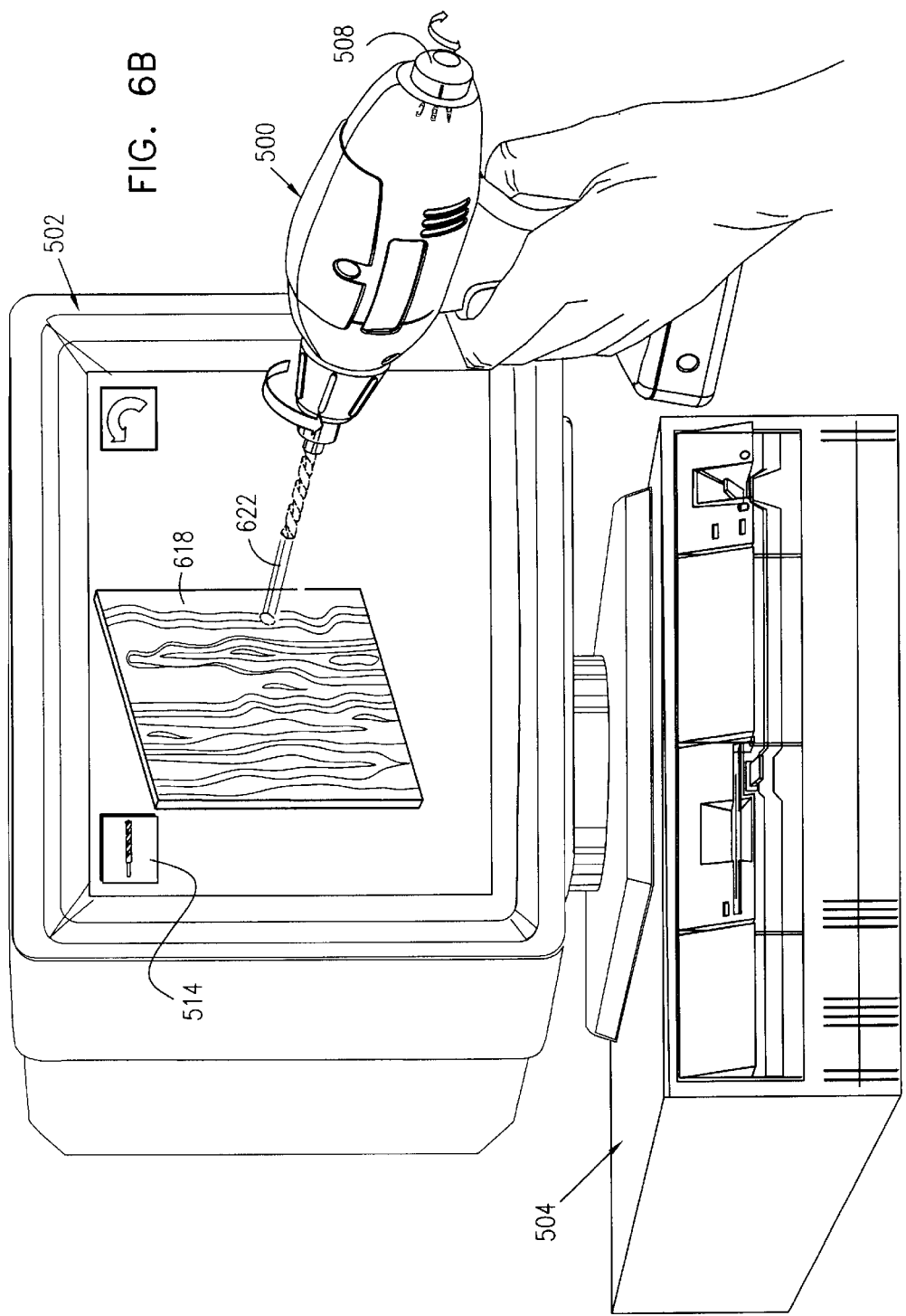

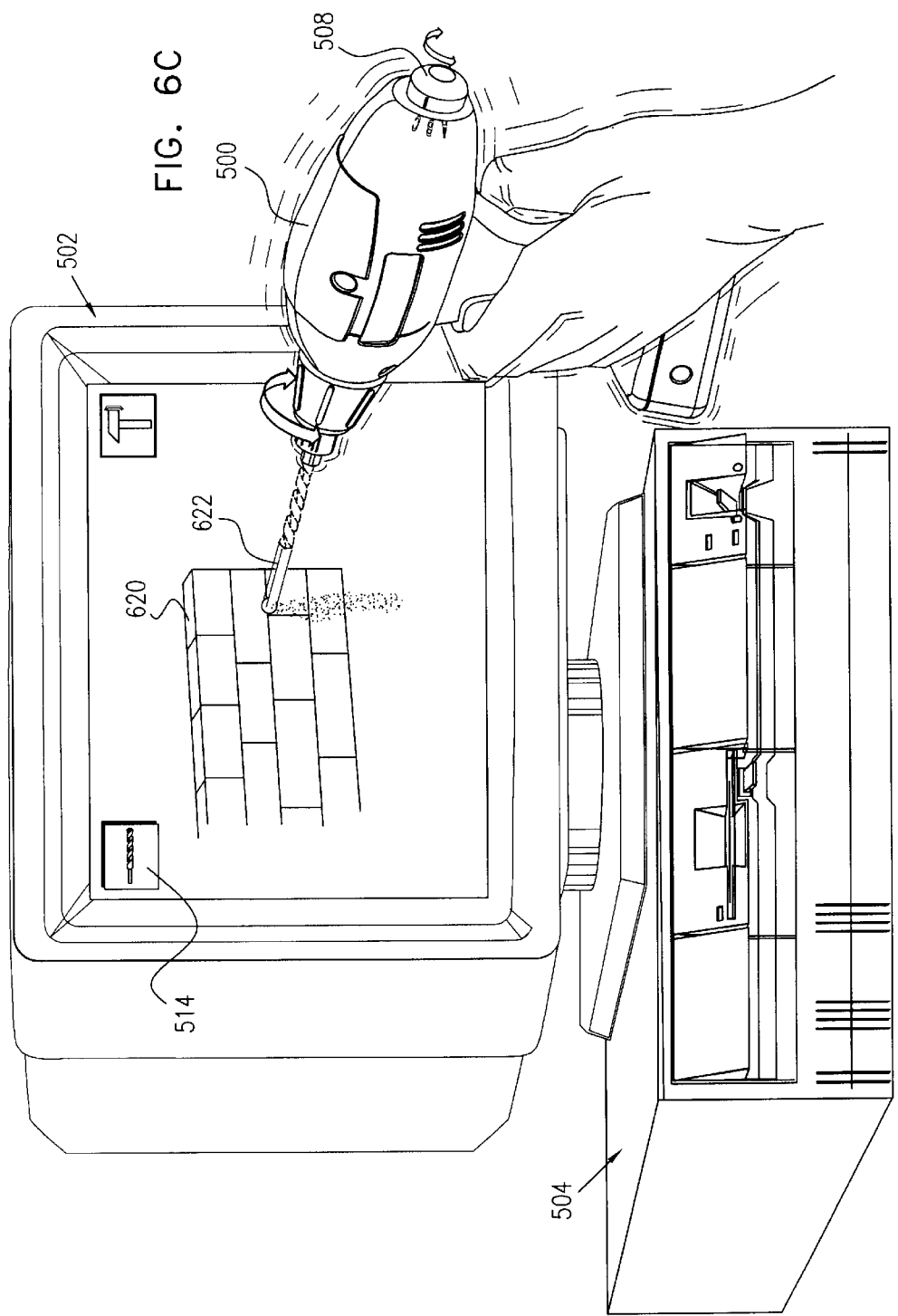

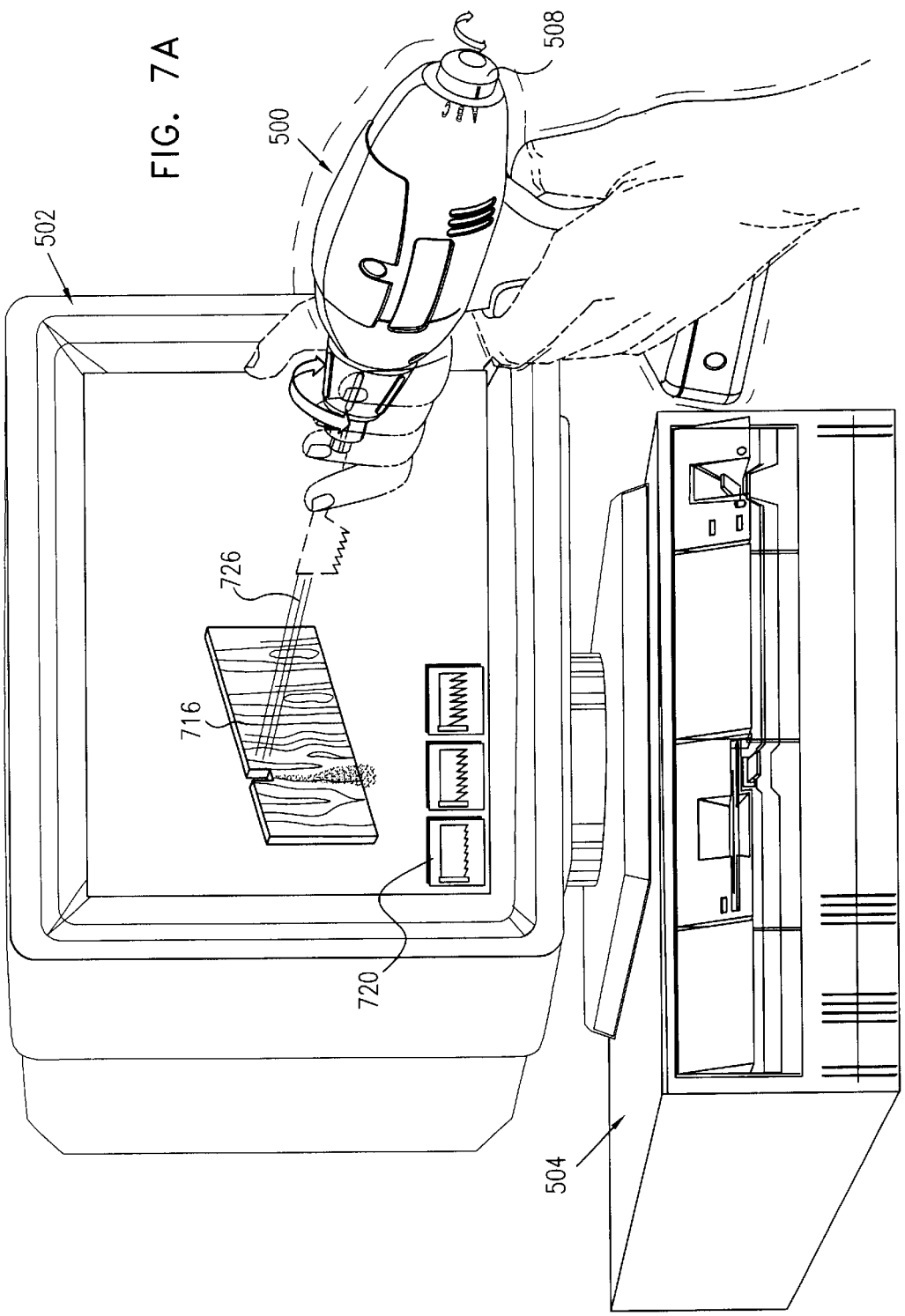

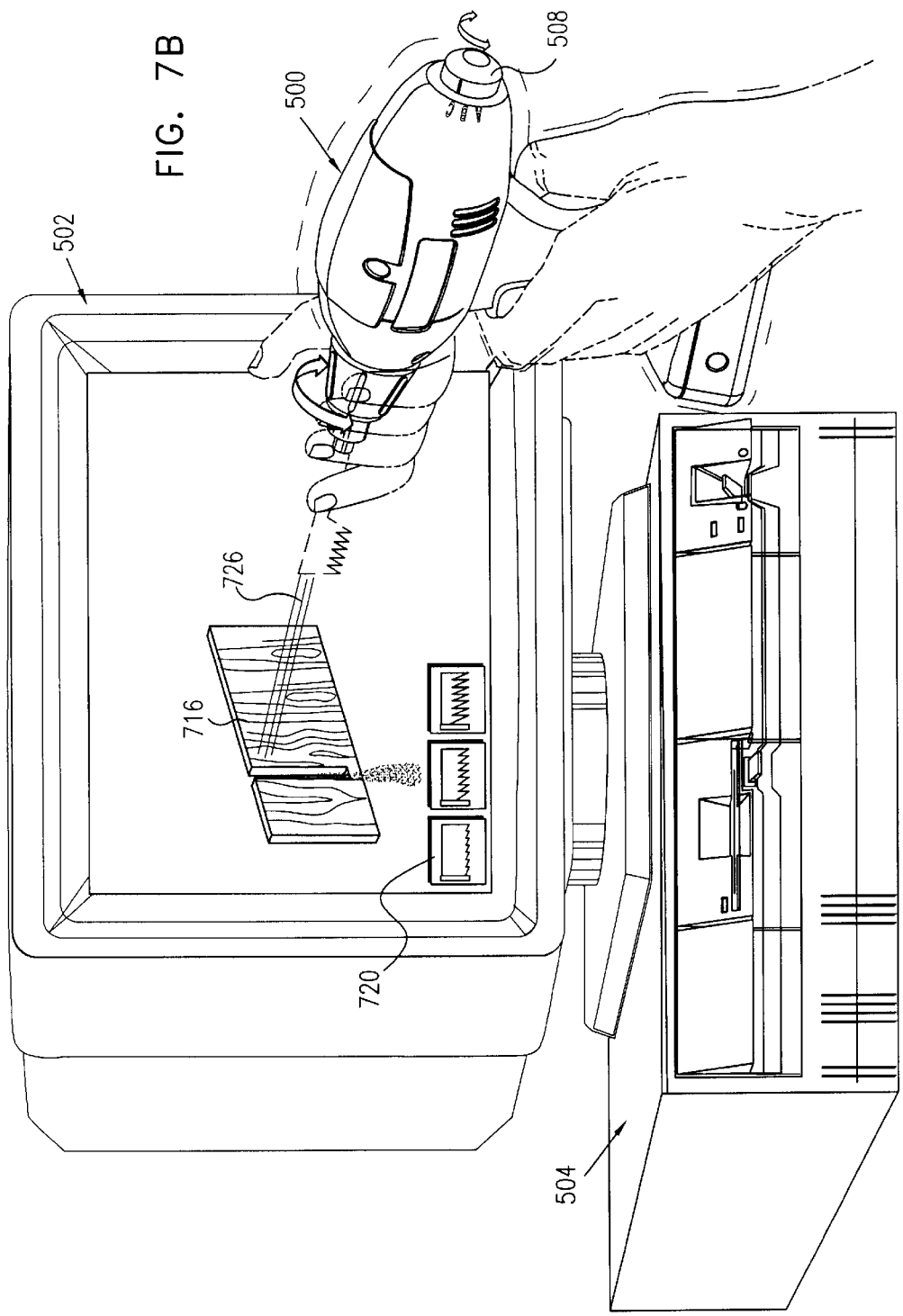

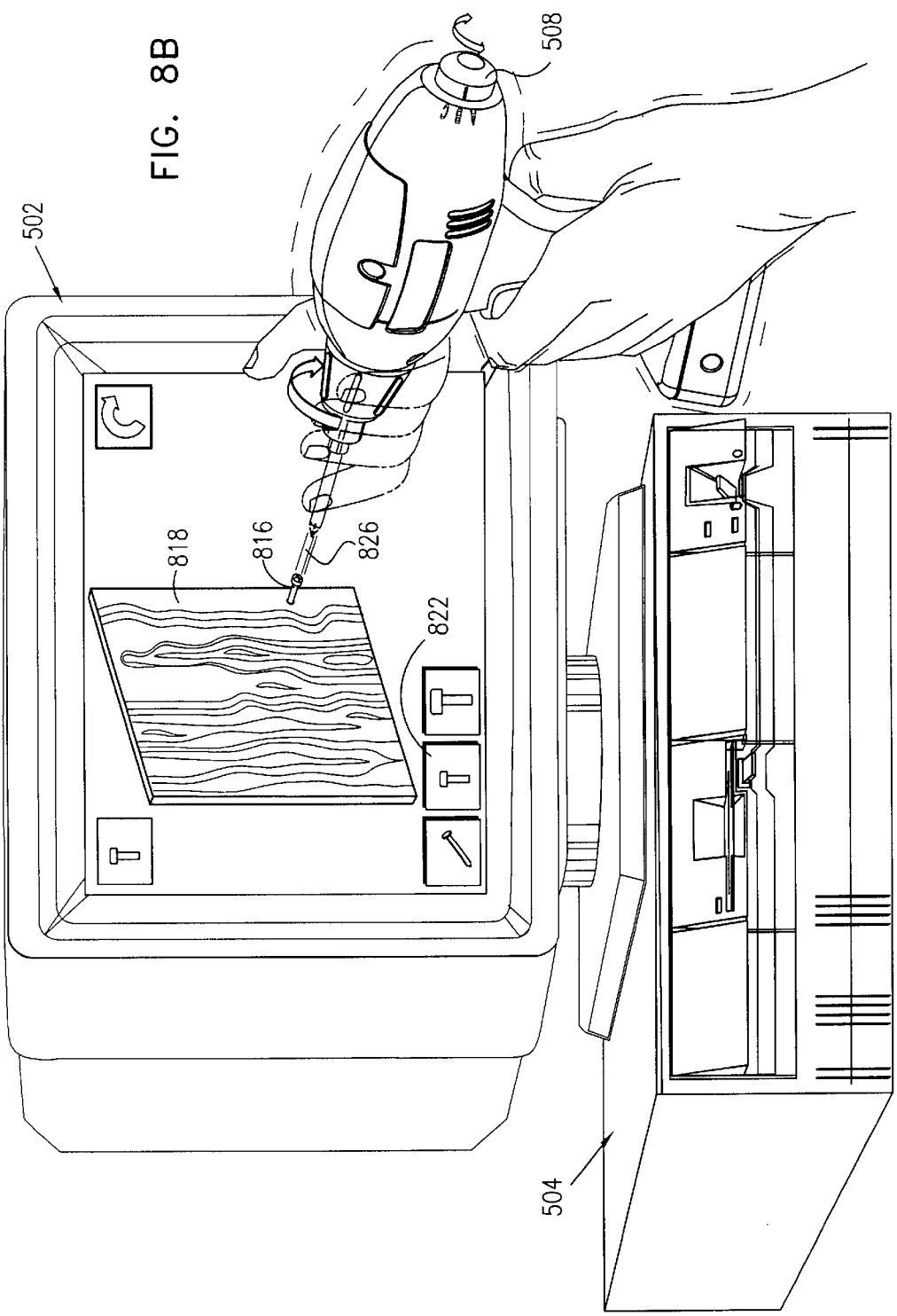

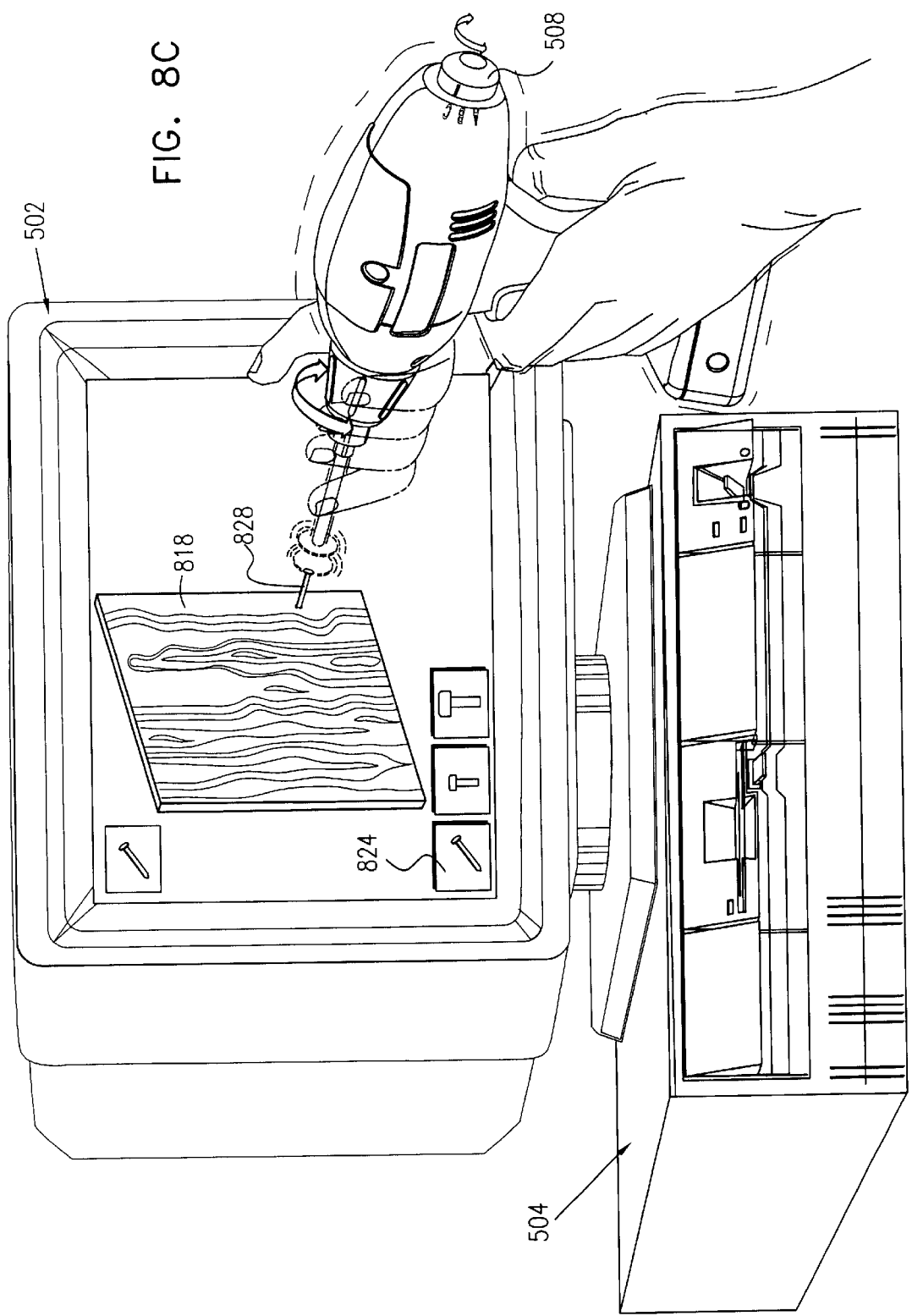

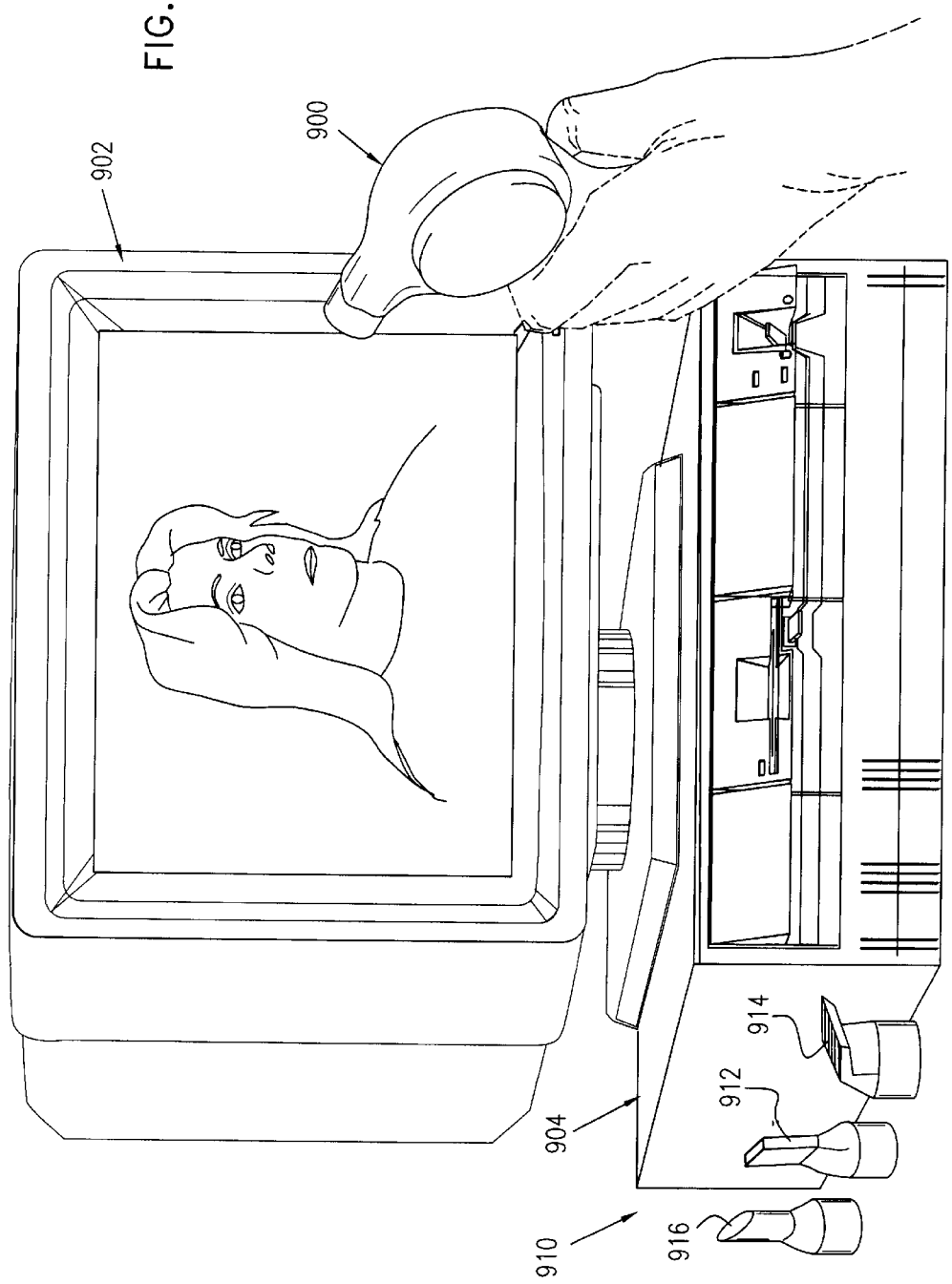

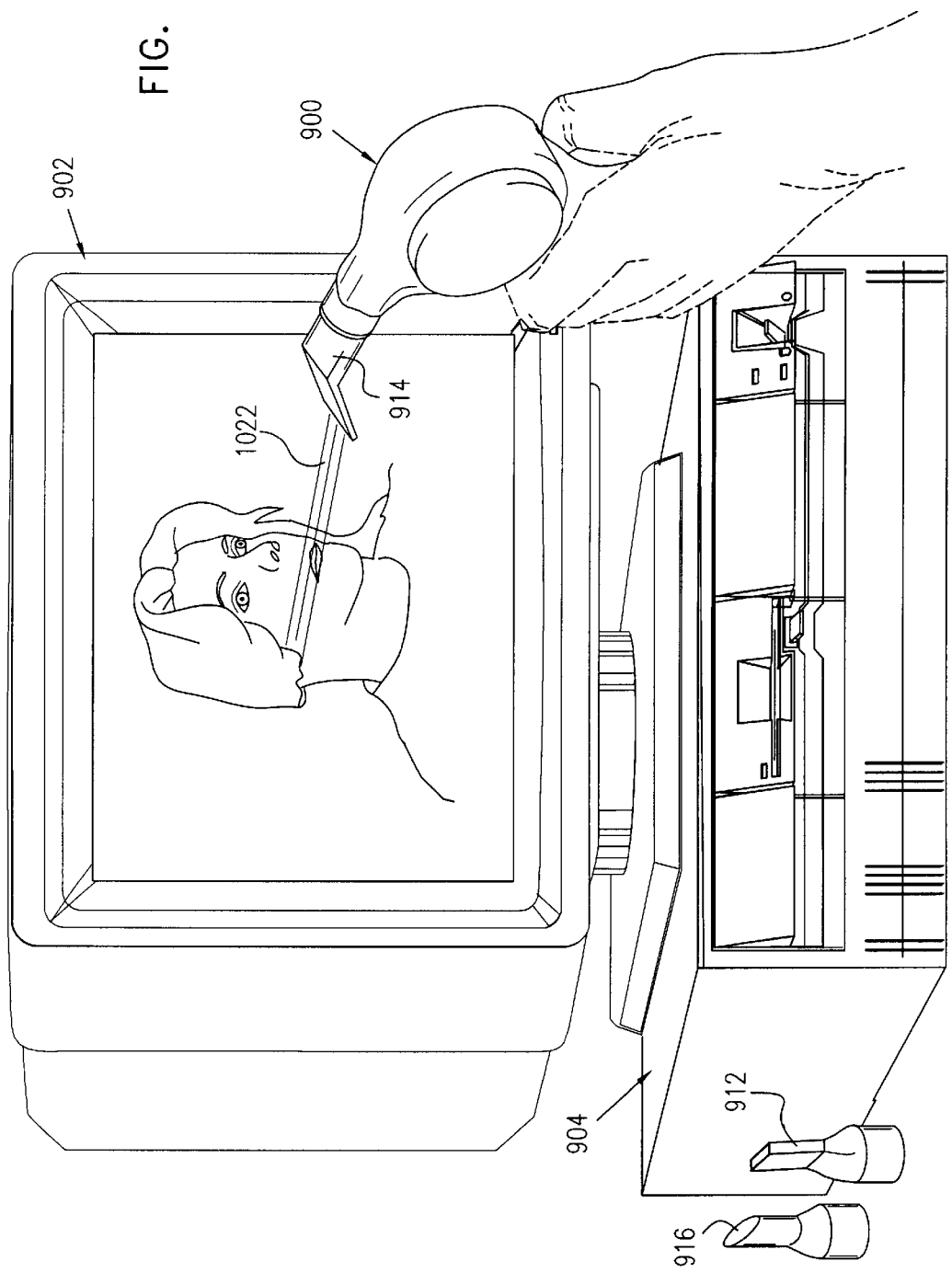

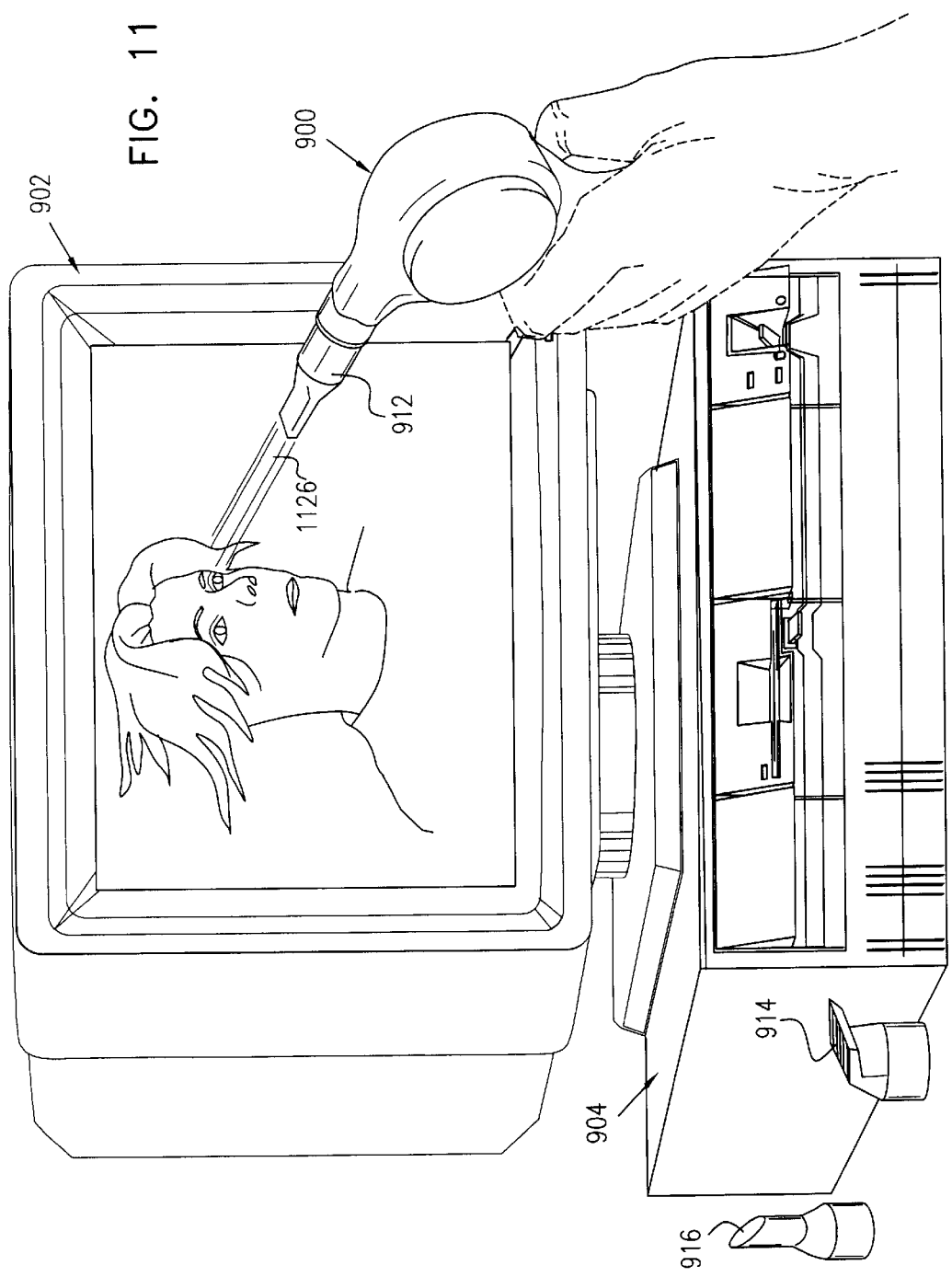

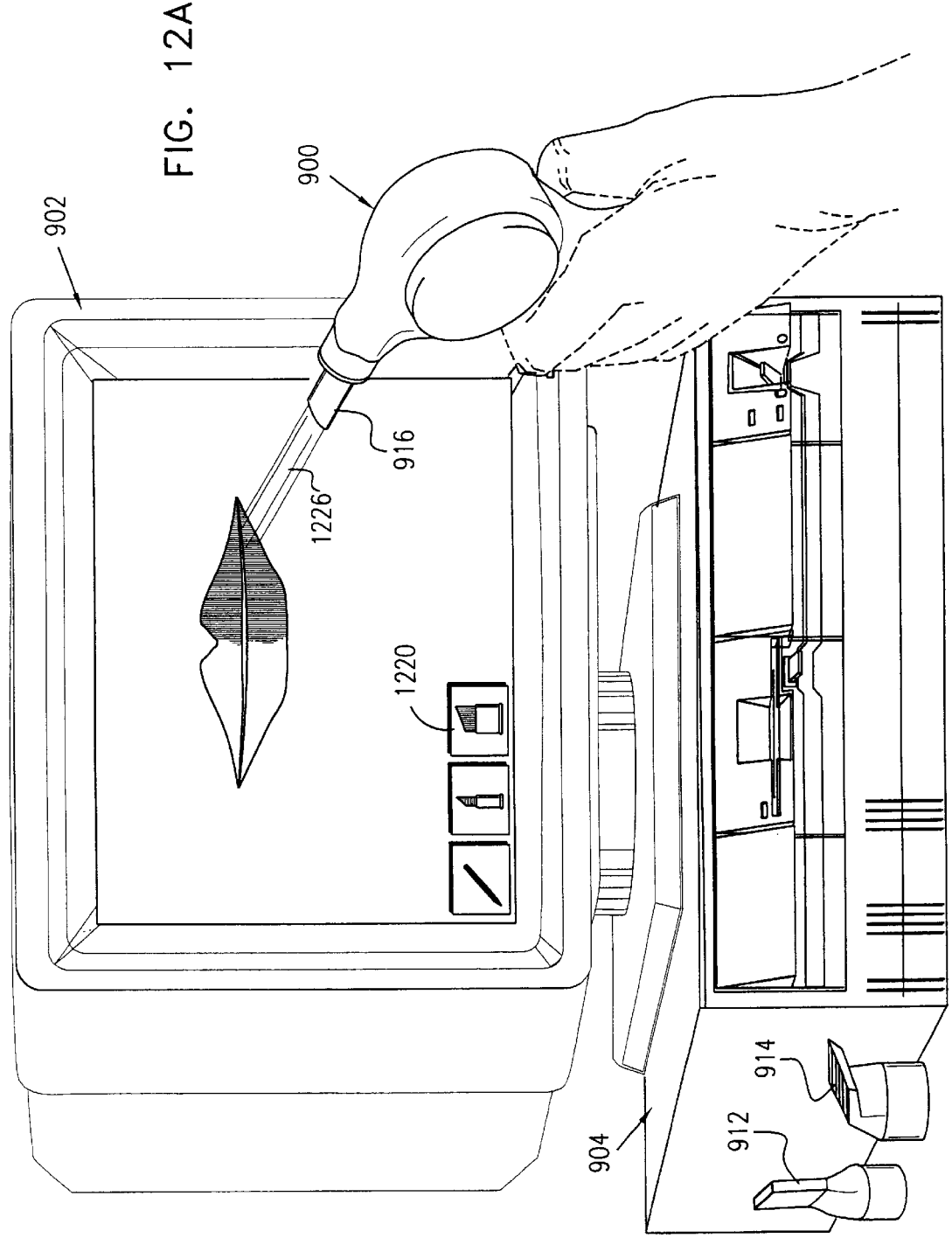

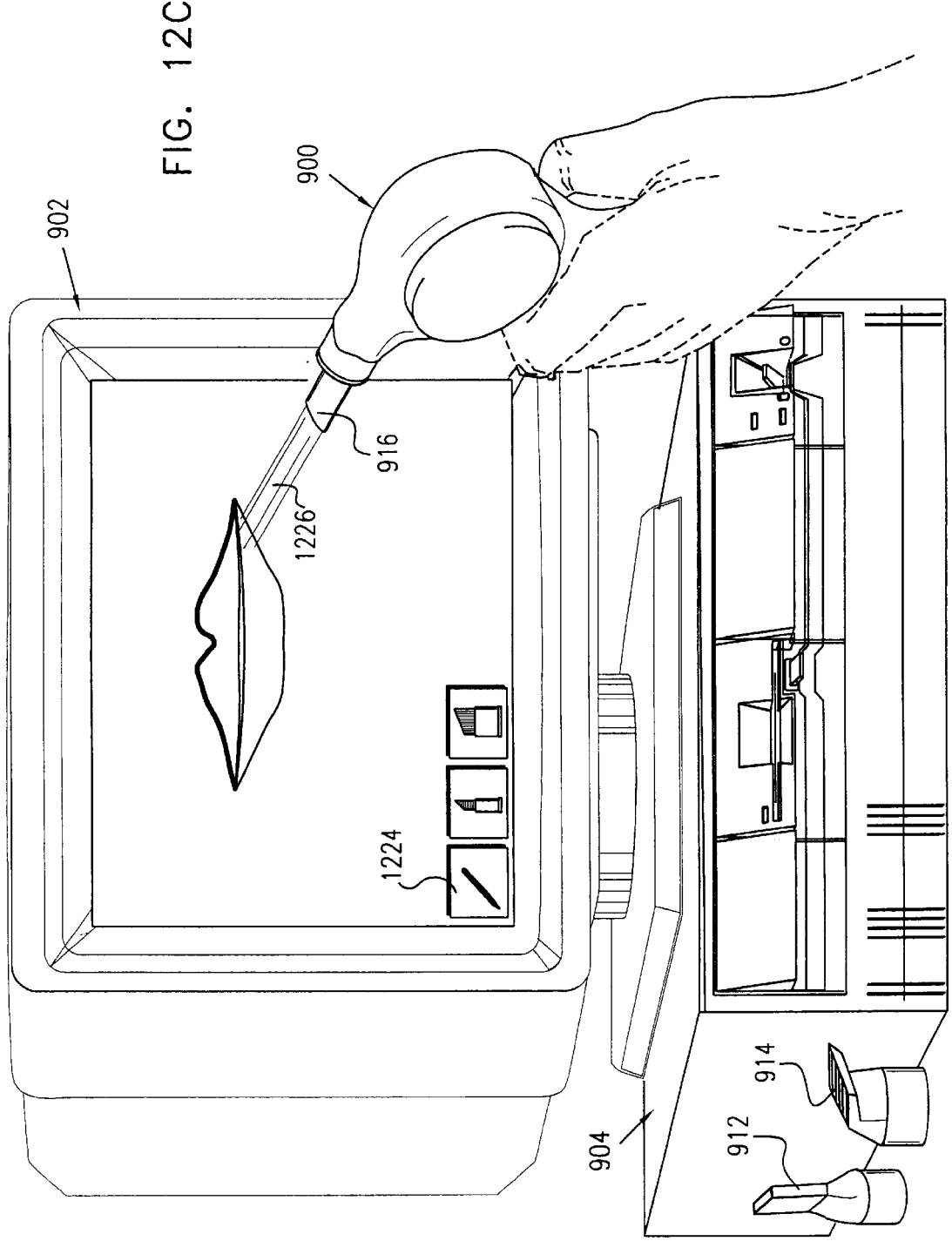

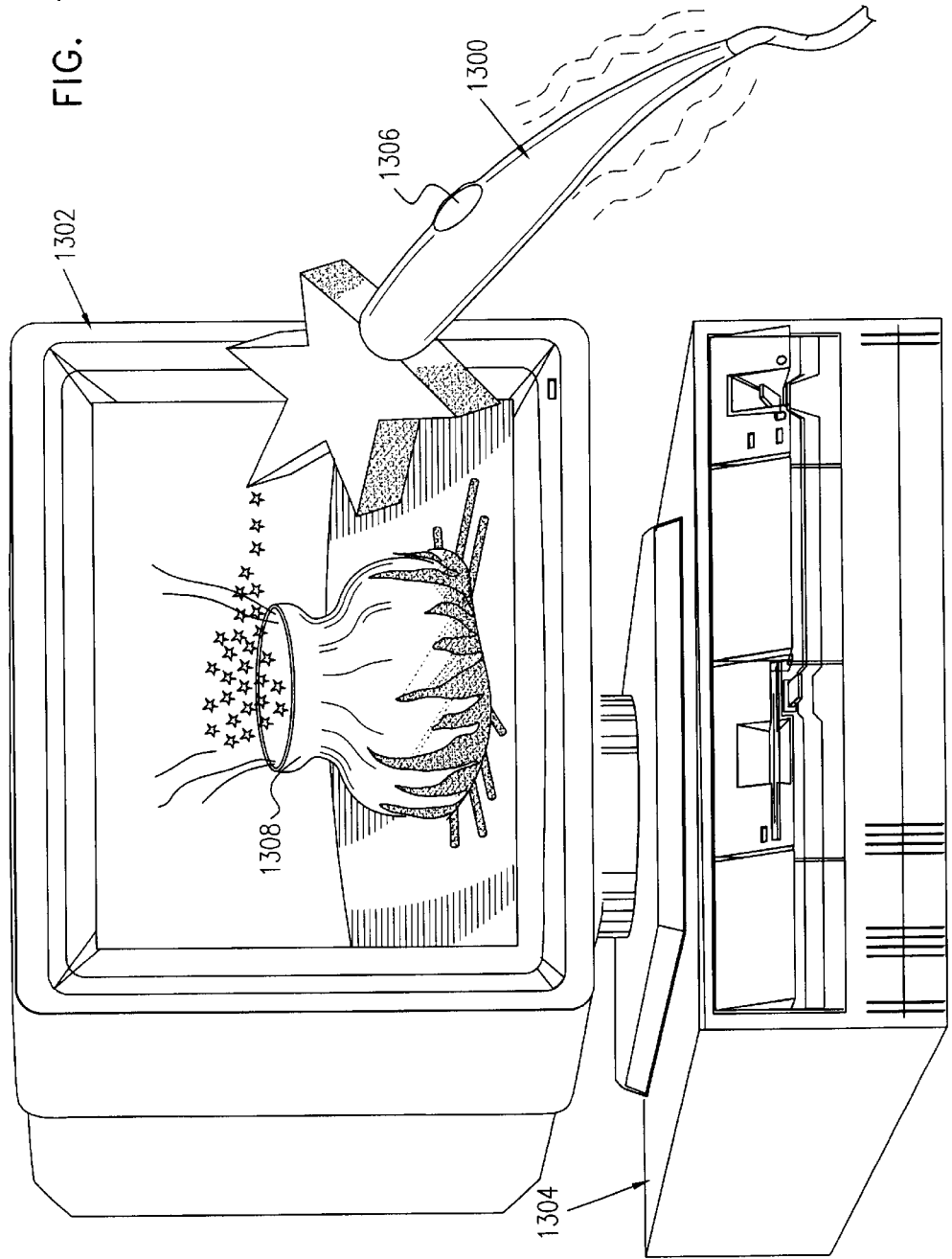

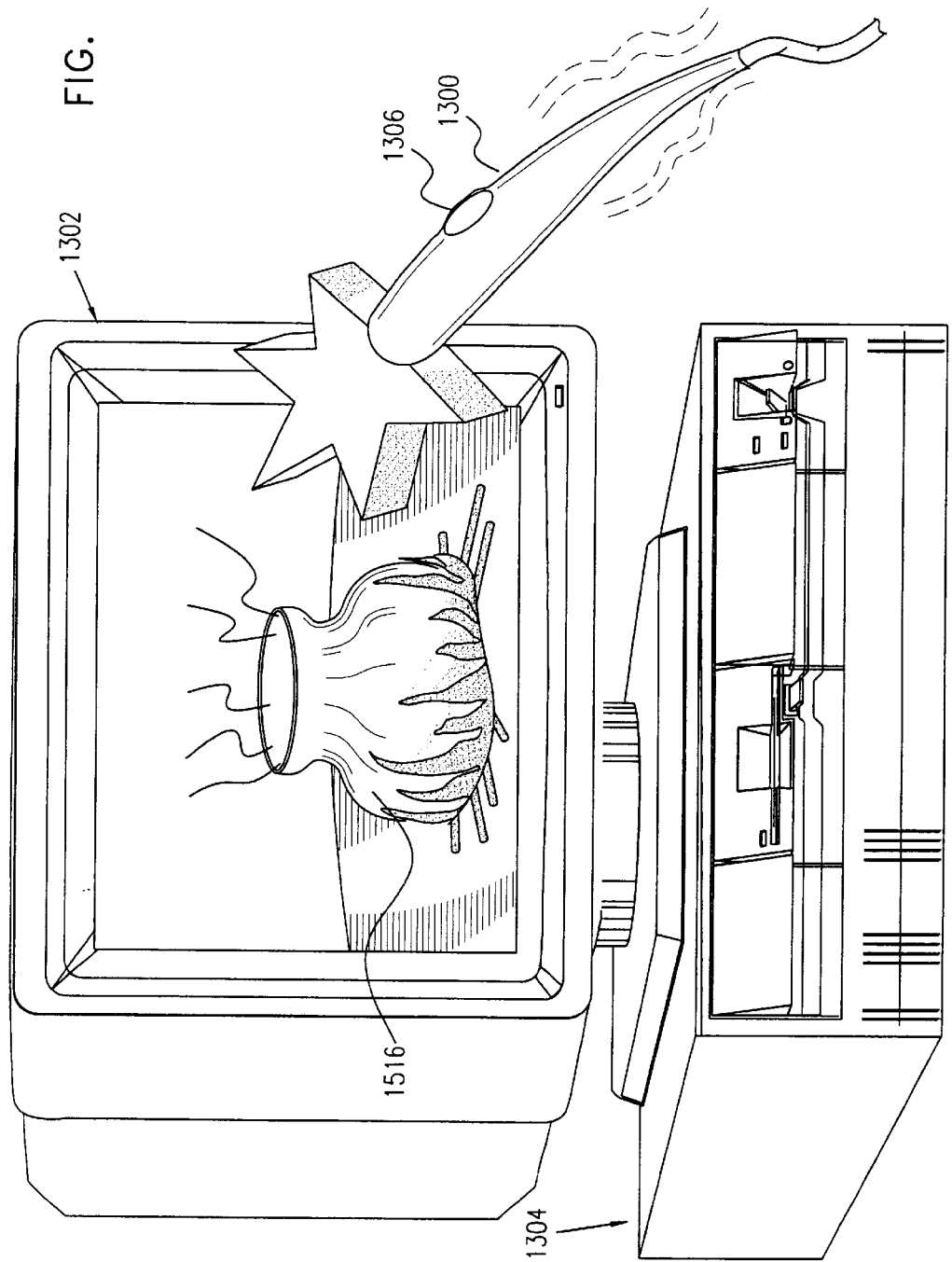

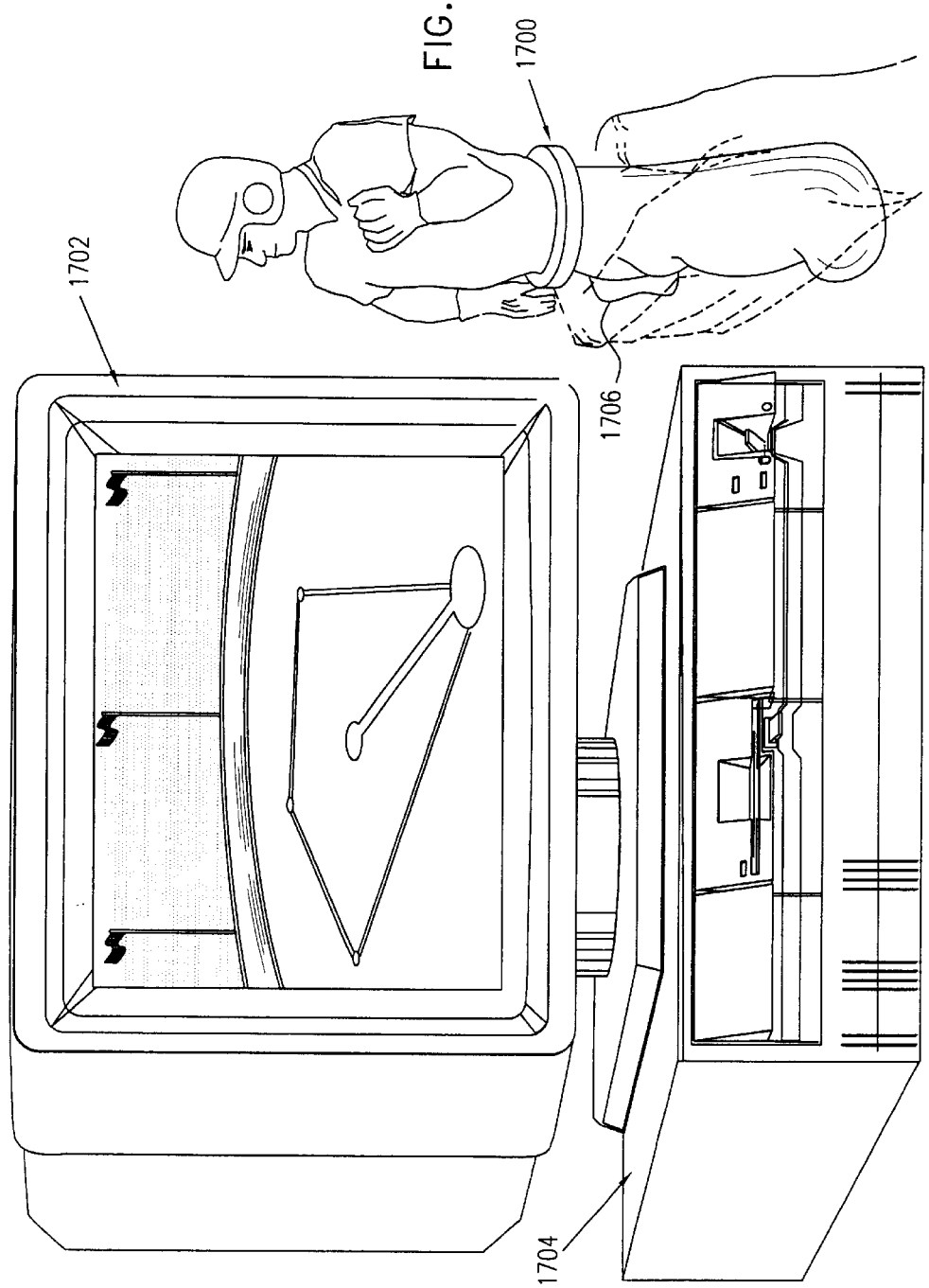

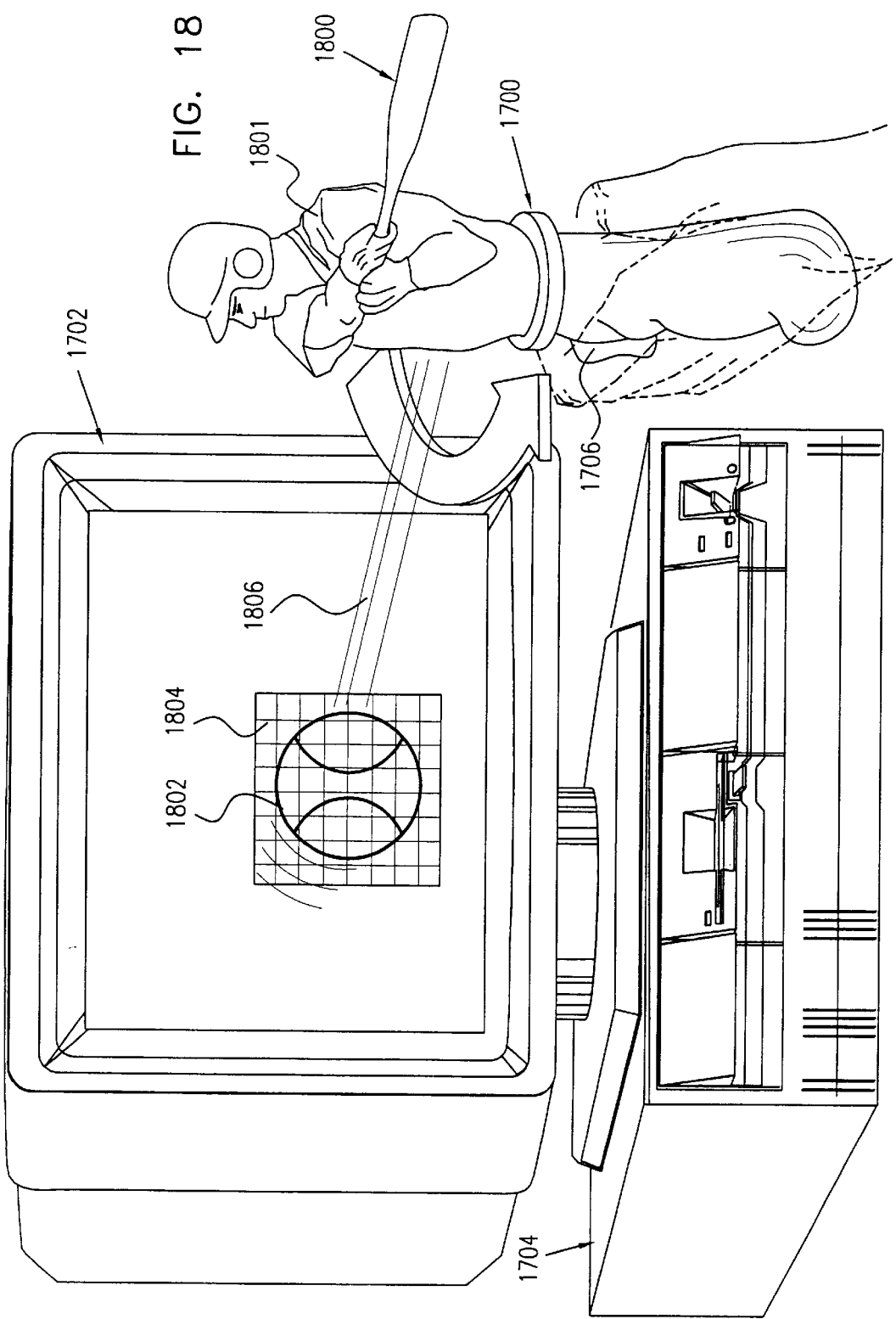

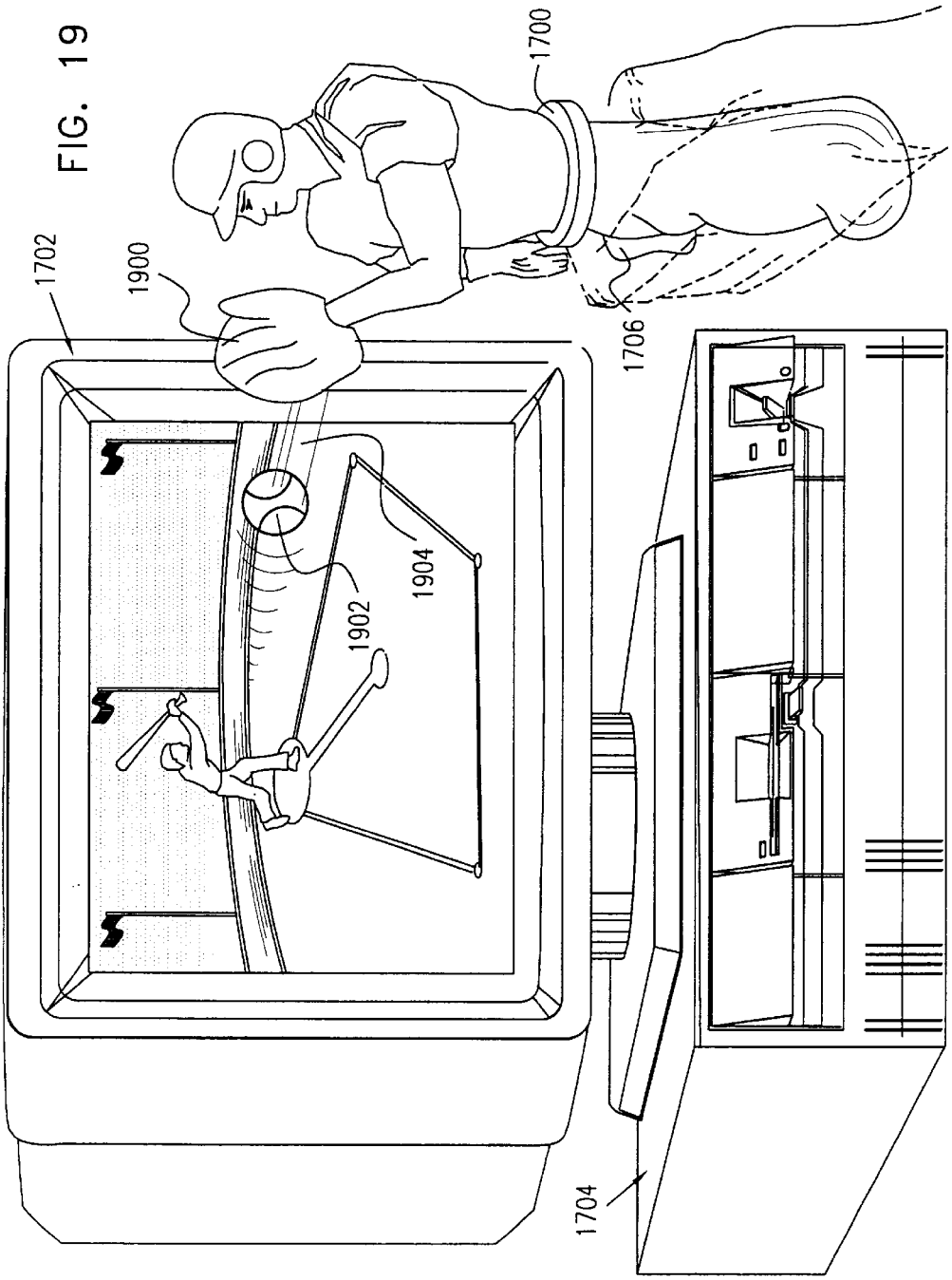

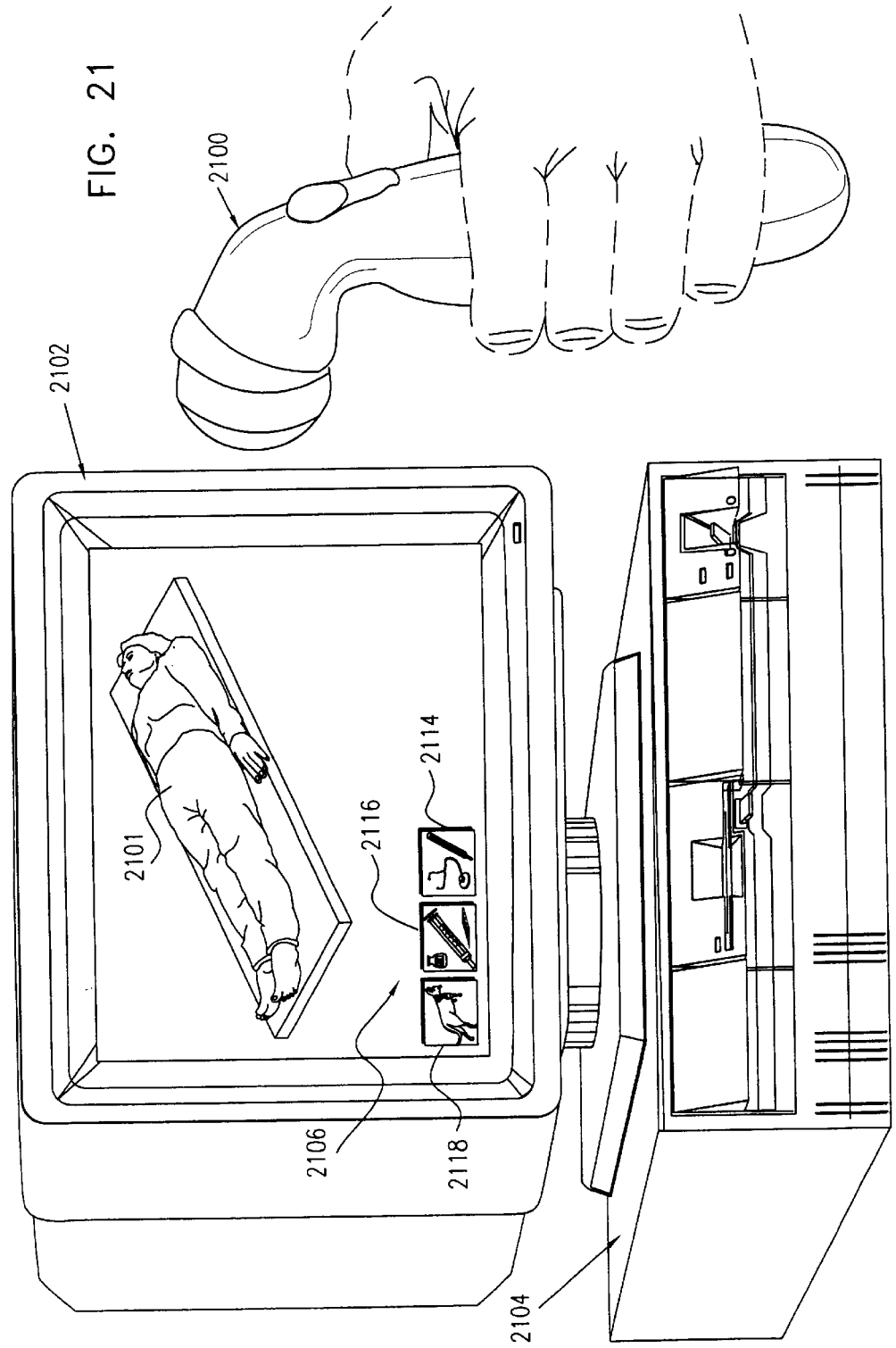

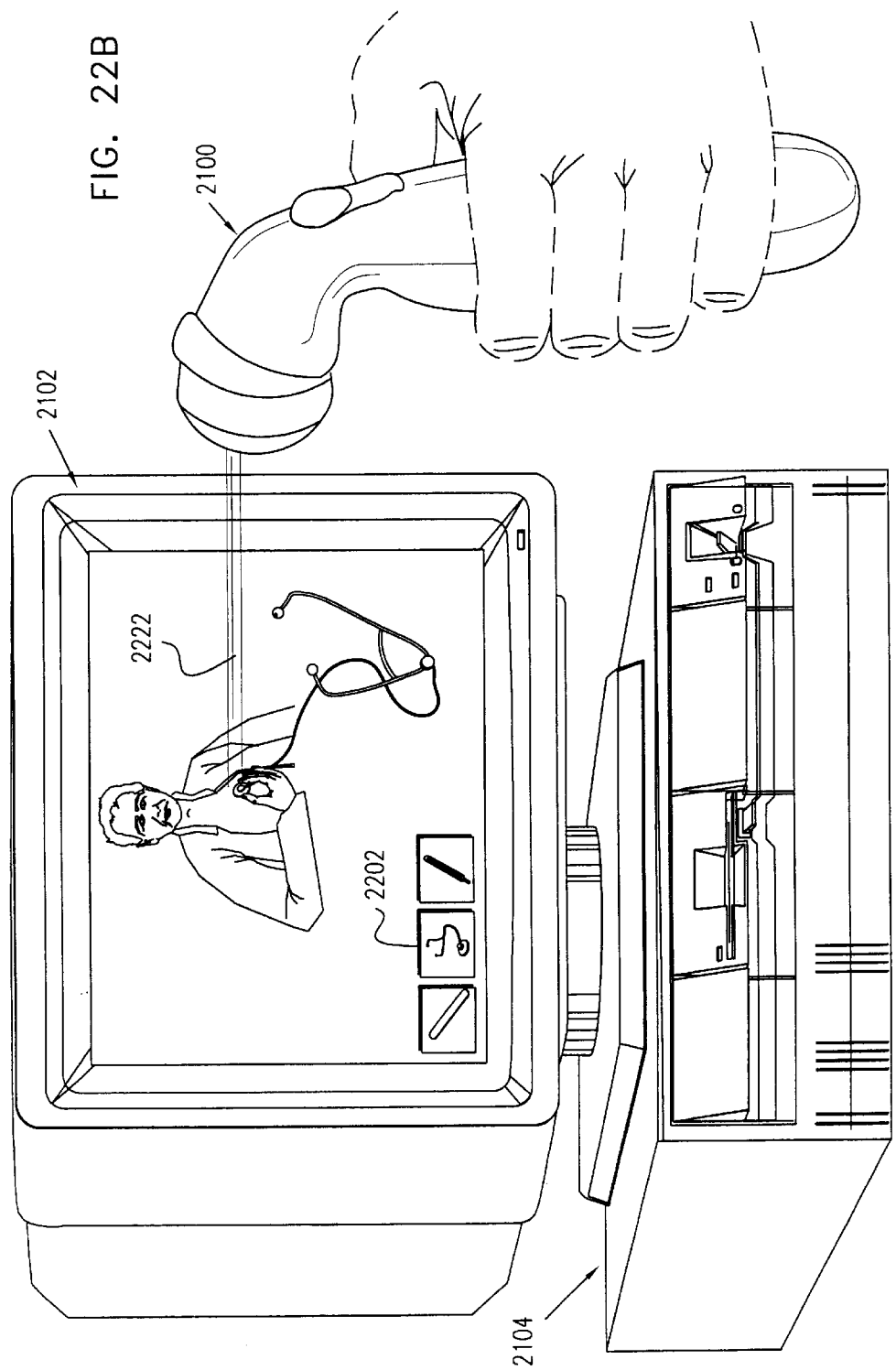

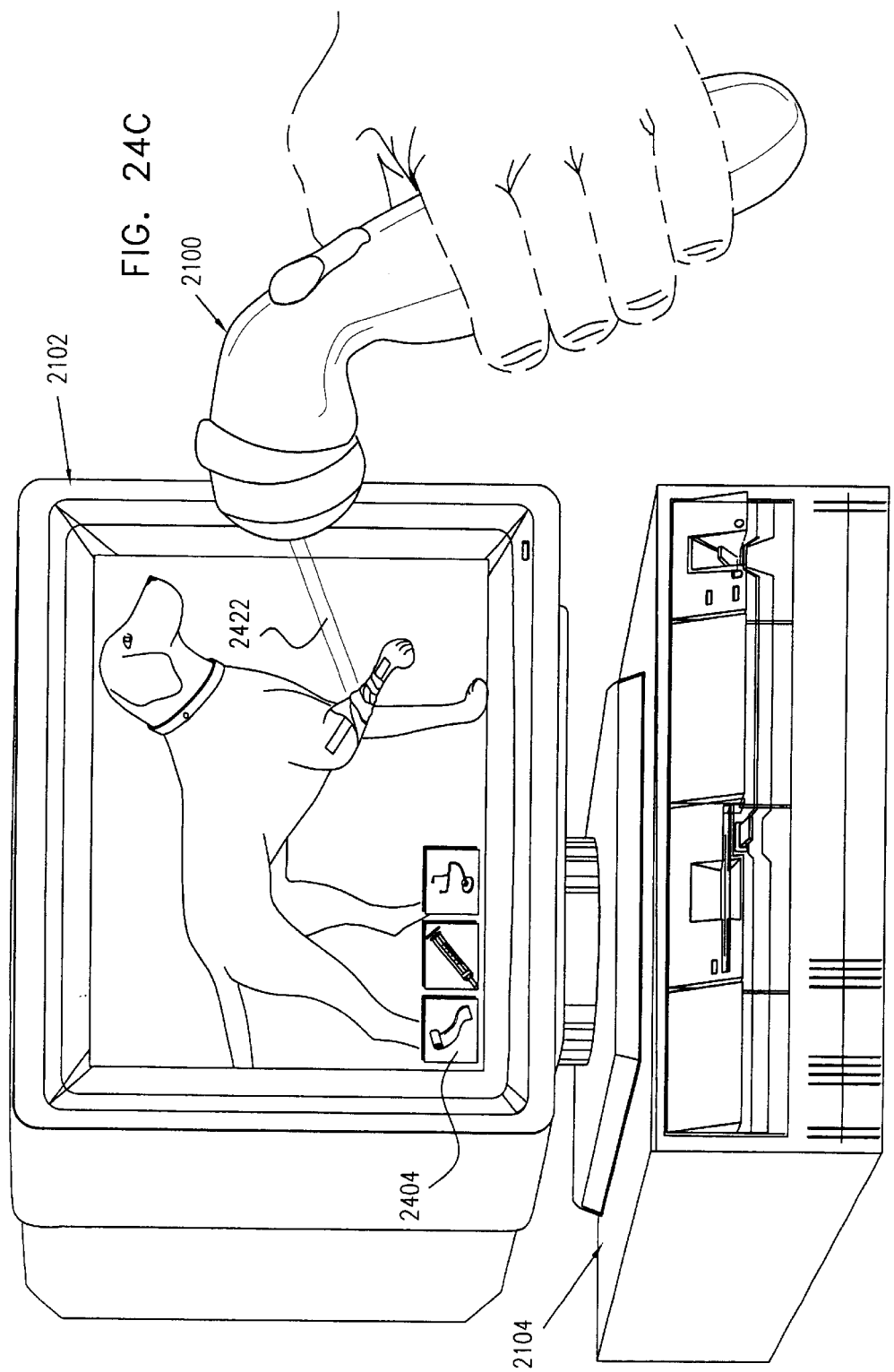

MULTIFUNCTIONAL COMPUTER INTERACTIVE PLAY SYSTEM

CROSS-REFERENCE TO RELATED APPLICATIONS

Reference is made to the following U.S patent applications: Ser. No. 08/990,623 filed Dec. 15, 1997 now U.S. Pat. No. 6,061,052; U.S. Ser. No. 09/075,320 filed May 11, 1998 now U.S. Pat. No. 6,097,376; and U.S. Ser. No. 09/234,139 filed Jan. 19, 1999 now U.S. Pat. No. 6,377,250 which is a Continuation-in-Part of U.S. Ser. No. 09/075,320, the disclosures of which are hereby incorporated by reference.

FIELD OF THE INVENTION

The present invention relates to toys and games generally and more particularly to computer interactive toys and games.

BACKGROUND OF THE INVENTION

There exist a variety of computer interactive toys and games. The following U.S. Patents are believed to be representative of the state of the art relevant to the present invention: 5,945,981; 5,929,444; 5,881,366; 5,877,752; 5,852,434; 5,831,601; 5,691,749; 5,652,412; 5,646,650; 5,610,629; 5,600,348; 5,572,251; 5,310,192; 5,248,150; 5,227,622; 5,194,008; 5,187,467; 5,184,115; 5,179,368; 5,151,688; 5,138,304; 5,134,389; 5,119,075; 5,051,736; 4,999,617; 4,984,073; 4,979,029; 4,956,639; 4,923,401; 4,922,236; 4,815,733; 4,813,682; 4,812,828; 4,802,722; 4,789,836; 4,697,175; 4,677,428; 4,675,665; 4,642,459; 4,620,107; 4,608,601; 4,602,907; 4,591,841; 4,565,947; 4,454,417; 4,395,045; 4,377,810; 4,367,465; 4,277,783; 4,263,592; 4,243,972; 4,210,329; 4,205,847; 4,190,851; 4,190,831; 4,185,825; 4,146,880; 4,129,858; 4,126,851; 4,109,146; 4,053,765; 4,017,680; 3,997,891; 3,993,861; 3,944,988; 3,832,693; 3,758,717; 3,659,281; 3,651,509; 3,594,608; 3,576,574; 3,551,896; 3,543,240; 3,506,875; 3,505,561.

SUMMARY OF THE INVENTION

The present invention seeks to provide a multifunctional computer interactive play system.

There is thus provided in accordance with a preferred embodiment of the present invention an interactive play system including a computer including a display and operating play software, a multifunctional physical tool operative in conjunction with the computer and receiving at least an optical input from the display, the multifunctional physical tool being manipulable by a user to select different functions thereof.

Further in accordance with a preferred embodiment of the present invention the multifunctional physical tool is operative, when appropriately positioned relative to objects appearing on the display and actuated by a user, to effect simulated work on the objects, the simulated work being selected by user manipulation of the tool.

Still further in accordance with a preferred embodiment of the present invention the multifunctional physical tool is manipulable for function selection by selectable relative positioning of portions thereof.

Additionally in accordance with a preferred embodiment of the present invention the multifunctional physical tool is manipulable for function selection by replacement of at least one portion thereof.

Moreover in accordance with a preferred embodiment of the present invention the multifunctional physical tool is manipulable for function selection by user engagement with a selected portion thereof.

Further in accordance with a preferred embodiment of the present invention the multifunctional physical tool is manipulable for function selection by selectable positioning thereof.

Preferably the selection of at least one function of the multifunctional physical tool is carried out by the operating play software.

Additionally in accordance with a preferred embodiment of the present invention the display may be a CRT display or a liquid crystal display.

Still further in accordance with a preferred embodiment of the present invention the tool includes a light pen. The tool also provides force feedback.

Preferably the tool includes a light signal receiver which receives a light beam from the screen and provides an indication of the position of the tool relative to the screen.

Still further in accordance with a preferred embodiment of the present invention the function is selected from a sports function a magic function, a repair function, a construction function, a medical function and a personal care function.

There is thus provided in accordance with yet another preferred embodiment of the present invention an interactive play system including a computer including a display and operating play software, a multifunctional and multifunctionality physical tool operative in conjunction with the computer and receiving at least an optical input from the display, the multifunctional physical tool being manipulable by a user to select at least one of different functions and functionalities thereof.

Further in accordance with a preferred embodiment of the present invention the multifunctional physical tool is operative, when appropriately positioned relative to objects appearing on the display and actuated by a user, to effect simulated work on the objects, the simulated work being selected by user manipulation of the tool.

Still further in accordance with a preferred embodiment of the present invention the multifunctional and multifunctionality physical tool is manipulable for functionality selection by selectable relative positioning of portions thereof.

Moreover in accordance with a preferred embodiment of the present invention the multifunctional and multifunctionality physical tool for functionality selection by replacement of at least one portion thereof.

Further more in accordance with a preferred embodiment of the present invention the multifunctional and multifunctionality physical tool is manipulable for functionality selection by user engagement with a selected portion thereof.

Additionally in accordance with a preferred embodiment of the present invention the multifunctional and multifunctionality physical tool is manipulable for functionality selection by selectable positioning thereof.

Moreover in accordance with a preferred embodiment o the present invention the selection of at least one functionality of the multifunctional and multifunctionality physical tool is carried out by the operating play software.

Preferably the display May be a CRT display or a liquid crystal display.

Additionally in accordance with a preferred embodiment of the present invention the tool includes a light pen.

Furthermore in accordance with a preferred embodiment of the present invention the tool provides force feedback.

Still further in accordance with a preferred embodiment of the present invention the tool includes a light signal receiver which receives a light beam from the screen and provides an indication of the position of the tool relative to the screen.

Additionally in accordance with a preferred embodiment of the present invention the function is selected from a sports function, a magic function, a repair function, a construction function, a medical function and a personal care function.

BRIEF DESCRIPTION OF THE DRAWINGS

The present invention will be understood and appreciated more fully from the following detailed description, taken in conjunction with the drawings in which:

FIG. 1 is a pictorial illustration of an opening screen provided by an interactive play system constructed and operative in accordance with a preferred embodiment of the present invention;

FIGS. 2A, 2B and 2C are each a pictorial illustration of the interactive play system of FIG. 1 being used for a different functionality of a wrench function;

FIGS. 3A, 3B and 3C are each a pictorial illustration of the interactive play system of FIG. 1 being used for a different functionality of a spray paint function;

FIGS. 4A, 4B and 4C are each a pictorial illustration of the interactive play system of FIG. 1 being used for a different functionality of a fender hammer function;

FIG. 5 is a pictorial illustration of an opening screen provided by an interactive play system constructed and operative in accordance with another preferred embodiment of the present invention;

FIGS. 6A, 6B and 6C are each a pictorial illustration of the interactive play system of FIG. 5 being used for a different functionality of a sawing function;

FIGS. 7A, 7B and 7C are each a pictorial illustration of the interactive play system of FIG. 5 being used for a different functionality of a drilling paint function;

FIGS. 8A, 8B and 8C are each a pictorial illustration of the interactive play system of FIG. 5 being used for a different functionality of a fastening function;

FIG. 9 is a pictorial illustration of an opening screen provided by an interactive play system constructed and operative in accordance with yet another preferred embodiment of the present invention;

FIG. 10 is a pictorial illustration of the interactive play system of FIG. 9 being used for a cutting function;

FIG. 11 is a pictorial illustration of the interactive play system of FIG. 9 being used for a a combing function;

FIGS. 12A, 12B and 12C are each a pictorial illustration of the interactive play system of FIG. 9 being used for a different functionality of a fender hammer function;

FIG. 13 is a pictorial illustration of an opening screen provided by an interactive play system constructed and operative in accordance with still another preferred embodiment of the present invention;

FIGS. 15A and 15B are each a pictorial illustration of the interactive play system of FIG. 13 being used for a different functionality of an energizing function;

FIG. 17 is a pictorial illustration of an opening screen provided by an interactive play system constructed and operative in accordance with a further preferred embodiment of the present invention;

FIG. 18 is a pictorial illustration of the interactive play system of FIG. 13 being used for a batting function;

FIG. 19 is a pictorial illustration of the interactive play system of FIG. 17 being used for a different functionality of an catching function; FIG.

FIG. 21 is a pictorial illustration of an opening screen provided by an interactive play system constructed and operative in accordance with yet a further preferred embodiment of the present invention;

FIGS. 22A, 22B and 22C are each a pictorial illustration of the interactive play system of FIG. 21 being used for a different functionality of a human examination function;

FIGS. 24A, 24B and 24C are each a pictorial illustration of the interactive play system of FIG. 21 being used for a different functionality of a veterinary function;

DETAILED DESCRIPTION OF PREFERRED EMBODIMENTS

Figure 3A:
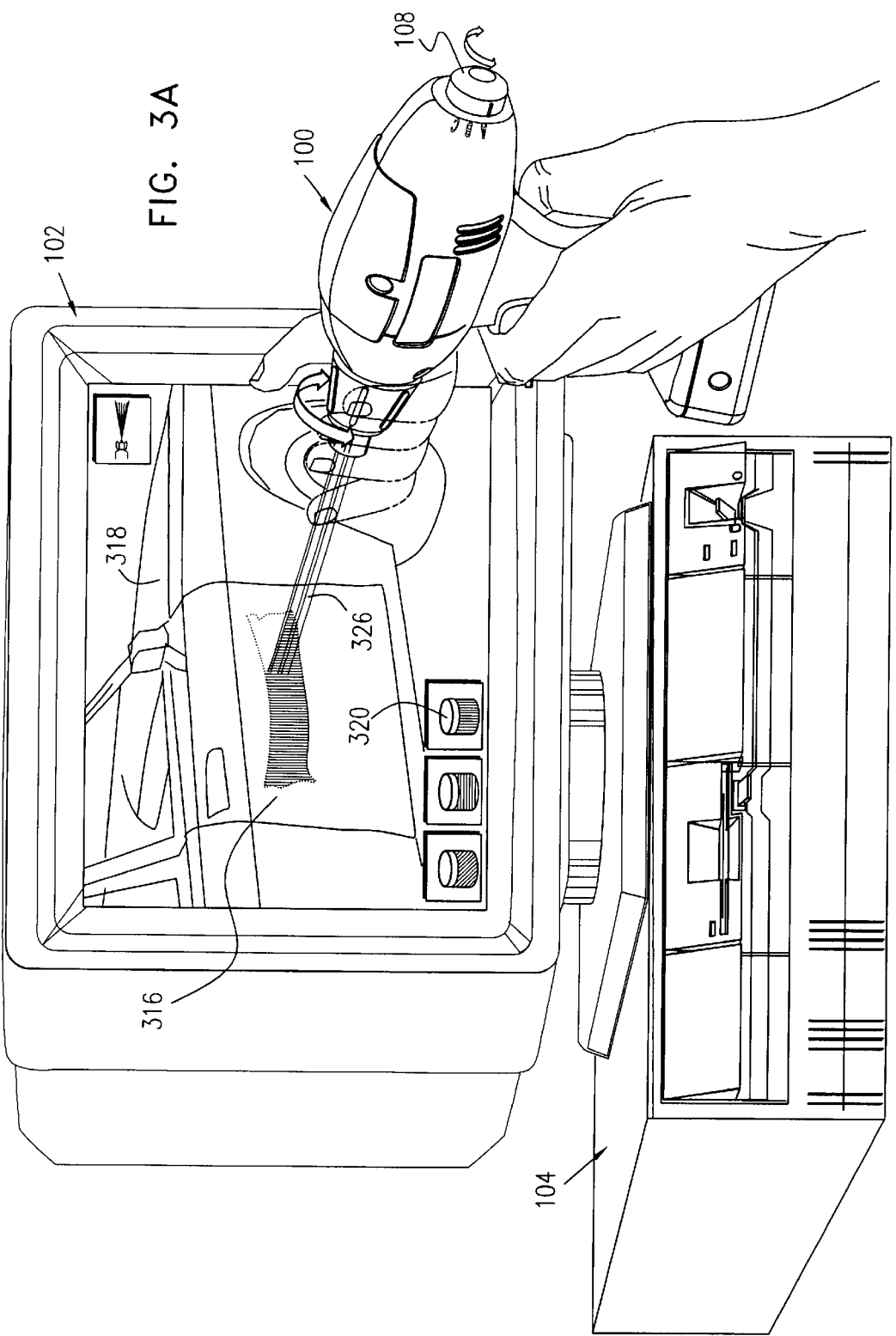

Reference is now made to FIG. 1, which is a pictorial illustration of an opening screen provided by an interactive play system constructed and operative in accordance with a preferred embodiment of the present invention. As seen in FIG. 1, the interactive play system comprises a multifunctional and multifunctionality tool generally indicated by reference numeral 100. Tool 100 operates interactively with a display screen 102, which is typically connected with a computer 104, such as a personal computer, or alternatively a game computer or a computer incorporated within a television receiver.

In the illustrated embodiment of FIG. 1, the tool 100 is presented in the form of a power tool and has a function control facility, which is actuated by suitable positioning or rotation of a chuck portion 106 thereof. In accordance with a preferred embodiment of the present invention, the tool 100 also has a functionality control facility, which is actuated by suitable positioning of a knob 108 in one of a plurality of positions, here indicated by markings 110.

In the embodiment of FIG. 1, a working environment is shown on display screen 102. Preferably, but not necessarily, images 112, comprising icons 114, 116 and 118, showing different possible functions of tool 100 are illustrated.

It is a particular feature of a preferred embodiment of the present invention that the tool 100 performs work on an object 120 shown on display screen 102 and that the process and result of the work is also shown on the display screen 102. This provides enhanced play value for the user, as may be appreciated from the description of FIGS. 2A–4C which follows.

Reference is now made to FIGS. 2A, 2B and 2C, which are each a pictorial illustration of the interactive play system of FIG. 1 being used for a different functionality of a wrench function, indicated graphically in FIG. 1 at reference numeral 114. As seen in FIGS. 2A, 2B and 2C, the power tool functions as a wrench and is shown in operative working engagement with a wheel nut 216 on a vehicle 218.

FIG. 2A shows an unscrewing functionality, when knob 108 is positioned at position A. FIG. 2B shows a nut tightening functionality, when knob 108 is positioned at position B and FIG. 2C shows a hammer functionality for loosening a nut, when knob 108 is positioned at position C.

It is a particular feature of a preferred embodiment of the present invention that the tool 100 performs work on an object, such as nut 216, when it is pointed at the object and receives an optical input therefrom, as indicated by ray 220.

It is also a particular feature of a preferred embodiment of the present invention that the tool 100 may display force feedback in accordance with its function and functionality. This force feedback may be in the form of vibrations 221 or other types of forces which represent the function and functionality currently being carried out by the tool.

Figure 3B:
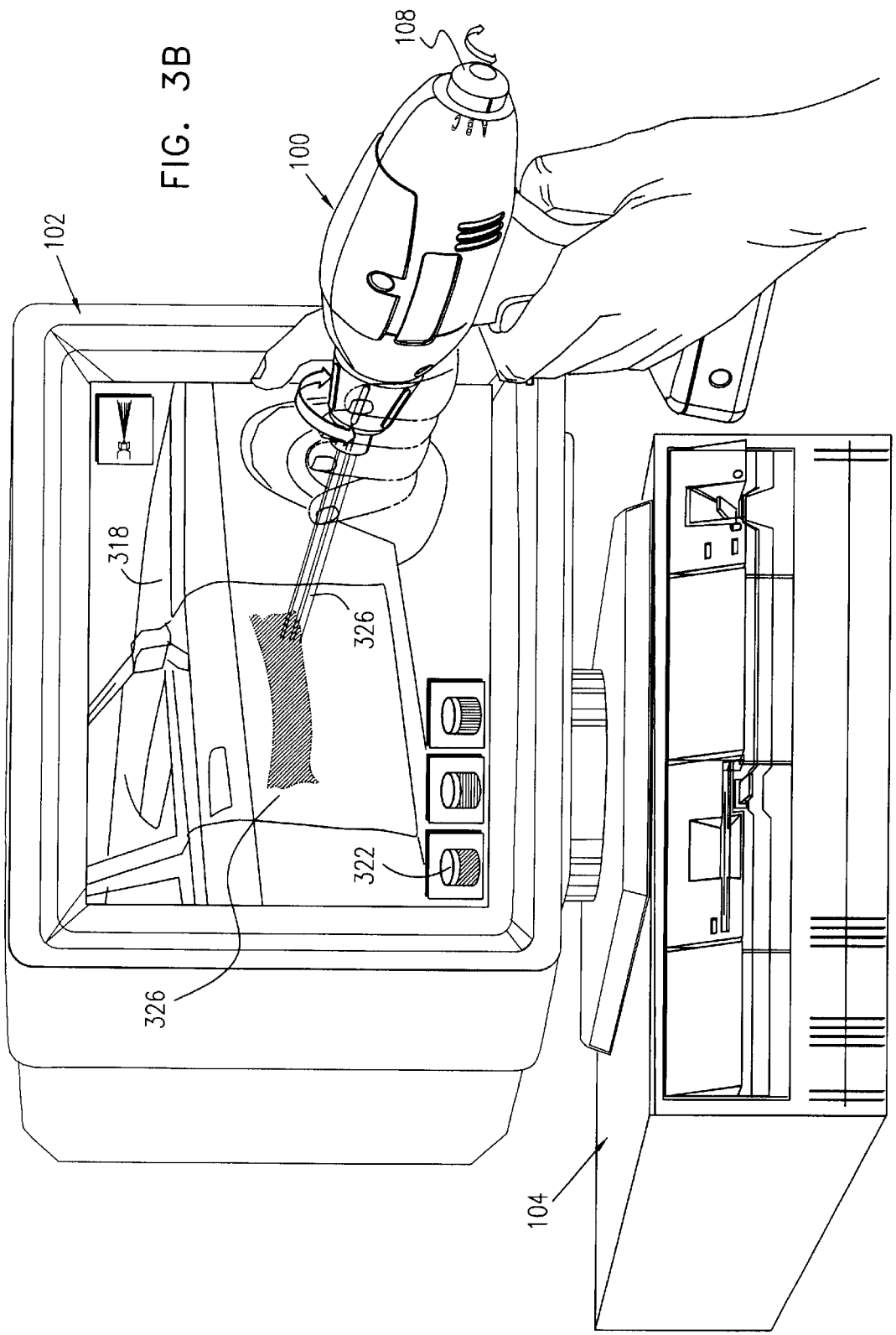

Reference is now made to FIGS. 3A, 3B and 3C, which are each a pictorial illustration of the interactive play system of FIG. 1 being used for a different functionality of a spray paint function, indicated graphically in FIG. 1 at reference numeral 116. As seen in FIGS. 3A, 3B and 3C, the power tool functions as a spray gun and is shown in operative painting engagement with a door 316 on a vehicle 318.

It is noted with reference to the embodiments of FIGS. 3A–4C that a two-tier functionality selection is provided. One level of functionality selection is effected by positioning of knob 108 and another level of functionality selection, orthogonal to the functionality selection provided by positioning of knob 108, is provided by aiming tool 100 at a functional selection location on the screen 102.

FIG. 3A shows a narrow swath red painting functionality, when knob 108 is positioned at position A and following selection of a red color by aiming the power tool 100 at a red paint can 320. FIG. 3B shows a narrow swath green painting functionality, when knob 108 is positioned at position A and following selection of a green color by aiming the power tool 100 at a green paint can 322. FIG. 3C shows a wide swath blue painting functionality, when knob 108 is positioned at position B and following selection of a blue color by aiming the power tool 100 at a blue paint can 324.

It is a particular feature of a preferred embodiment of the present invention that the tool 100 performs work on an object, such as vehicle 318, when it is pointed at the object and receives an optical input therefrom, as indicated by ray 326.

It is also a particular feature of a preferred embodiment of the present invention that the tool 100 may display force and/or auditory feedback in accordance with its function and functionality. This feedback may be in the form of vibrations or other types of forces and sounds which represent the function and functionality currently being carried out by the tool.

Figure 4A:
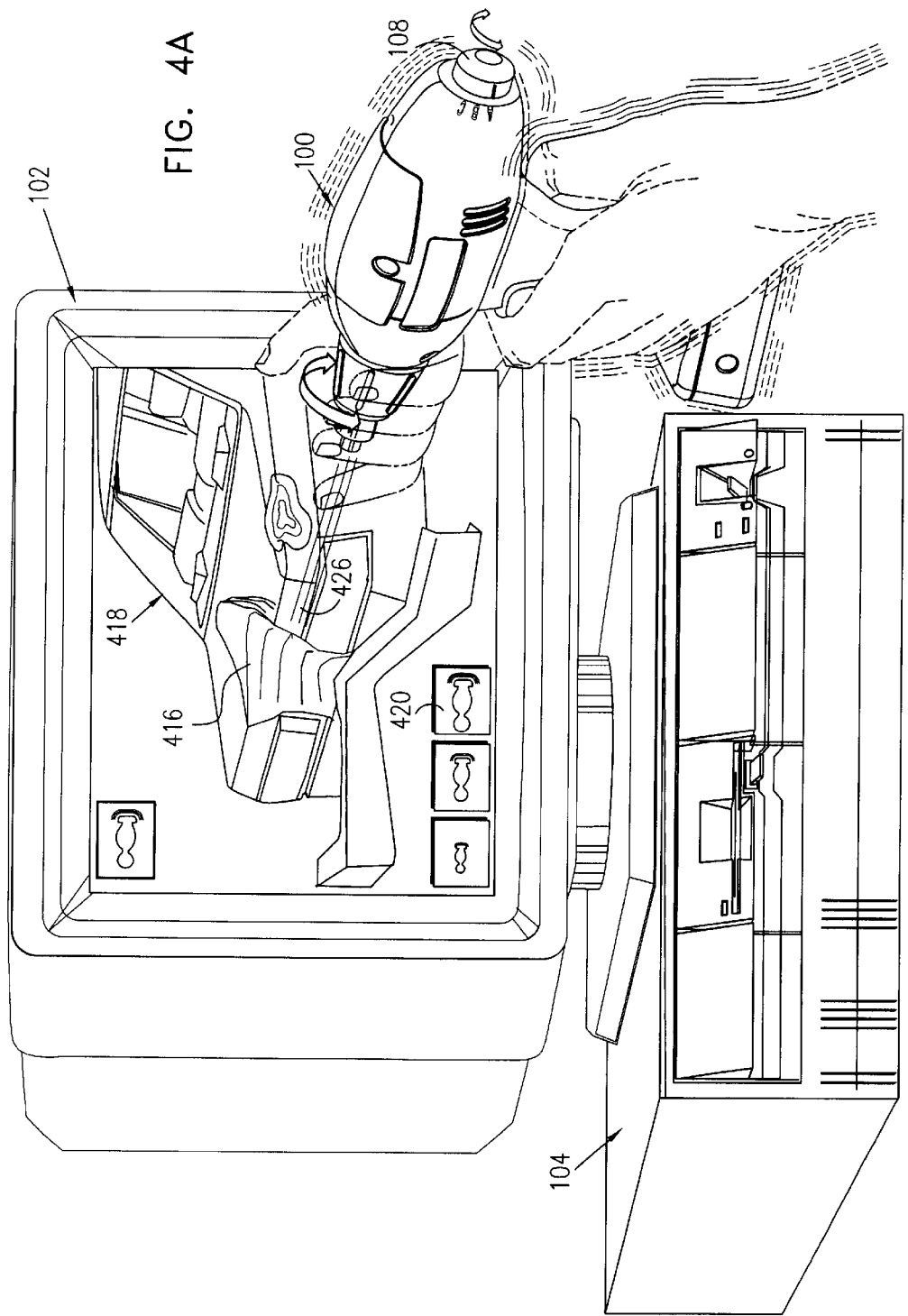
Figure 4C:
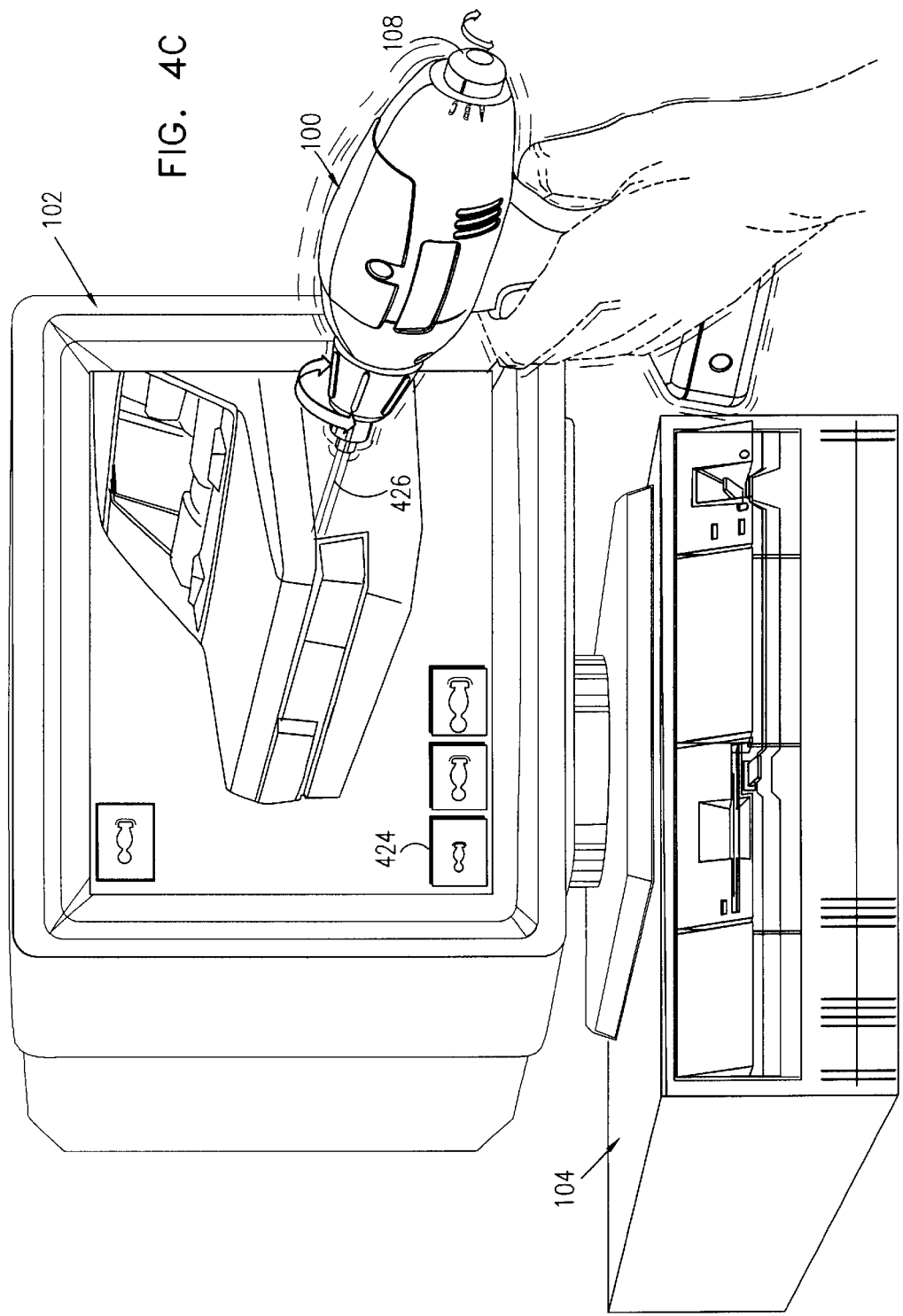

Reference is now made to FIGS. 4A, 4B and 4C, which are each a pictorial illustration of the interactive play system of FIG. 1 being used for a different functionality of a hammer function, indicated graphically in FIG. 1 at reference numeral 118. As seen in FIGS. 4A, 4B and 4C, the power tool functions as a hammer and is shown in operative working engagement with a body 416 on a vehicle 418.

FIG. 4A shows a large amplitude, large hammer, hammering functionality, when knob 108 is positioned at position A and following selection of a large hammer by aiming the power tool 100 at a large hammer 420. FIG. 4B shows a large amplitude, medium hammer painting functionality, when knob 108 is positioned at position A and following selection of a medium hammer by aiming the power tool 100 at a medium hammer 422. FIG. 4C shows a small amplitude, small hammer, hammering functionality, when knob 108 is positioned at position C and following selection of a small hammer by aiming the power tool 100 at a small hammer 424.

It is a particular feature of a preferred embodiment of the present invention that the tool 100 performs work on an object, such as body 416, when it is pointed at the object and receives an optical input therefrom, as indicated by ray 426.

It is also a particular feature of a preferred embodiment of the present invention that the tool 100 may display force feedback in accordance with its function and functionality. This force feedback may be in the form of vibrations or other types of forces which represent the function and functionality currently being carried out by the tool. Auditory feedback may be provided in each embodiment of the invention as appropriate to the selected function and functionality.

Reference is now made to FIG. 5, which is a pictorial illustration of an opening screen provided by an interactive play system constructed and operative in accordance with another preferred embodiment of the present invention. As seen in FIG. 5, the interactive play system comprises a multifunctional and multifunctionality tool generally indicated by reference numeral 500. Tool 500 operates interactively with a display screen 502, which is typically connected with a computer 504, such as a personal computer, or alternatively a game computer or a computer incorporated within a television receiver.

It the illustrated embodiment of FIG. 5, the tool 500 is presented in the form of a power tool and has a function control facility, which is actuated by suitable positioning or rotation of a chuck portion 506 thereof. In accordance with a preferred embodiment of the present invention, the tool 500 also has a functionality control facility, which is actuated by suit able positioning of a knob 508 in one of a plurality of positions, here indicated by markings 510.

It is appreciated that the tool 500 of FIG. 5 may be identical mechanically and in appearance to the tool 100 of FIG. 1, but nevertheless may have an entirely different selection of functions and functionalities which selection may beg determined by software resident in the computer 504. Such software may be supplied to the computer via any suitable medium, such as a chip, a diskette, a CD ROM or by download via the Internet. The embodiment of FIGS. 5–8B relates to a carpentry play environment having various selectable carpentry functions and functionalities.

In the embodiment of FIG. 5, a working environment is shown on display screen 502. Preferably, but not necessarily, images 512 showing different possible functions of tool 500 are illustrated. It is noted that in the embodiment of FIGS. 5–8B, not only the workpiece but also the tool is seen on the display screen 502. This is in contrast to the embodiment of FIGS. 1–4C, wherein the tool is not seen on the screen. It is appreciated that depending on the function and functionality and the choice of the play designer, the tool may or may not be pictured on the screen.

It is a particular feature of a preferred embodiment of the present invention that the tool 500 performs work on an object shown on display screen 502 and that the process and result of the work is also shown on the display screen 502. This provides enhanced play value for the user, as may be appreciated from the description of FIGS. 6A–8B which follows.

Reference is now made to FIGS. 6A, 6B and 6C, which are each a pictorial illustration of the interactive play system of FIG. 5 being used for a different functionality of a drilling function, indicated graphically in FIG. 5 at reference numeral 514. As seen in FIGS. 6A, 65 and 6C, the power tool 500 functions as a drill and is shown in operative working engagement with a piece of lumber 618.

FIG. 6A shows an clockwise drilling functionality, when knob 508 is positioned at position A. FIG. 6B shows a counterclockwise drilling functionality, when knob 508 is positioned at position B and FIG. 6C shows a hammer-drill functionality for hammer-drilling, as into masonry 620, when knob 508 is positioned at position C.

It is a particular feature of a preferred embodiment of the present invention that the tool 500 performs work on an object, such as the piece of lumber 618, when it is pointed at the object and receives an optical input therefrom, as indicated by ray 622.

It is also a particular feature of a preferred embodiment of the present invention that the tool 500 may display force feedback in accordance with its function and functionality. This force feedback may be in the form of vibrations or other types of forces which represent the function and functionality currently being carried out by the tool.

Figure 7C:
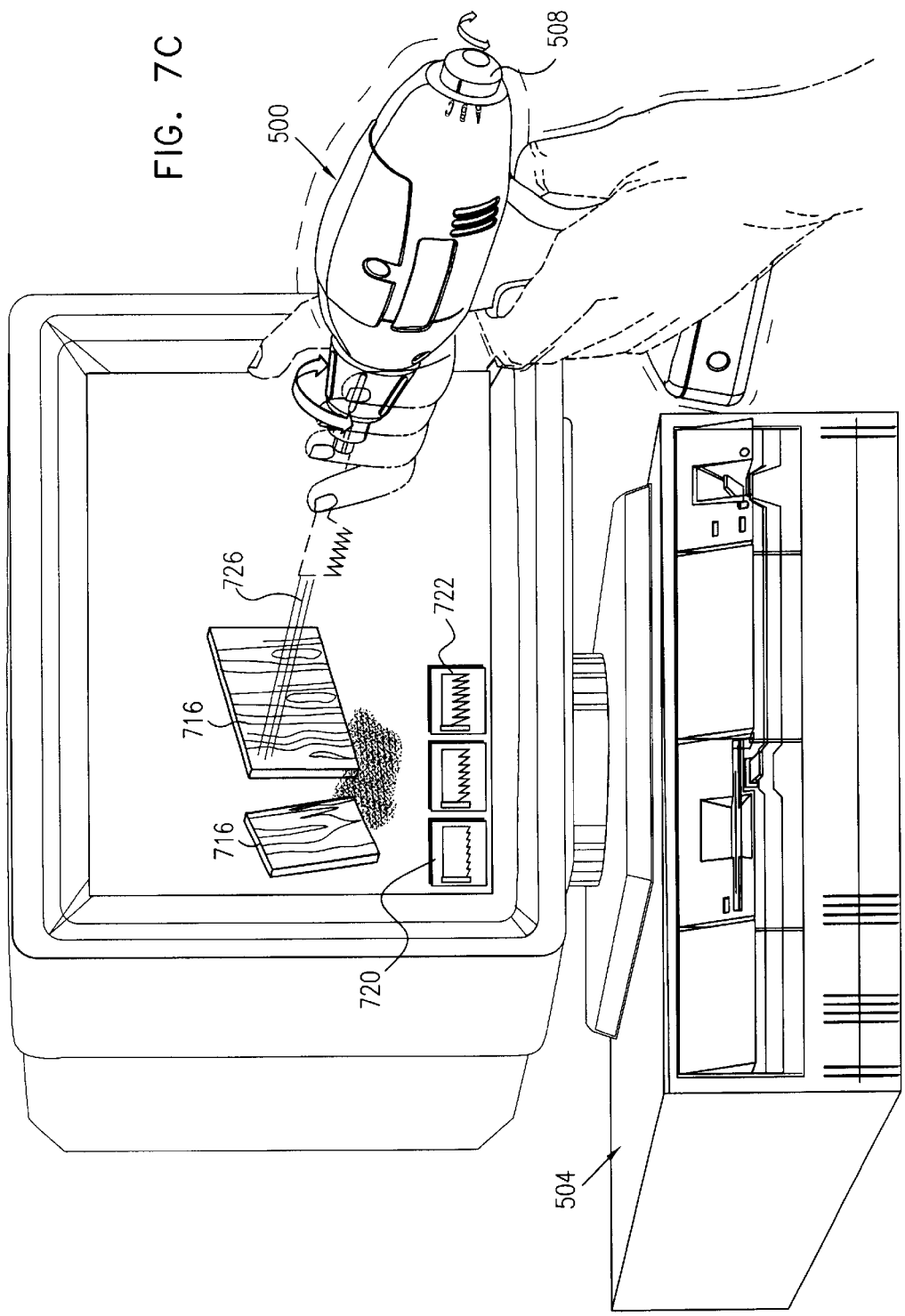

Reference is now made to FIGS. 7A, 7B and 7C, which are each a pictorial illustration of the interactive play system of FIG. 5 being used for a different functionality of a sawing function, indicated graphically in FIG. 5 at reference numeral 516. As seen in FIGS. 7A, 7B and 7C, the power tool functions as a saw and is shown in operative sawing engagement with a piece of lumber 716.

It is noted with reference to the embodiments of FIGS. 7A–8B that a two-tier functionality selection is provided. One level of functionality selection is effected by positioning of knob 508 and another level of functionality selection, orthogonal to the functionality selection provided by positioning of knob 508, is provided by aiming tool 500 at a functional selection location on the screen 502.

FIG. 7A shows a small amplitude, small bite sawing functionality, when knob 508 is positioned at position A and following selection of a low bite functionality by aiming the power tool 500 at a low bite saw 720. FIG. 7B shows a large amplitude, small bite sawing functionality, when knob 508 is positioned at position C and following selection of a small bite functionality by aiming the power tool 500 at small bite saw 720. FIG. 7C shows a high amplitude, high bite sawing functionality, when knob 508 is positioned at position C and following selection of a large bite functionality by aiming the power tool 500 at a wide bite saw 722.

It is a particular feature of a preferred embodiment of the present invention that the tool 500 performs work on an object, such as piece of lumber 718, when it is pointed at the object and receives an optical input therefrom, as indicated by ray 726.

It is also a particular feature of a preferred embodiment of the present invention that the tool 500 may display force and/or auditory feedback in accordance with its function and functionality. This feedback my be in the form of vibrations or other types of forces and sounds which represent the function and functionality currently being carried out by the tool.

Figure 8A:
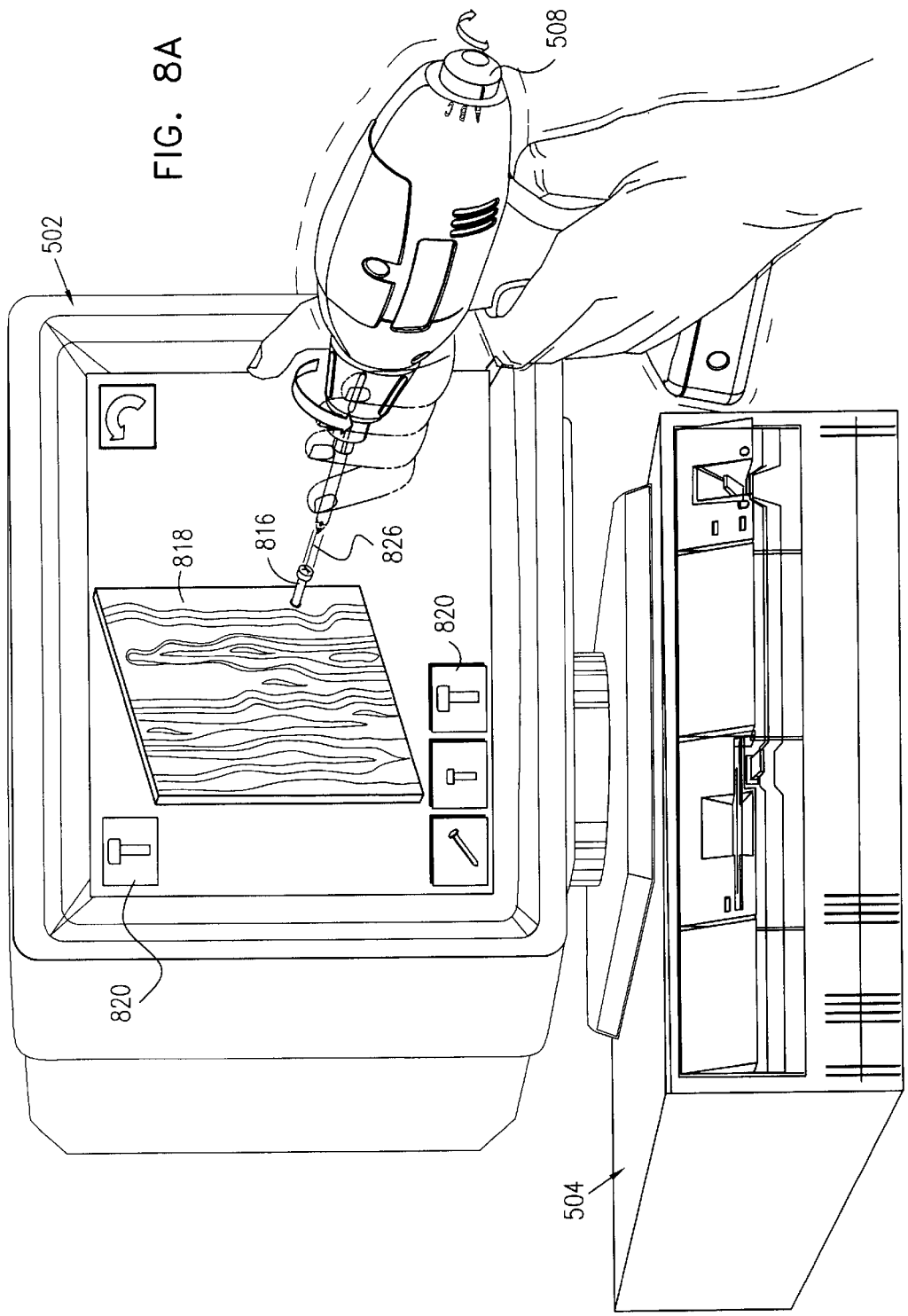

Reference is now made to FIGS. 8A, 8B and 8C, which are each a pictorial illustration of the interactive play system of FIG. 5 being used for a different functionality of a screw and nailing driving functions, respectively, indicated graphically in FIG. 5 at reference numeral 518. As seen in FIGS. 8A and 8B, the power tool 500 functions as a screwdriver and is shown in FIG. 8A in operative working engagement with a screw 816 and a piece of lumber 818.

FIG. 8A shows a counterclockwise, large screw unscrewing functionality, when knob 508 is positioned at position A and following selection of a large screw by aiming the power tool 500 at a large screw 820. FIG. 8B shows a clockwise, medium screw 822, screw driving functionality, when knob 508 is positioned at position B and following selection of a medium screw by aiming the power tool 500 at a medium screw 822.

As seen in FIG. 8C, the power tool 500 functions as a nail driving functionality in operative working engagement with a nail 824, and the nail 828, when knob 508 is positioned at position C and following selection of nail hammering by aiming the power tool 500 at the nail 828.

It is a particular feature of a preferred embodiment of the present invention that the tool 500 performs work on an object, such as the screw 816 or nail 828 and the piece of lumber 818, when it is pointed at the object and receives an optical input therefrom, as indicated by ray 826.

It is also a particular feature of a preferred embodiment of the present invention that the tool 500 may display force feedback in accordance with its function and functionality. This force feedback may be in the form of vibrations or other types of forces which represent the function and functionality currently being carried out by the tool. Auditory feedback may be provided in each embodiment of the invention as appropriate to the selected function and functionality.

Reference is now made to FIG. 9, which is a pictorial illustration of an opening screen provided by an interactive play system constructed and operative in accordance with yet another preferred embodiment of the present invention. As seen in FIG. 9, the interactive play system comprises a multifunctional and multifunctionality tool generally indicated by reference numeral 900. Tool 900 operates interactively with a display screen 902, which is typically connected with a computer 904, such as a personal computer, or alternatively a game computer or a computer incorporated within a television receiver.

In the illustrated embodiment of FIG. 9, the tool 900 is presented in the form of a personal care appliance and has a function control facility, which is actuated by mounting thereon of a suitable functional accessory.

The embodiment of FIGS. 9–12C relates to a personal care play environment having various selectable cosmetic functions and functionalities.

In the embodiment of FIG. 9, a working environment is shown on display screen 902. Preferably, but not necessarily, objects 910 showing different functional accessories, 912, 914 and 916, for tool 900 are illustrated. It is noted that in the embodiment of FIGS. 9–12C, only the model, but not the tool or the functional accessory is seen on the display screen 902. This is in contrast to the embodiment of FIGS. 5–8B, wherein the tool is seen on the screen. It is appreciated that depending on the function and functionality and the choice of the play designer, the tool or a functional accessory may or may not be pictured on the screen.

It is a particular feature of a preferred embodiment of the present invention that the tool 900 performs work on a model shown on display screen 902 and that the process and result of the work is also shown on the display screen 902. This provides enhanced play value for the user, as may be appreciated from the description of FIGS. 10–12C which follows.

Reference is now made to FIG. 10, which is a pictorial illustration of the interactive play system of FIG. 9 being used for hair cutting. This function is selected by physically placing a hair cutting functional accessory 914 onto tool 900. In this embodiment, only a single functionality is provided.

It is a particular feature of a preferred embodiment of the present invention that the tool 900 performs work on an model, when it is pointed at the model and receives an optical input therefrom, as indicated by ray 1022.

It is also a particular feature of a preferred embodiment of the present invention that the tool 900 may display force feedback in accordance with its function and functionality. This force feedback may be in the form of vibrations or other types of forces which represent the function and functionality currently being carried out by the tool.

Reference is now made to FIG. 11, which is a pictorial illustration of the interactive play system of FIG. 9 being used for a hair drying function. This function is selected by physically placing a hair drying functional accessory 912 onto tool 900. In this embodiment, only a single functionality is provided.

It is a particular feature of a preferred embodiment of the present invention that the tool 900 performs work on an model when it is pointed at the model and receives an optical input therefrom, as indicated by ray 1126.

It is also a particular feature of a preferred embodiment of the present invention that the tool 900 may display force and/or auditory feedback in accordance with its function and functionality. This feedback may be in the form of vibrations or other types of forces and sounds which represent the function and functionality currently being carried out by the tool.

Figure 12B:
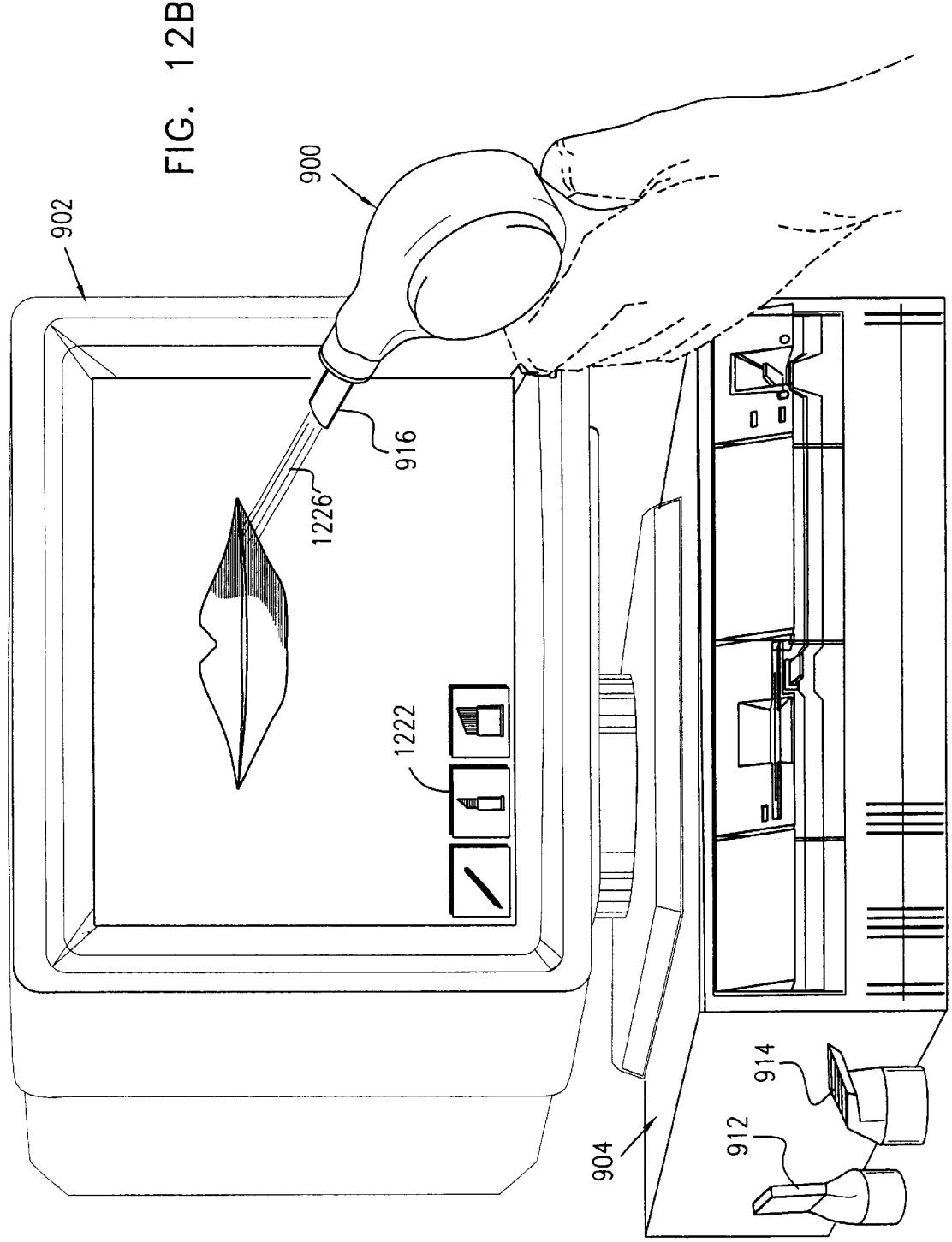

Reference is now made to FIGS. 12A, 12B and 12C, which are each a pictorial illustration of the interactive play system of FIG. 9 being used for a different functionality of a lipstick application function. This function is selected by physically placing a lipstick applicator accessory 916 (FIG. 9) onto tool 900. In this embodiment, three functionalities are provided.

FIG. 12A shows wide lipstick application following selection of a wide lipstick functionality by aiming the personal care appliance 900 at a wide lipstick applicator 1220. FIG. 12B shows medium lipstick application following selection of a medium lipstick functionality by aiming the personal care appliance 900 at a medium lipstick applicator 1222. FIG. 12C shows narrow lipstick application following selection of a narrow lipstick functionality by aiming the personal care appliance 900 at a narrow lipstick applicator 1224.

It is a particular feature of a preferred embodiment of the present invention that the tool 900 performs work on an model when it is pointed at the model and receives an optical input therefrom, as indicated by ray 1226.

Reference is now made to FIG. 13, which is a pictorial illustration of an opening screen provided by an interactive play system constructed and operative in accordance with another preferred embodiment of the present invention. As seen in FIG. 13, the interactive play system comprises a multifunctional and multifunctionality wand-shaped tool generally indicated by reference numeral 1300. Tool 1300 operates interactively with a display screen 1302, which is typically connected with a computer 1304, such as a personal computer, or alternatively a game computer or a computer incorporated within a television receiver.

In the illustrated embodiment of FIG. 13, the wand-shaped tool 1300 has a function control facility, which is determined by play software normally resident in computer 1304. A given function is typically actuatable by employing a push button 1306. In accordance with a preferred embodiment of the present invention, the wand-shaped tool 1300 also has a functionality control facility, which is actuated by suitable movement of the wand-shaped tool 1300 within a predetermined proximity of the screen 1302.

In the embodiment of FIG. 13, a fantasy environment is shown on display screen 1302. It is appreciated that depending on the function and functionality and the choice of the play designer, the wand-shaped tool 1300 may or may not be pictured on the screen.

It is a particular feature of a preferred embodiment of the present invention that the wand-shaped tool 1300 performs magic on an object 1308 shown on display screen 1302 and that the process and result of the magic is also shown on the display screen 1302. This provides enhanced play value for the user, as may be appreciated from the description of FIGS. 14A–16B, which follows.

Figure 14A:
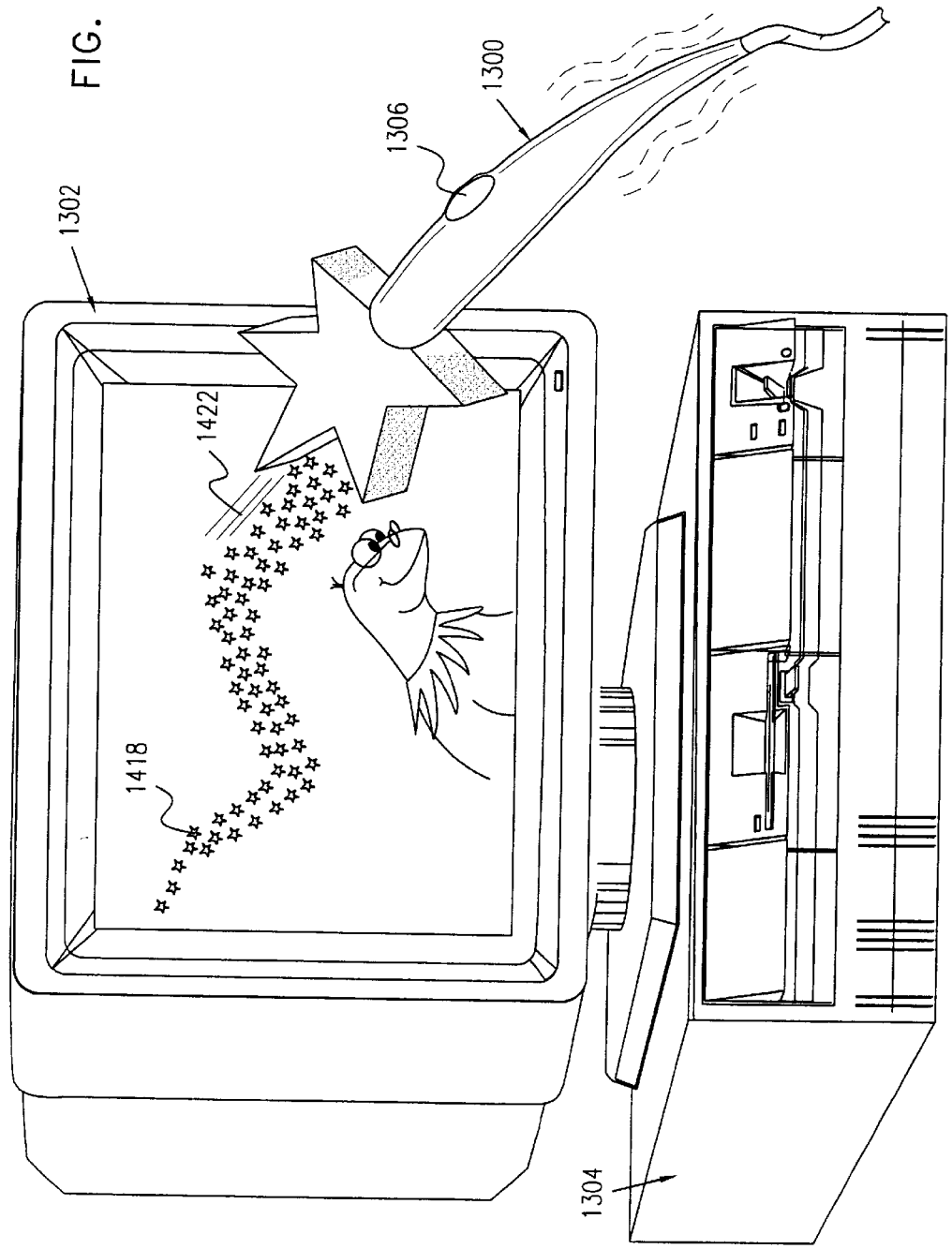
FIGS. 14A and 14B are each a pictorial illustration of the interactive play system of FIG. 13 being used for a different functionality of a transfiguration function.
Figure 14B:
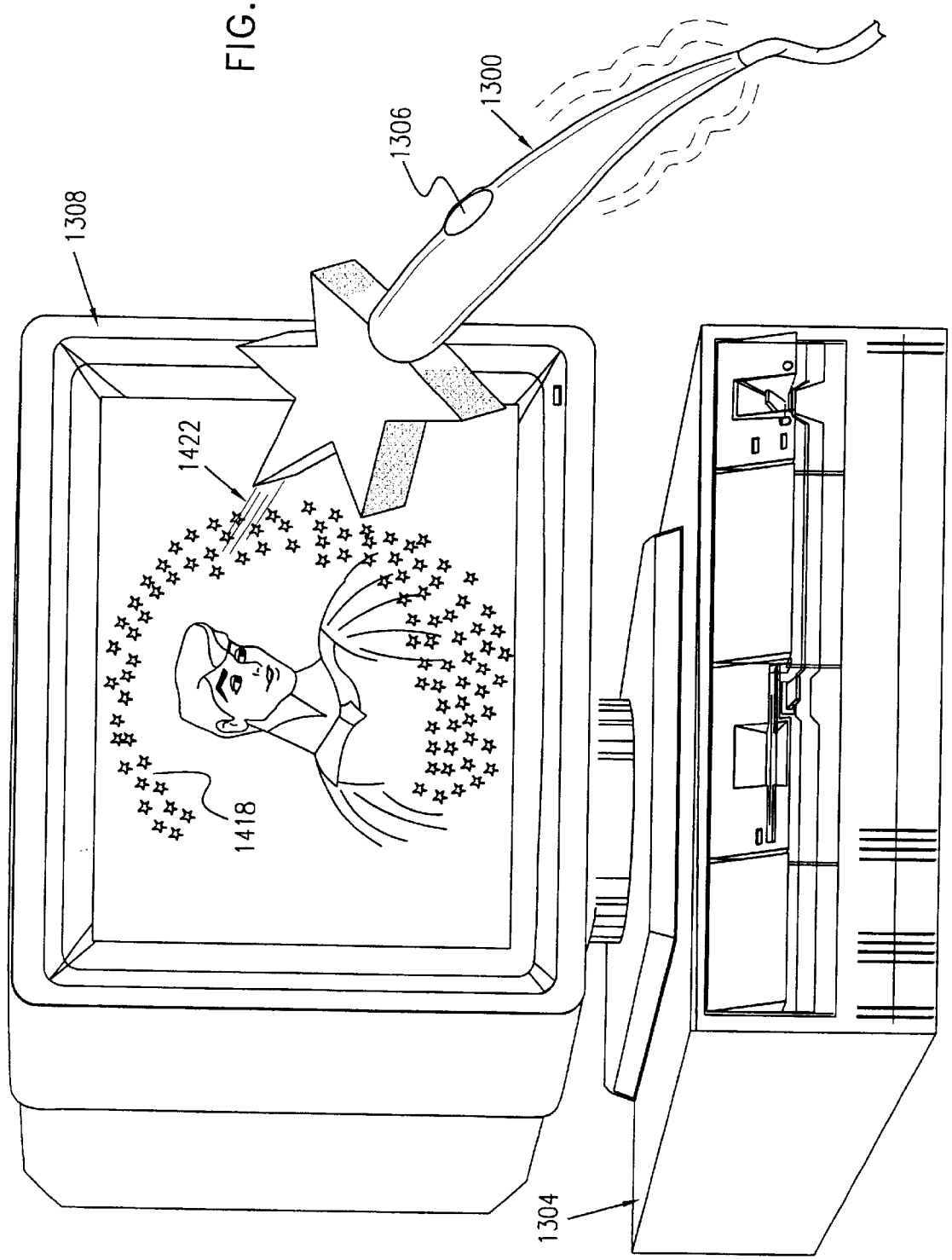

Reference is now made to FIGS. 14A and 14B, which are each a pictorial illustration of the interactive play system of FIG. 13 being used for a different functionality of a transfiguration. As seen in FIGS. 14A and 14B, the wand-shaped tool 1300 functions as a transfigurator and is shown in operative transfigurating engagement with a prince and a frog, for changing one into the other. The transfiguration function is normally accompanied by a display of pixie dust 1418.

FIG. 14A shows a wavelike motion of the wand-shaped tool 1300 to produce the wave-shaped pixie dust 1418 relative to the screen 1302, which produces a frog to prince transfiguration functionality. FIG. 14B shows a clockwise motion of the wand-shaped tool which produces a prince to frog transfiguration functionality.

It is a particular feature of a preferred embodiment of the present invention that the wand-shaped tool 1300 performs magic on an object when it is pointed at the object and receives an optical input therefrom, as indicated by ray 1422. In the present embodiment, the motion of the wand-shaped tool is sensed by the wand-shaped tool via a multiplicity of rays received by it as it moves relative to the screen 1302.

It is also a particular feature of a preferred embodiment of the present invention that the wand-shaped tool 1300 may display force feedback in accordance with its function and functionality. This force feedback may be in the form of vibrations or other types of forces which represent the function and functionality currently being carried out by the wand-shaped tool 1300.

Figure 15B:
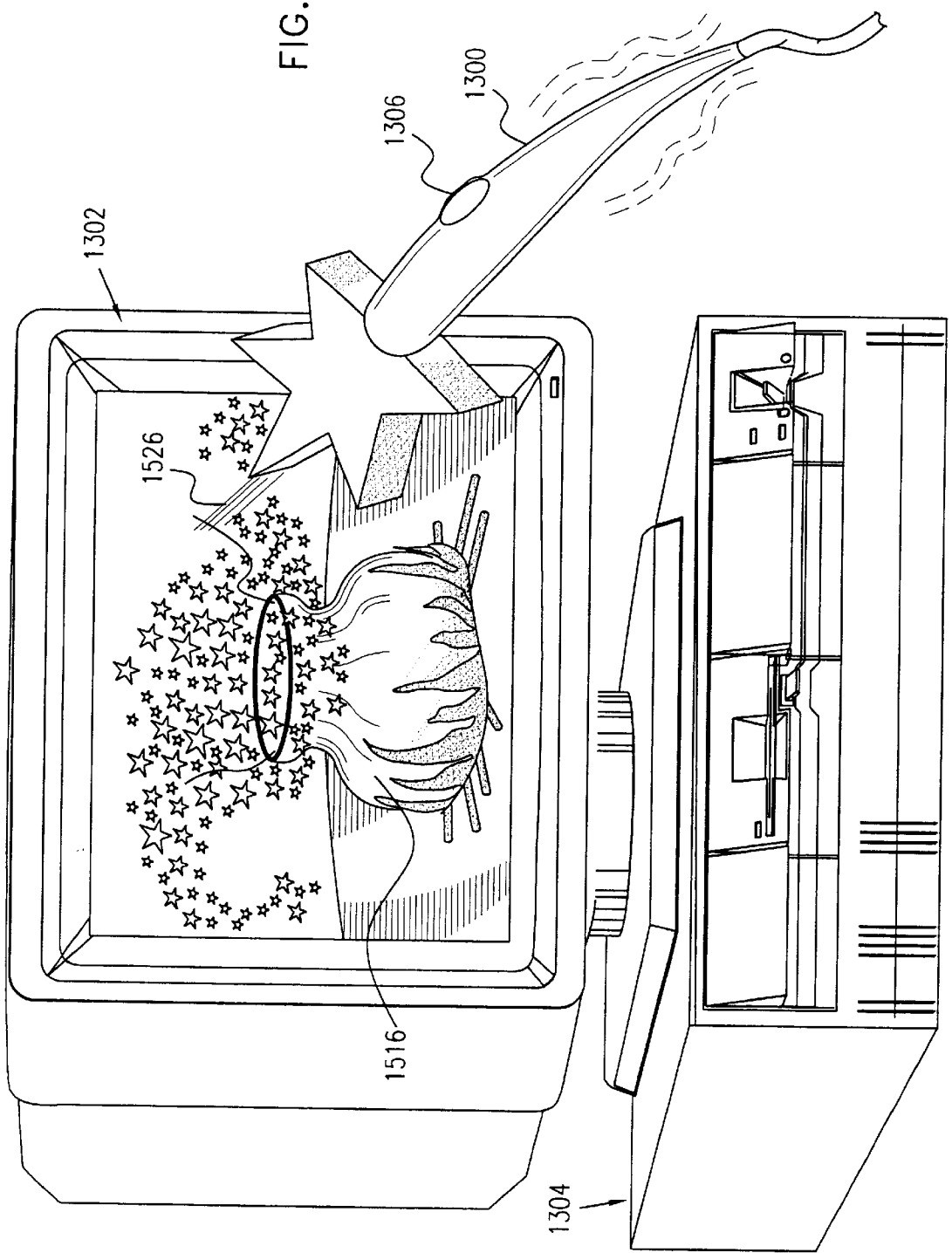

Reference is now made to FIGS. 15A and 15B, which are each a pictorial illustration of the interactive play system of FIG. 13 being used for a different functionality of an energizing function. As seen in FIGS. 15A and 15B, the wand-shaped tool 1300 functions as an energizer and is shown in operative energizing engagement with a pot 116.

It is noted with reference to the embodiments of FIGS. 15A–16B that a two-tier function selection is provided. One level of function selection is effected by the resident software in computer 1304 while the actuation of the function made available by the resident software is effected typically by toggling button 1306.

FIG. 15A shows a pot 1516 over a fire prior to effecting energization thereof. FIG. 15B shows energization of the pot by a predetermined type of motion of the wand-shaped tool relative to screen 1302.

It is a particular feature of a preferred embodiment of the present invention that the wand-shaped tool 1300 performs magic on an object, such as pot 1516, when it is pointed at the object and receives an optical input therefrom, as indicated by ray 1526.

It is also a particular feature of a preferred embodiment of the present invention that the wand-shaped tool 1300 may display force and/or auditory feedback in accordance with its function and functionality. This feedback may be in the form of vibrations or other types of forces and sounds which represent the function and functionality currently being carried out by the wand-shaped tool 1300.

Figure 16A:
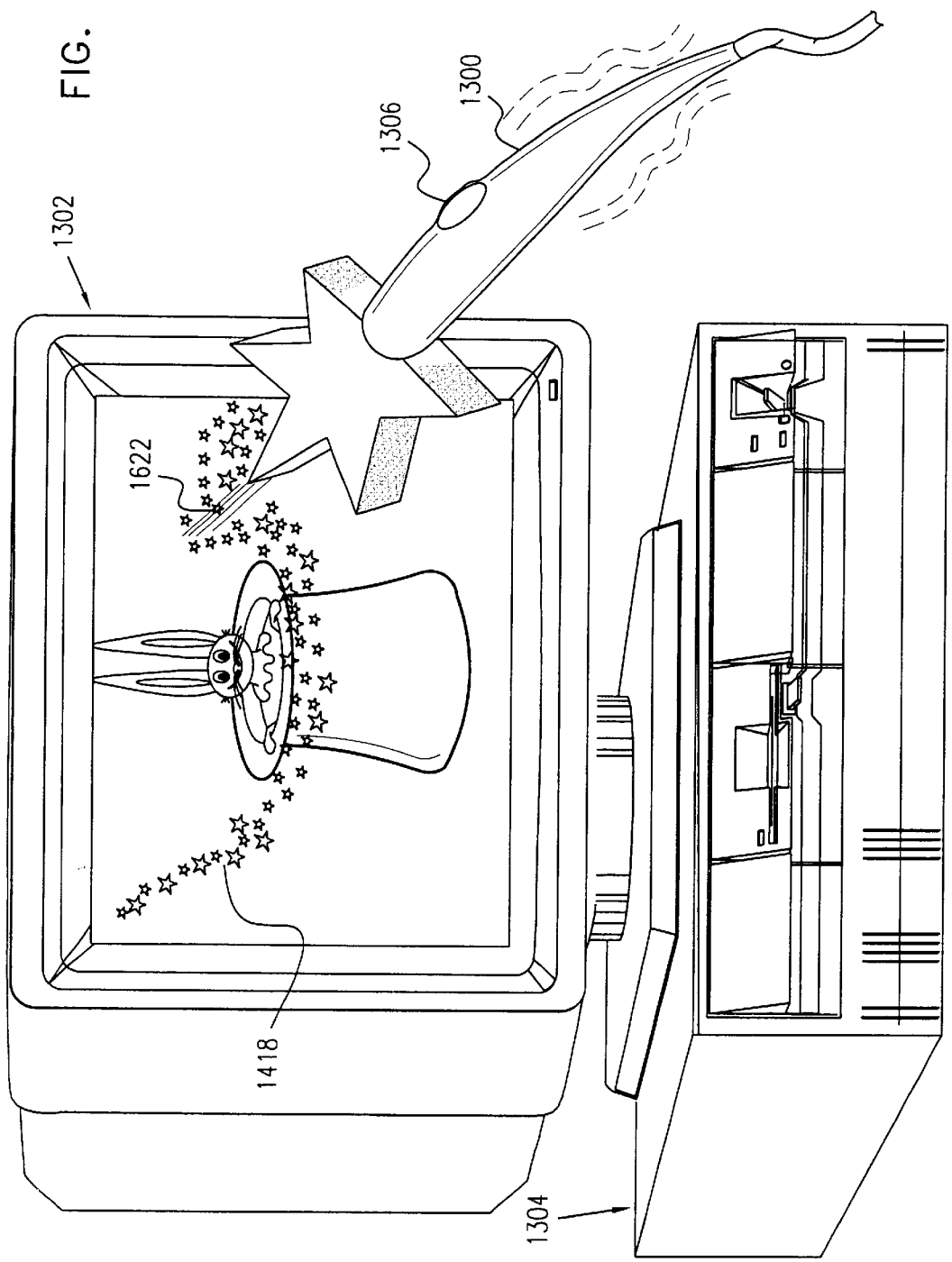
FIGS. 16A and 16B are each a pictorial illustration of the interactive play system of FIG. 13 being used for a different functionality of an appearance/disappearance function.
Figure 16B:
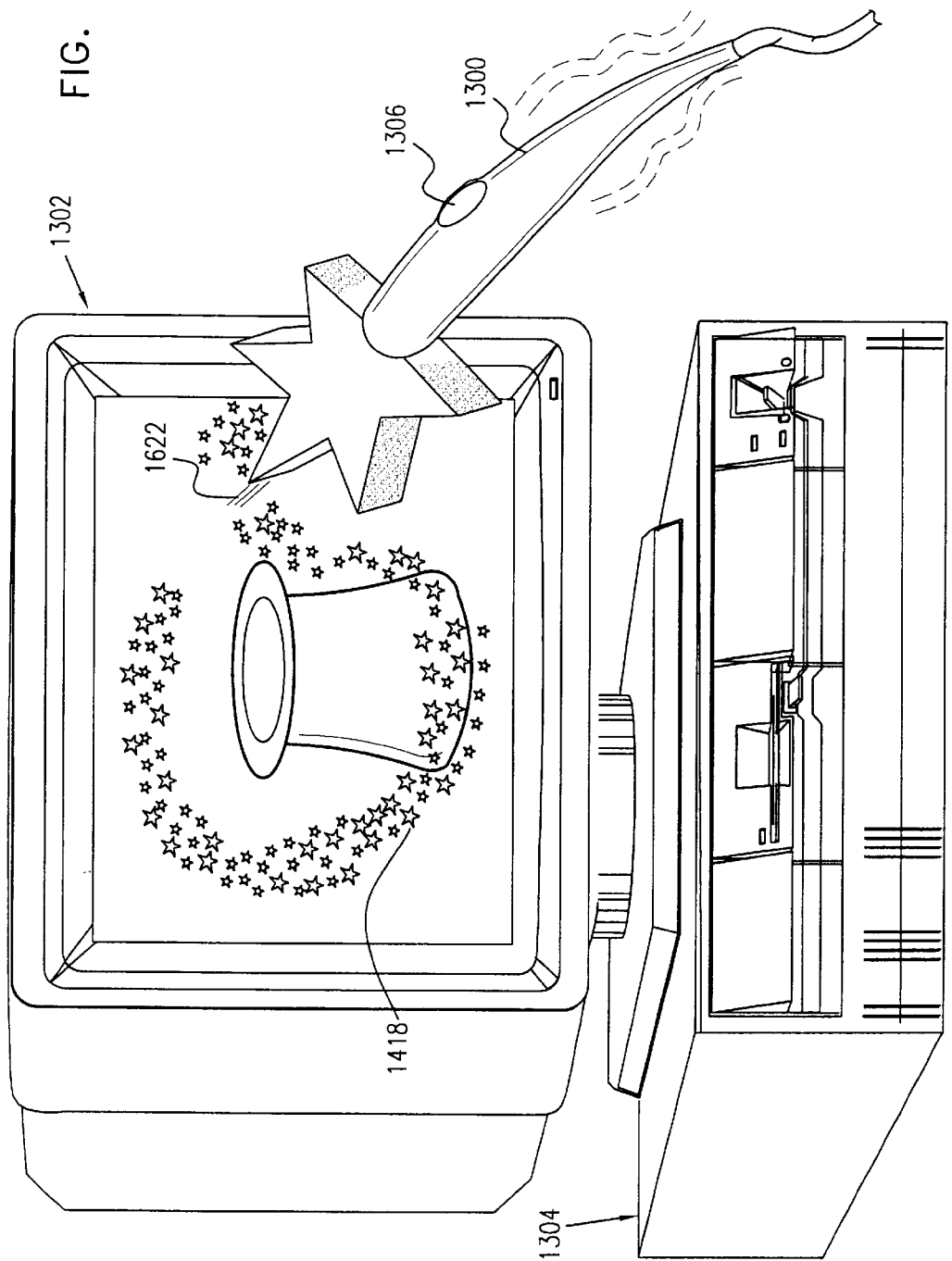

Reference is now made to FIGS. 16A and 16B, which are each a pictorial illustration of the interactive play system of FIG. 13 being used for a different functionality, of an appearing/disappearing function. As seen in FIGS. 16A and 16B, the wand-shaped tool functions as a creator/destroyer and is shown in operative engagement with a rabbit in a hat, for selectively making the rabbit appear or disappear. The appearance and disappearance functions are normally accompanied by a display of pixie dust 1418.

FIG. 16A shows a wavelike motion of the wand-shaped tool relative to the screen 1302, which produces a rabbit disappearance functionality. FIG. 16B show a counterclockwise motion of the wand-shaped tool which produces a rabbit appearance functionality.

It is a particular feature of a preferred embodiment of the present invention that the wand-shaped tool 1300 performs magic on an object when it is pointed at the object and receives an optical input therefrom, as indicated by ray 1622. In the present embodiment, the motion of the wand-shaped tool is sensed by the wand-shaped tool via a multiplicity of rays received by it as it moves relative to the screen 1302.

It is also a particular feature of a preferred embodiment of the present invention that the wand-shaped tool 1300 may display force feedback in accordance with its function and functionality. This force feedback may be in the form of vibrations or other types of forces which represent the function and functionality currently being carried out by the wand-shaped tool. Auditory feedback may be provided in each embodiment of the invention as appropriate to the selected function and functionality.

Reference is now made to FIG. 17, which is a pictorial illustration of an opening screen provided by an interactive play system constructed and operative in accordance with another preferred embodiment of the present invention. As seen in FIG. 17, the interactive plays system comprises a multifunctional and multifunctionlity sports figure-shaped tool generally indicated by reference numeral 1700. Tool 1700 operates interactively with a display screen 1702, which is typically connected with a computer 1704, such as a personal computer, or alternatively a game computer or a computer incorporated within a television receiver.

In the illustrated embodiment of FIG. 17, the sports figure-shaped tool 1700 has a function control facility, which is determined by play software normally resident in computer 1704. A given function is typically actuatable by employing a push button 1706, which normally also produces a physical movement of at least part of the tool. In accordance with a preferred embodiment of the present invention, the sports figure-shaped tool 1700 also has a functionality control facility, which is actuated by mounting a selected sports accessory onto the sports figure-shaped tool 1700 and by motion and timing of motion of the tool 1700 and actuation of push button 1706.

It is noted with reference to the embodiments of FIGS. 17A–20 that a multiple-tier functionality selection is provided. One level of functionality selection is effected by the resident software in computer 1704 while additional ties of functionality selection are effected by motion and timing of motion of the tool 1700 and actuation of push button 1706.

In the embodiment of FIG. 17, a sports environment is shown on display screen 1702. It is appreciated that depending on the function and functionality and the choice of the play designer, the sports figure-shaped tool may or may not be pictured on the screen.

It is a particular feature of a preferred embodiment of the present invention that the sports figure-shaped tool 1700 interacts with the sports environment shown on display screen 1702 and that the play which results from this interaction is also shown on the display screen 1702. This provides enhanced play value for the user, as may be appreciated from the description of FIGS. 18–20 which follows.

Reference is now made to FIG. 18, which is a pictorial illustration of the interactive play system of FIG. 17 being used for batting. The batting function is selected by placing a bat 1800 in the hands of the sports figure-shaped tool. As seen in FIG. 18, the sports figure-shaped tool functions as a batter and is shown in operative engagement with a virtual ball 1802. As seen in FIG. 18, different functionalities result from engagement of the batter with different zones on or near the ball, as indicated on a grid 1804. The location on the ball at which the batter "hits" the ball is determined by the position of the sports figure-shaped tool relative to the screen 1702 and the grid 1802. The different functionalties may be the direction and the distance that the ball is hit.

It is a particular feature of a preferred embodiment of the present invention that the position of the sports figure-shaped tool 1700 is sensed by the sports figure-shaped tool via a ray 1806 received by it as it moves relative to the screen 1702.

It is also a particular feature of a preferred embodiment of the present invention that the sports figure-shaped tool 1700 may display force feedback in accordance with its function and functionality. This force feedback may be in the form of vibrations or other types of forces which represent the function and functionality currently being carried out by the sports figure-shaped tool.

Reference is now made to FIG. 19, which is a pictorial illustration of the interactive play system of FIG. 17 being used for a catching function. This function is selected by attaching a glove 1900 to a hand of the sports figure-shaped tool 1700. As seen in FIG. 19, the sports figure-shaped tool functions as a fielder and is shown in operative engagement with a virtual ball 1902. As seen in FIG. 19, different functionalities result from engagement of the fielder with the ball 1902 at different times and thus at different locations with respect to its travel path. Timing of the catching function may be triggered by user actuation of switch 1706. Thus the catching functionality may be determined both by the position of the sports figure-shaped tool 1700 relative to the ball 1902 and by the timing of actuation of switch 1706. The different catching functionalties may be catching or missing the ball as well as the position of the sports figure-shaped tool at the time of catching.

It is noted with reference to the embodiment of FIG. 19 that a two-tier functionality selection is preferably provided. one level of functionality selection is effected by the positioning of the sports figure-shaped tool 1700. A further level of functionality selection is provided by timing of actuation of switch 1706.

It is a particular feature of a preferred embodiment of the present invention that the sports figure-shaped tool 1700 receives an optical input from the ball 1902, as indicated by ray 1904.

It is also a particular feature of a preferred embodiment of the present invention that the sports figure-shaped tool 1700 may display force and/or auditory feedback in accordance with its function and functionality. This feedback may be in the form of vibrations or other types of forces and sounds which represent the function and functionality currently being carried out by the sports figure-shaped tool. The force feedback may be expressed inter alia in terms of contortions or other movement of the sports figure-shaped tool.

Figure 20:
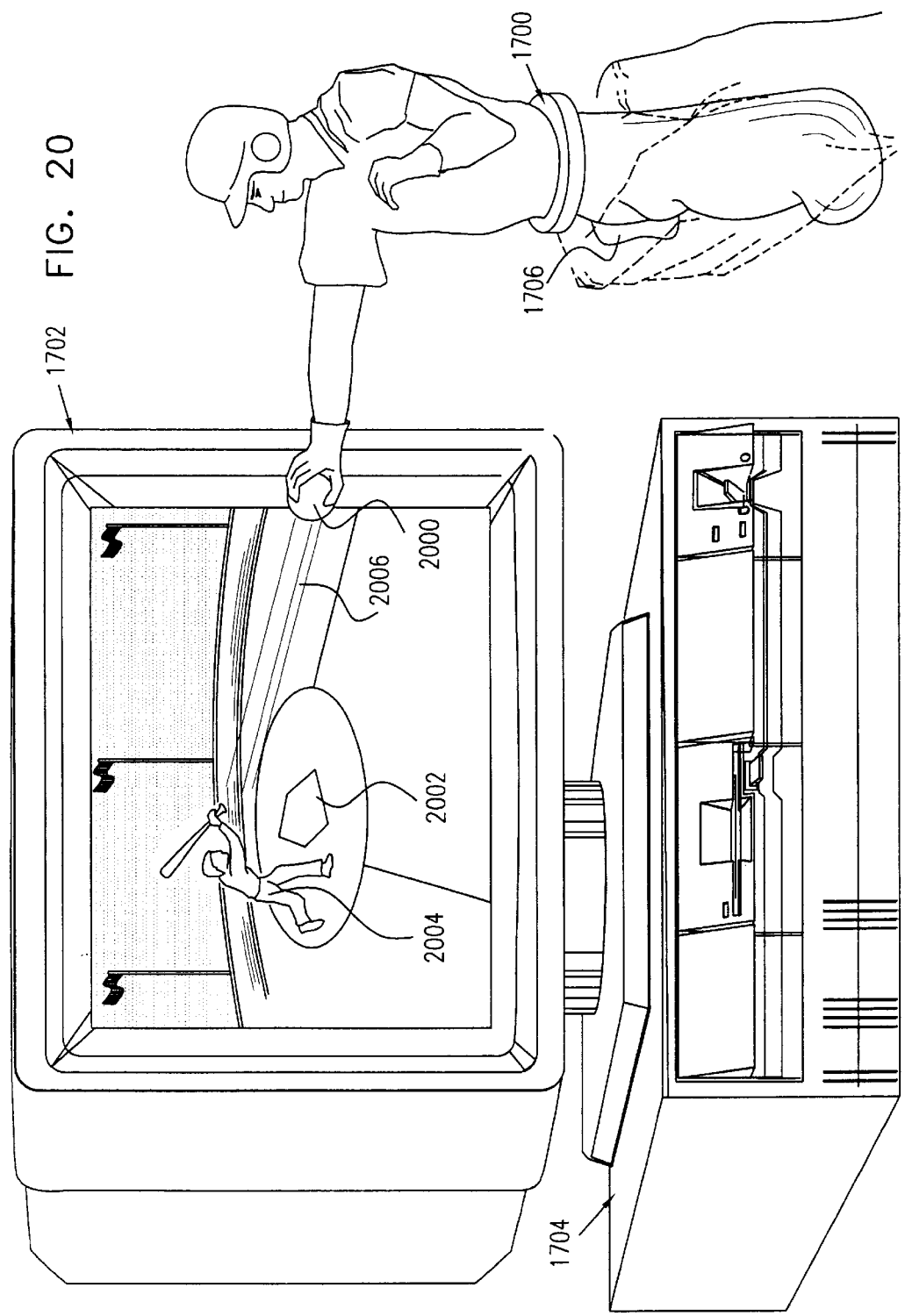
FIG. 20 is a pictorial illustration of the interactive play system of FIG. 17 being used for a running function.

Reference is now made to FIG. 20, which is a pictorial illustration of the interactive play system of FIG. 17 being used for a pitching function. This function is selected by attaching a ball 2000 to a hand of the sports figure-shaped tool 1700. As seen in FIG. 20, the sports figure-shaped tool functions as a pitcher and is shown in operative engagement with a virtual baseball field including a home plate 2002 and a batter 2004.

As seen in FIG. 20, different functionalities result from throwing the ball 2000 at different times and at different orientations with respect to the home plate 2002. Timing of the pitching function may be triggered by user actuation of switch 1706. Thus the pitching functionality may be determined both by the position and orientation of the sports figure-shaped tool 1700 relative to the home plate 2002 and by the timing of actuation of switch 1706. The different pitching functionalties may be expressed inter alia as pitching a strike or a ball.

It is a particular feature of a preferred embodiment of the present invention that the position and orientation of sports figure-shaped tool 1700 is sensed by the sports figure-shaped tool via a ray 2006 received by it from screen 1702.

It is also a particular feature of a preferred embodiment of the present invention that the sports figure-shaped tool 1700 may display force feedback in accordance with its function and functionality. This force feedback may be in the form of vibrations or other types of forces which represent the function and functionality currently being carried out by the sports figure-shaped tool. Auditory feedback may be provided in each embodiment of the invention as appropriate to the selected function and functionality.

Reference is now made to FIG. 21, which is a pictorial illustration of an opening screen provided by an interactive play system constructed and operative in accordance with another preferred embodiment of the present invention. As seen in FIG. 21, the interactive play system comprises a multifunctional and multifunctionality tool generally indicated by reference numeral 2100. Tool 2100 operates interactively with a display screen 2102, which is typically connected with a computer 2104, such as a personal computer, or alternatively a game computer or a computer incorporated within a television receiver.

In the illustrated embodiment of FIG. 21, the tool 2100 is presented in the form of a medical instrument and has a function control facility, which is actuated by pointing the medical instrument at particular icons 2106 on screen 2102. In accordance with a preferred embodiment of the present invention, the tool 2100 also has a functionality control facility, which is also actuated by pointing the medical instrument at particular functionality icons on screen 2102. These icons are not seen on the opening screen in FIG. 21 but are seen in the various function screens, such as those shown in FIGS. 22A–24C. In the embodiment of FIG. 21, a working environment is shown on display screen 2102. It is noted that in the embodiment of FIGS. 21–24C, not only a patient but also the medical instrument is seen on the display screen 2102. This is in contrast to the embodiment of FIGS. 1–4C, wherein the tool is not seen on the screen. It is appreciated that depending on the function and functionality and the choice of the play designer, the tool may or may not be pictured on the screen.

It is a particular feature of a preferred embodiment of the present invention that the tool 2100 operates on a patient 2101 shown on display screen 2102, performing such tasks as diagnosis and treatment, icons 2106, which are also shown on the display screen 2102. This provides enhanced play value for the user, as may be appreciated from the description of FIGS. 22A–24C which follows.

Figure 22A:
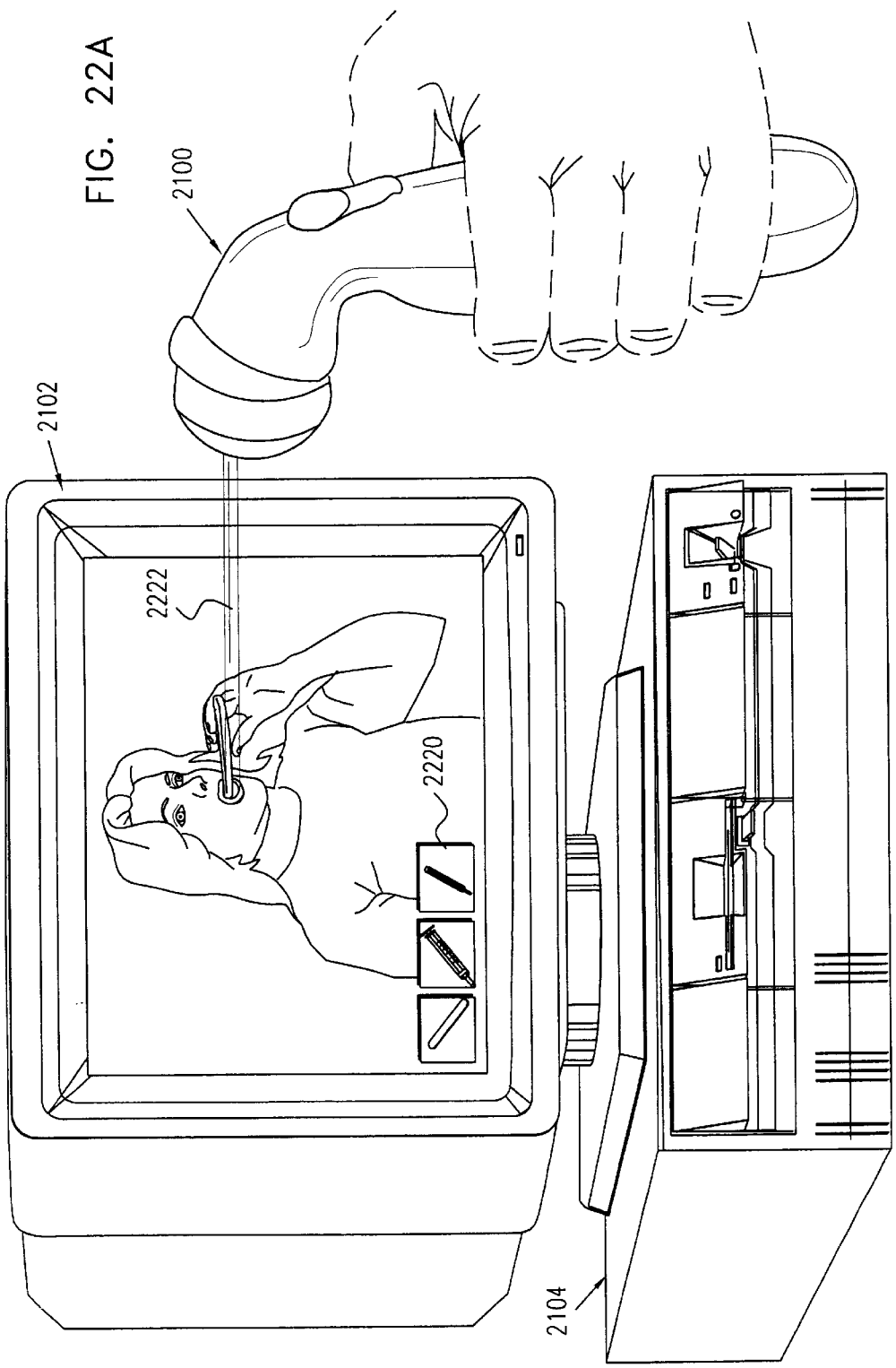
Figure 22C:
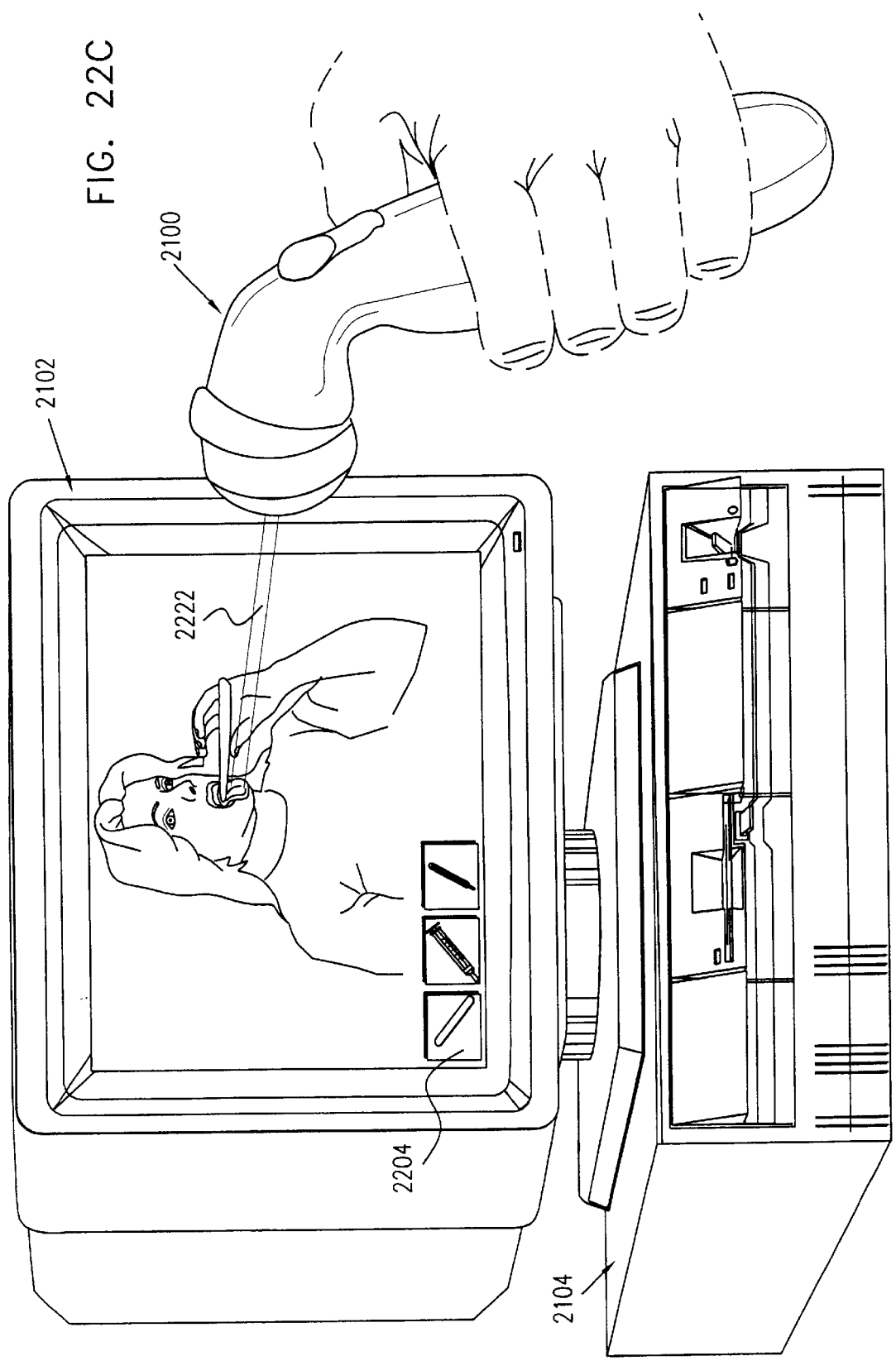

Reference is now made to FIGS. 22A, 22B and 22C, which are each a pictorial illustration of the interactive play system of FIG. 21 being used for a different functionality of a diagnosis function, indicated graphically in FIG. 21 at reference numeral 2114. As seen in FIGS. 22A, 22B and 22C, the medical instrument functions as a diagnostic tool and is shown in operative working engagement with a patient.

FIG. 22A shows a temperature measurement functionality, which is actuated by pointing the medical instrument tool 2100 at an icon 2200. FIG. 22B shows a stethoscope functionality, which is actuated by pointing the medical instrument tool 2100 at an icon 2202. FIG. 22C shows a throat examination functionality which is actuated by pointing the medical instrument tool 2100 at an icon 2204.

It is a particular feature of a preferred embodiment of the present invention that the tool 2100 performs diagnosis on a subject when it is pointed at the subject and receives an optical input therefrom, as indicated by ray 2222.

It is also a particular feature of a preferred embodiment of the present invention that the tool 2100 may display force feedback in accordance with its function and functionality. This force feedback may be in the form of vibrations or other types of forces which represent the function and functionality currently being carried out by the tool.

Figure 23A:
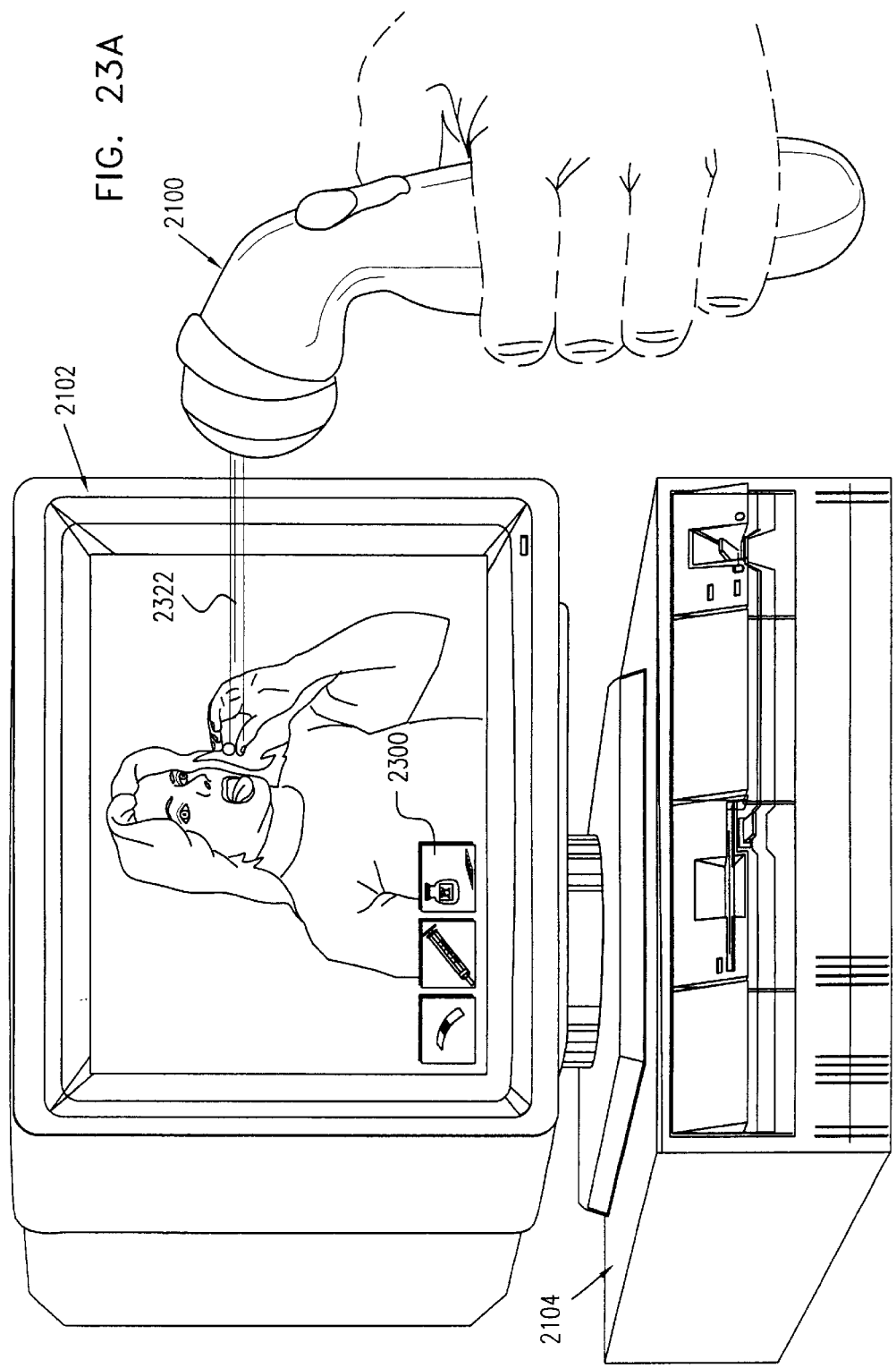
FIGS. 23A, 23B and 23C are each a pictorial illustration of the interactive play system of FIG. 21 being used for a different functionality of a human treatment function.
Figure 23B:
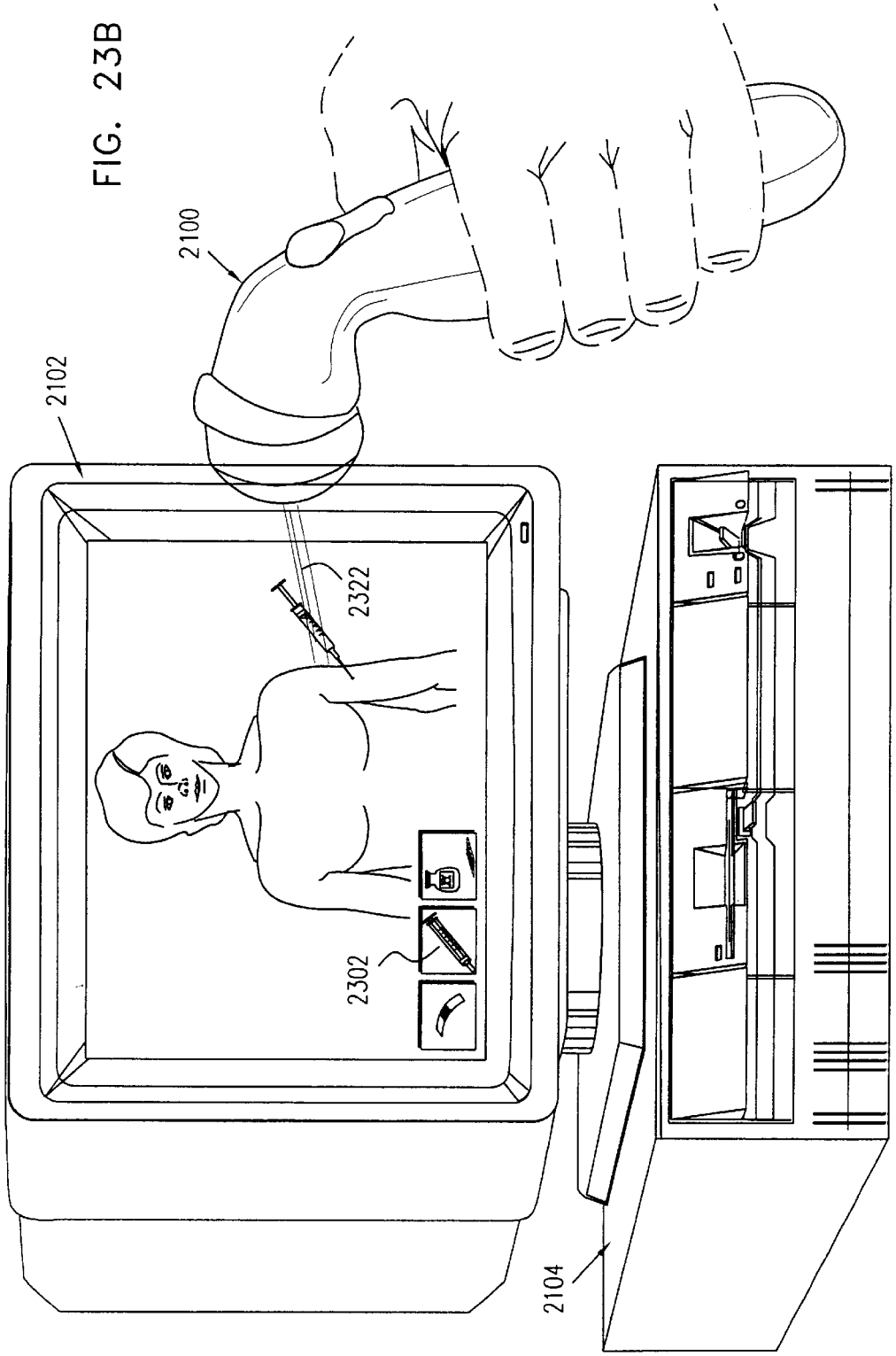
Figure 23C:
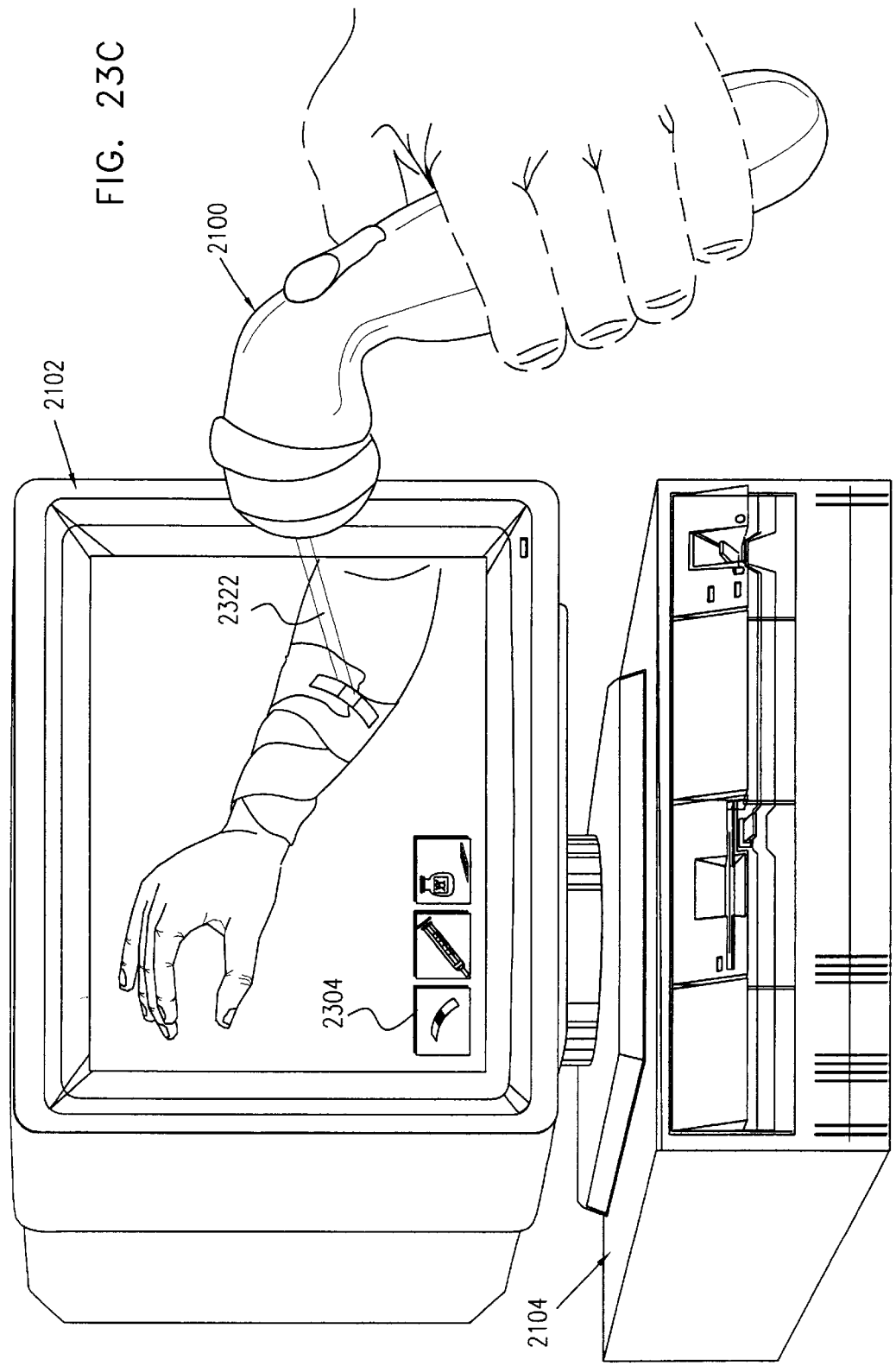

Reference is now made to FIGS. 23A, 23B and 23C, which are each a pictorial illustration of the interactive play system of FIG. 21 being used for a different functionality of a treatment function, indicated graphically in FIG. 21 at reference numeral 2116. As seen in FIGS. 23A, 23B and 23C, the medical instrument 2100 functions as a treatment instrument and is shown in operative treatment engagement with a patient.

FIG. 23A shows a pill taking treatment functionality, which is actuated by pointing the medical instrument tool 2100 at an icon 2300. FIG. 23B shows an injection functionality, which is actuated by pointing the medical instrument tool 2100 at an icon 2302. FIG. 23C shows a bandaging functionality which is actuated by pointing the medical instrument tool 2100 at an icon 2304.

It is a particular feature of a preferred embodiment of the present invention that the tool 2100 performs treatment on a subject when it is pointed at the subject and receives an optical input therefrom, as indicated by ray 2322.

It is also a particular feature of a preferred embodiment of the present invention that the tool 2100 may display force feedback in accordance with its function and functionality. This force feedback may be in the form of vibrations or other types of forces which represent the function and functionality currently being carried out by the tool.

Figure 24A:
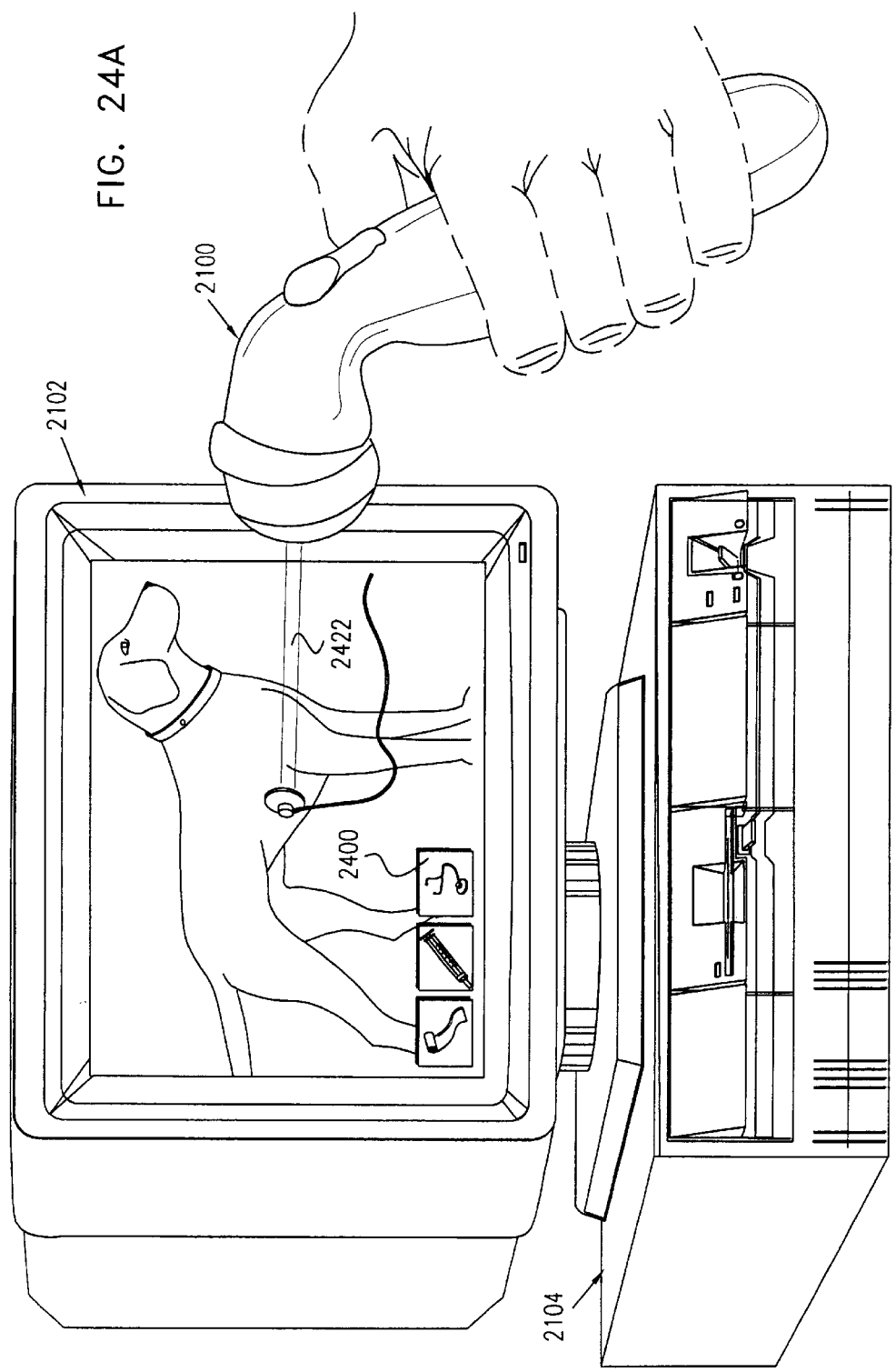
Figure 24B:
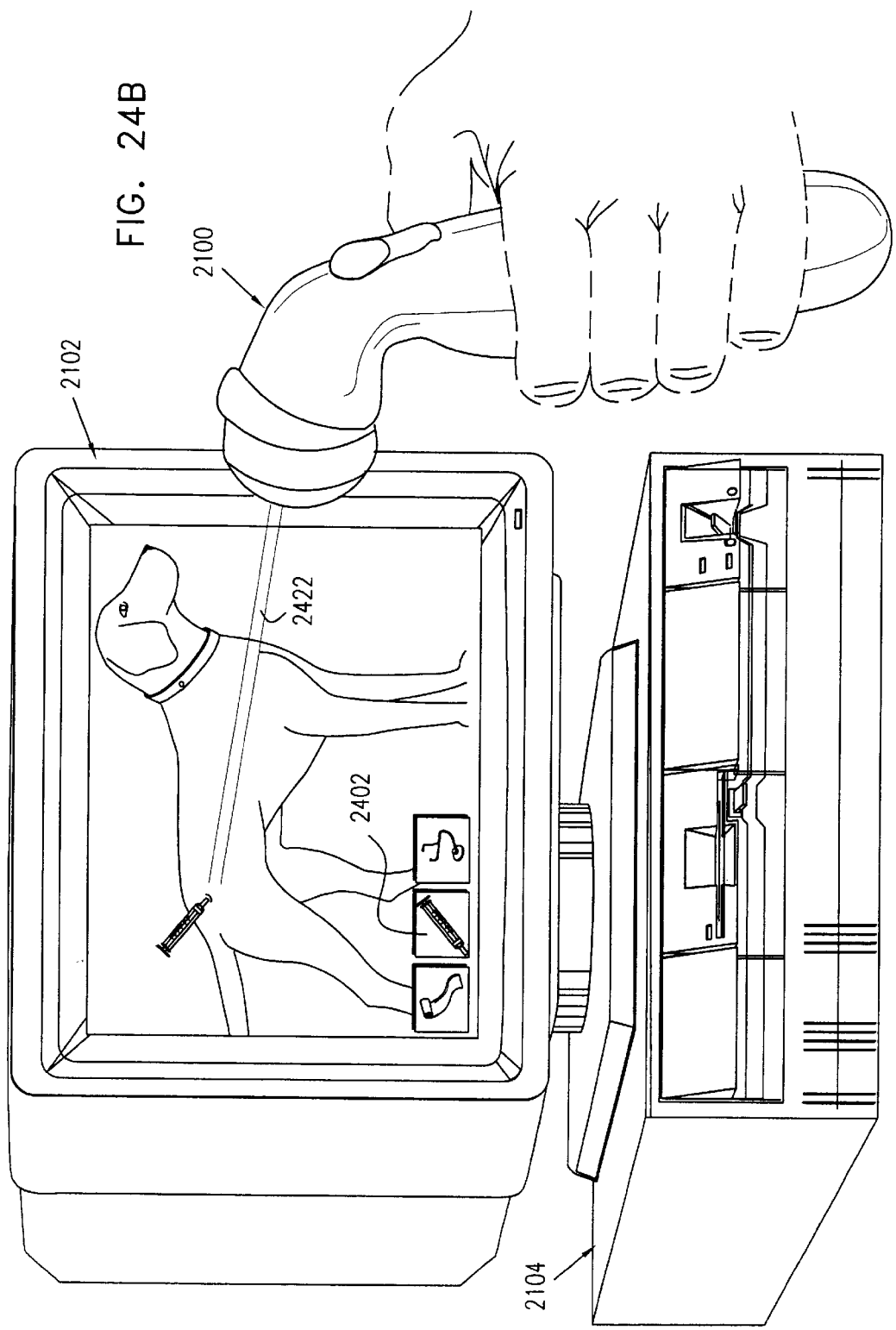

Reference is now made to FIGS. 24A, 24B and 24C, which are each a pictorial illustration of the interactive play system of FIG. 21 being used for a different functionality of a veterinary function, indicated graphically in FIG. 21 at reference numeral 2118. As seen in FIGS. 24A, 24B and 24C, the medical instrument functions as a veterinary instrument and is shown in operative engagement with an animal.

FIG. 24A shows a stethoscope veterinary diagnosis functionality, which is actuated by pointing the medical instrument tool 2100 at an icon 2400. FIG. 24B shows an injection veterinary treatment functionality, which is actuated by pointing the medical instrument tool 2100 at an icon 2402. FIG. 24C shows a bandaging veterinary treatment functionality which is actuated by pointing the medical instrument tool 2100 at an icon 2404.

It is a particular feature of a preferred embodiment of the present invention that the tool 2100 performs veterinary functions on an animal when it is pointed at the animal and receives an optical input therefrom, as indicated by ray 2422.

It is also a particular feature of a preferred embodiment of the present invention that the tool 2100 may display force feedback in accordance with its function and functionality. This force feedback may be in the form of vibrations or other types of forces which represent the function and functionality currently being carried out by the tool.

Figure 25:
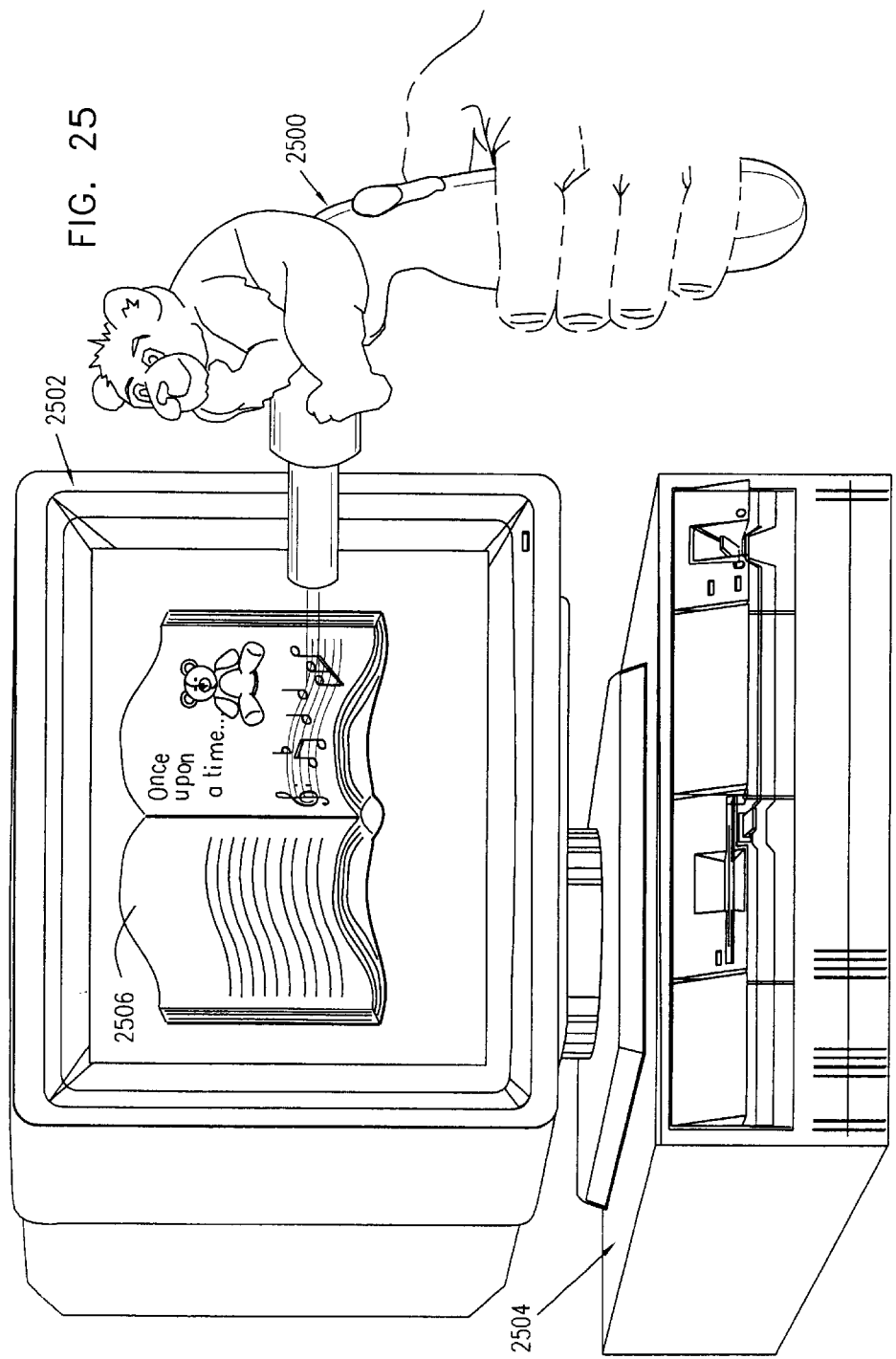
FIG. 25 is a pictorial illustration of an opening screen provided by an interactive play system constructed and operative in accordance with still a further preferred embodiment of the present invention.

Reference is now made to FIG. 25, which is a pictorial illustration of an opening screen provided by an interactive play system constructed and operative in accordance with another preferred embodiment of the present invention. As seen in FIG. 25, the interactive play system comprises a multifunctional and multifunctionality fanciful-shaped tool generally indicated by reference numeral 2500. Tool 2500 operates interactively with a display screen 2502, which is typically connected with a computer 2504, such as a personal computer, or alternatively a game computer or a computer incorporated within a television receiver.

In the illustrated embodiment of FIG. 25, the fanciful-shaped tool 2500 has a function control facility, which is determined by pointing tool 2500 at a selected location on screen 2502. In this embodiment, although particular functionalities are not shown, they may be provided for each function and may be actuated by any of the techniques described hereinabove.

In the embodiment of FIG. 25, a book environment is shown on display screen 2502. It is appreciated that depending on the function and functionality and the choice of the play designer, the fanciful-shaped tool may or may not be pictured on the screen.

It is a particular feature of a preferred embodiment of the present invention that the fanciful-shaped tool 2500 employs information displayed on a book 2506 shown on display screen 2502 and performs functions, such as reading, single and animation, based on that information.

Figure 26:
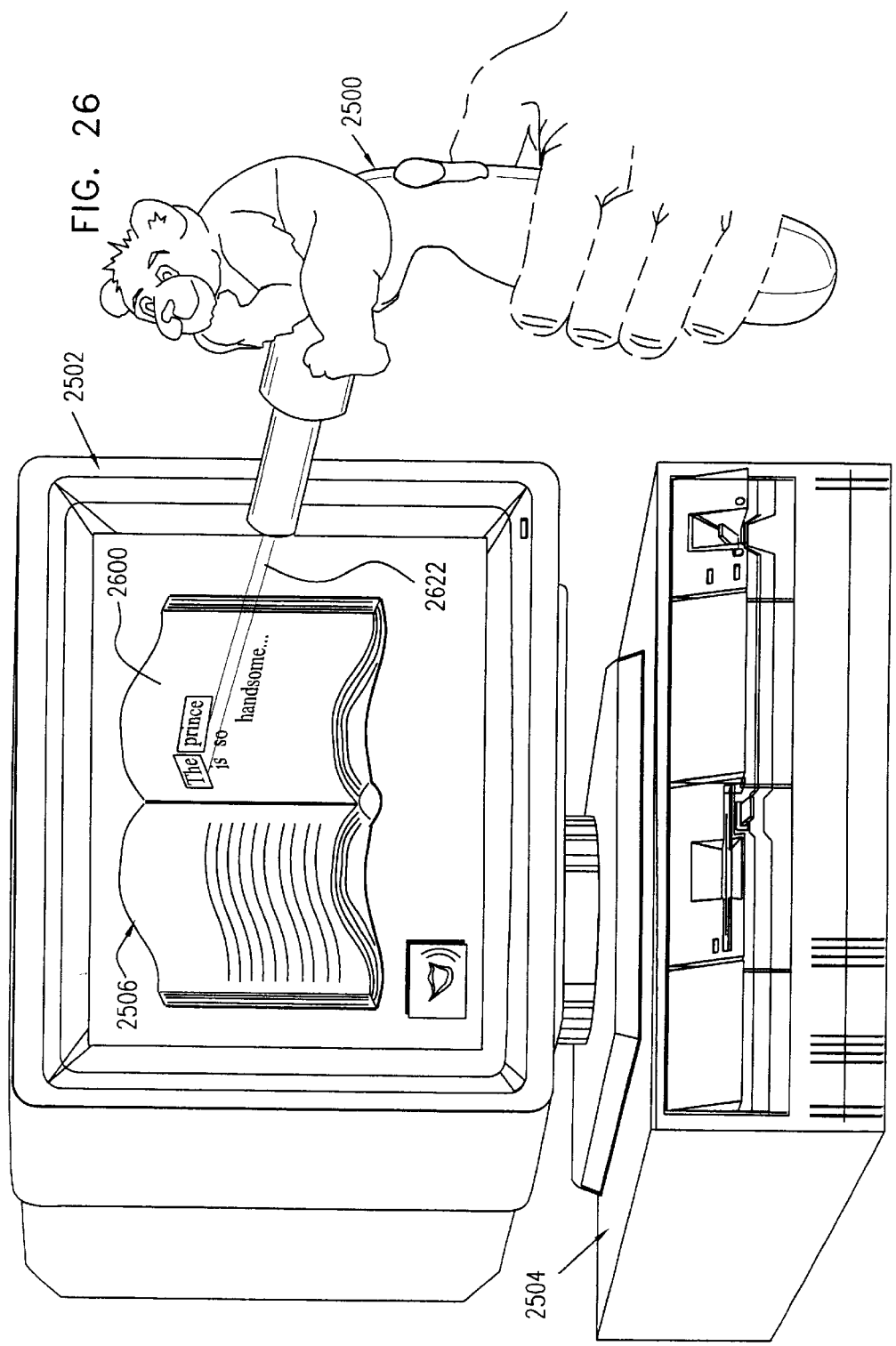
FIG. 26 is a pictorial illustration of the interactive play system of FIG. 25 being used for a text reading function.

Reference is now made to FIG. 26, which is a pictorial illustration of the interactive play system of FIG. 25 being used for storytelling. As seen in FIG. 26, the fanciful-shaped tool functions as a reader and is shown in operative reading engagement with a page 2600 of book 2506.

It is a particular feature of a preferred embodiment of the present invention that the fanciful-shaped tool 2500 reads information on the book 2506 when it is pointed at the information and receives an optical input therefrom, as indicated by ray 2622.

Figure 27:
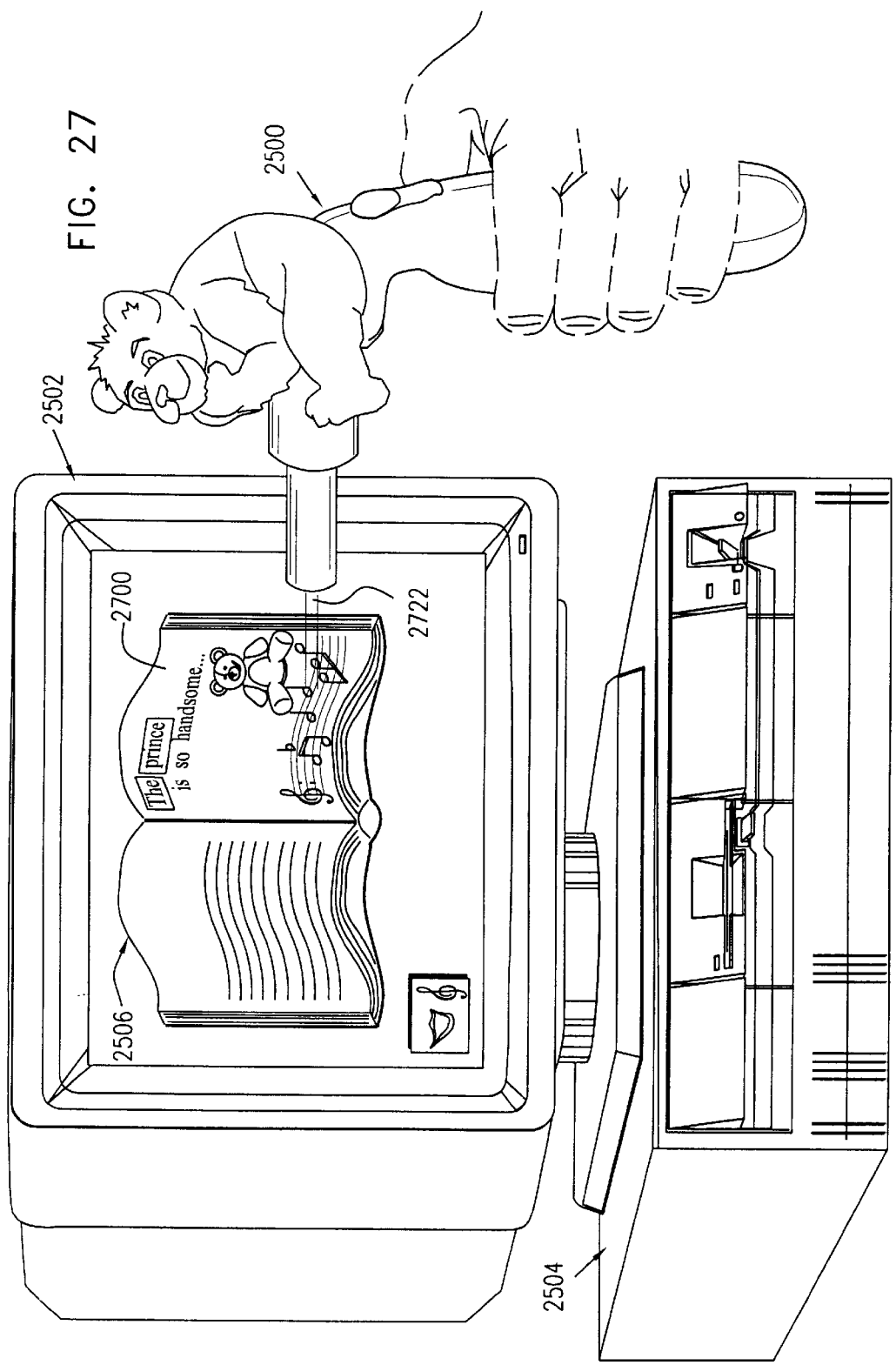
FIG. 27 is a pictorial illustration of the interactive play system of FIG. 25 being used for a singing function.

Reference is now made to FIG. 27, which is a pictorial illustration of the interactive play system of FIG. 25 being used for singing. As seen in FIG. 27, the fanciful-shaped tool functions as a singer and is shown in operative singing engagement with a song bearing 2700 of book 2506.

It is a particular feature of a preferred embodiment of the present invention that the fanciful-shaped tool 2500 sings a song in the book 2506 when it is pointed at the song and receives an optical input therefrom, as indicated by ray 2722.

Figure 28:
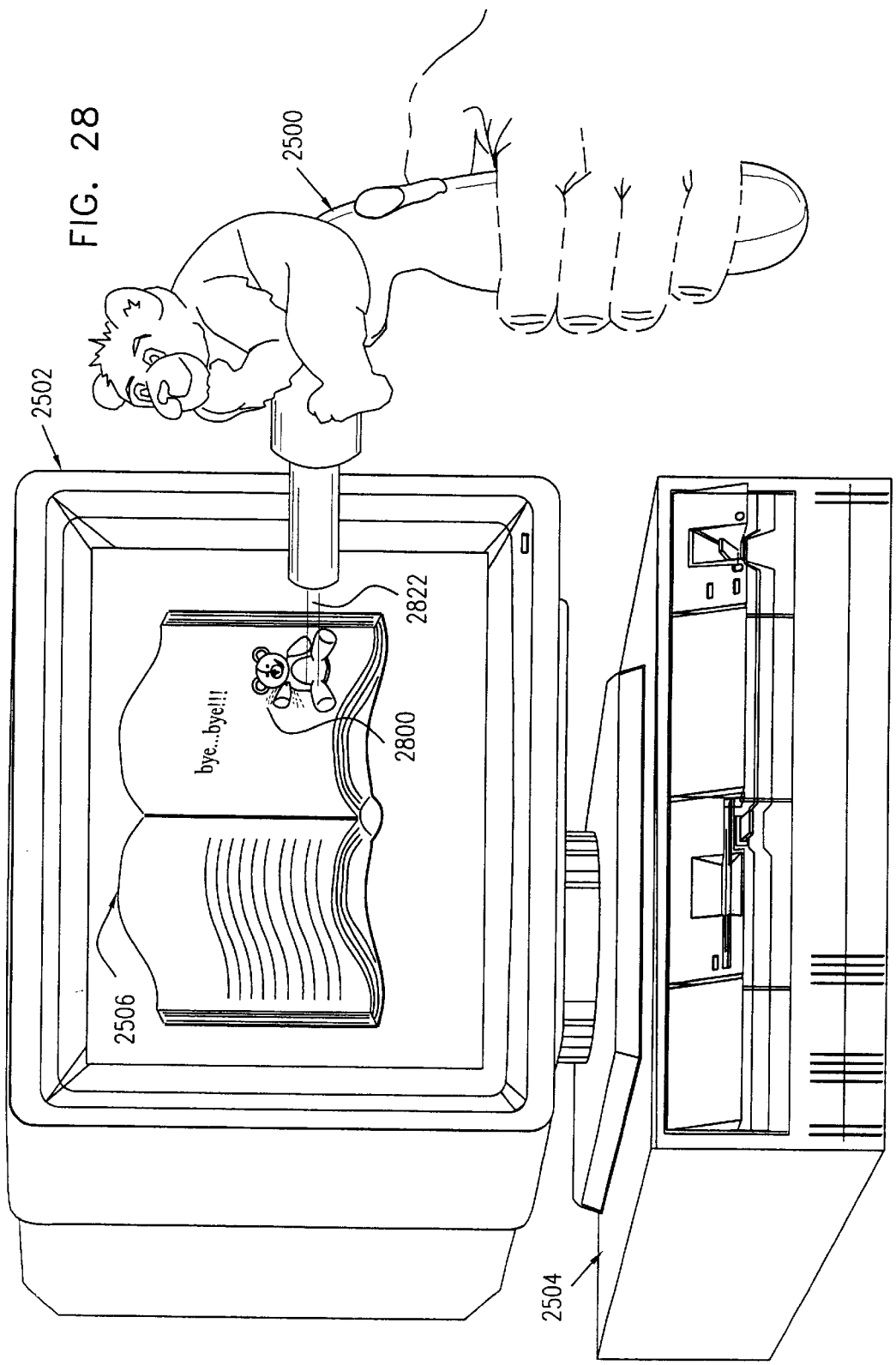
FIG. 28 is a pictorial illustration of the interactive play system of FIG. 25 being used for an animating function.

Reference is now made to FIG. 28, which is a pictorial illustration of the interactive play system of FIG. 25 being used for animation. As seen in FIG. 28, the fanciful-shaped tool functions as a animator and is shown in operative animating engagement with a FIG. 2800 of book 2506.

It is a particular feature of a preferred embodiment of the present invention that the fanciful-shaped tool 2500 animates a FIG. 2800 in the book 2506 when it is pointed at the figure and receives an optical-input therefrom, as indicated by ray 2822.

Figure 29:
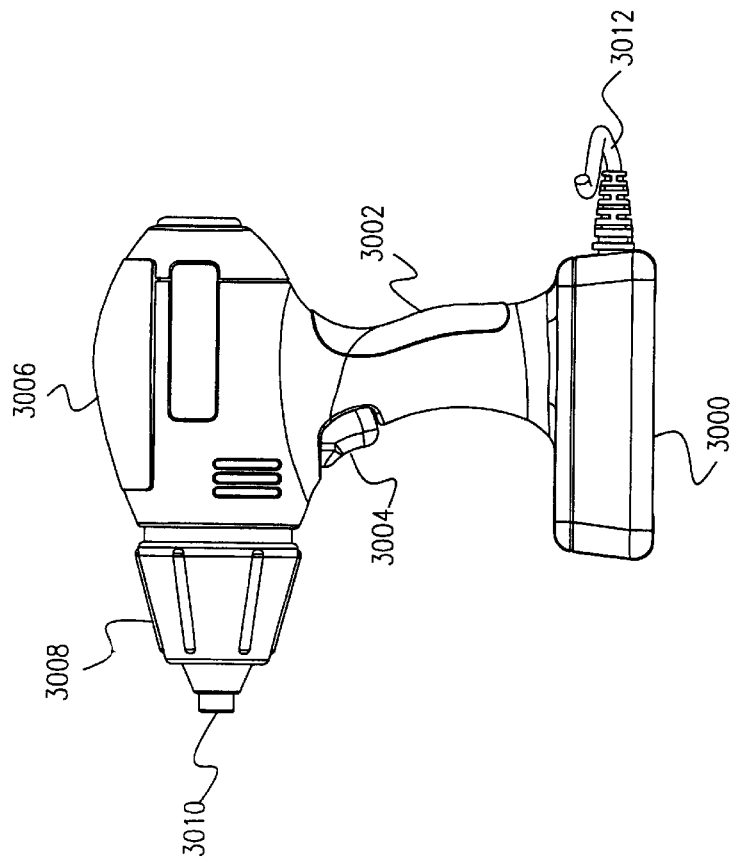
FIG. 29 is a side view illustration of a fanciful power tool useful in the interactive play system of FIGS. 1–28.
Figure 30:
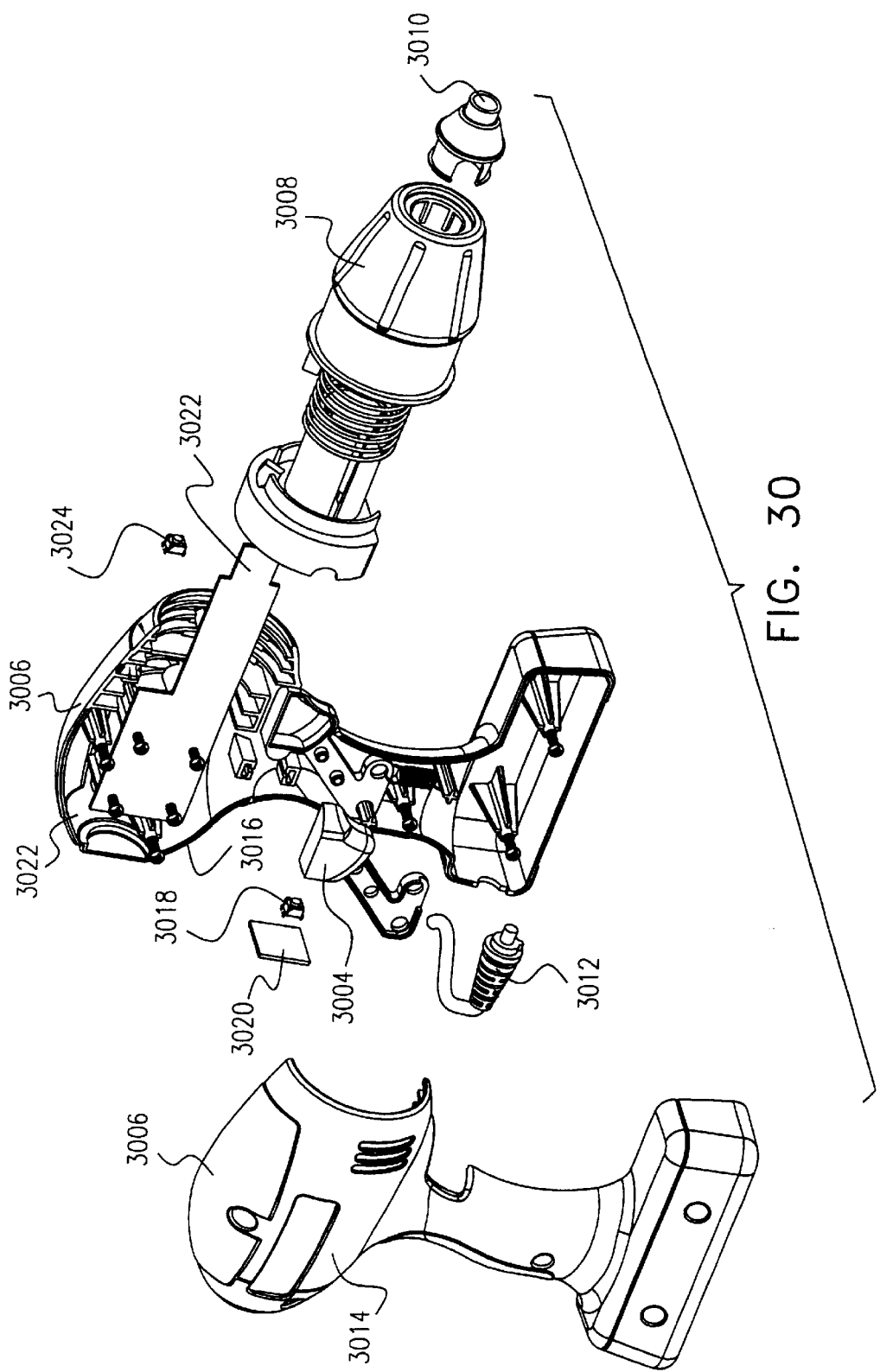
FIG. 30 is an exploded view of the fanciful power tool of FIG. 29.

Reference is now made to FIGS. 29 and 30, which illustrate a fanciful power tool useful in the interactive play system of FIGS. 1–28. The power tool of FIGS. 29 and 30 comprises a base 3000 onto which is preferably integrally formed a handle portion 3002. A user-actuable trigger 3004 is preferably mounted onto the handle portion 3002.

Integrally formed with handle portion 3002 there is provided a tool body portion 3006, here shown in the form of a fanciful power tool, which includes a chuck portion 3008, which is selectably positionable, as by rotation, with respect to tool body portion 3006 and whose position may be employed for function and/or functionality selection.

Extending from body portion 3006, forwardly of chuck portion 3008 is a light receiving portion 3010 including a light sensor. An electrical cable 3012, provides electrical signal and power connections between the tool and associated VGA and Game-Port connections of a personal computer.

As seen in FIG. 30, the tool is typically formed of a pair of injection molded housing portions 3014 and 3016, which are joined together to define the base 3000, the handle portion 3002, and the body portion 3006. Disposed within the joined housing portions 3014 and 3016, in addition to trigger 3004 is an electrical switch 3018, which is actuated by trigger 3004 and which is coupled, by cabling, (not shown) to electrical circuitry (not shown) on circuit boards 3020 and 3022.

A chuck position actuated switch 3024 is also provided and coupled, by cabling, (not shown) to electrical circuitry (not shown) on circuit boards 3020 and 3022.

Figure 31:
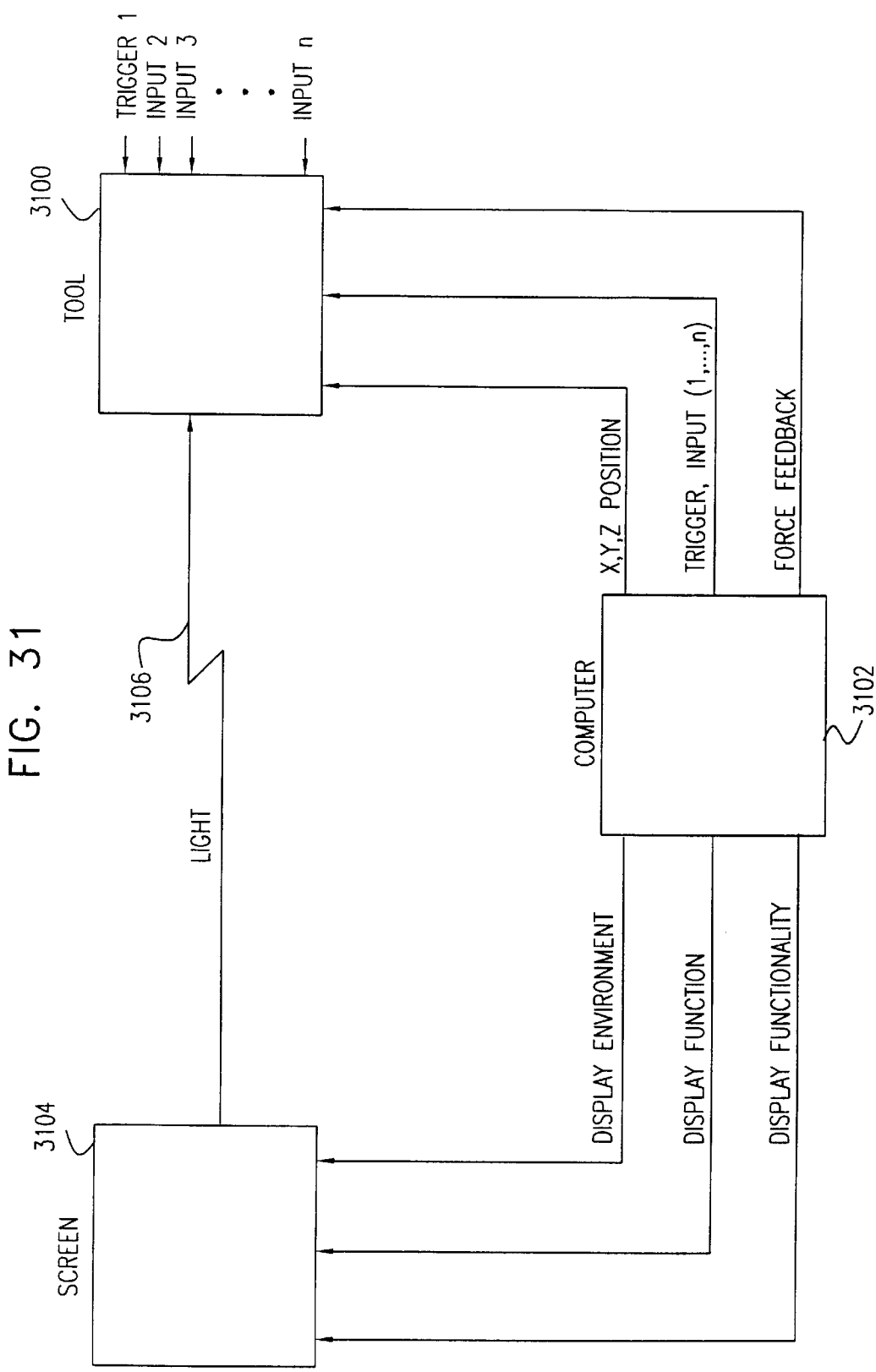
FIG. 31 is a simplified functional block diagram illustration of the system of FIGS. 1–30.

Reference is now made to FIG. 31, which is a simplified functional block diagram of the system of FIGS. 1–30. As seen in FIG. 31, the system comprises, in general terms a tool 3100, a computer with resident software 3102 and a display screen 3104. The tool may receive various user inputs. In the example of FIGS. 29 and 30, these may include a trigger actuation input from trigger 3004 and a chuck position input from chuck 3008. In other embodiments of the invention, such as those described hereinabove, other types of inputs may be received by the tool, such as, for example, by the addition of accessories thereto or relative positioning of portions thereof.

The tool also senses its position relative to the display screen 3104, this position sensing is preferably carried out using light pen techniques, such as those described in PCT Published Application WO 99/59125 of the present applicants and in copending U.S. patent application Ser. No. 09/234,139, filed Jan. 19, 1999, the disclosures of which are hereby incorporated by reference. Briefly stated, the tool 3100 senses a beam of light 3106 received from the screen 3104 and utilizes the beam of light, preferably together with other information received from computer 3102 to determine its position.

The tool 3100 provides outputs to the computer 3102 which typically include the position of the tool relative to the screen 3104 and the various user inputs received by the tool. The tool receives from the computer 3102 force feedback signals and may, in certain embodiments also receive power and/or display timing signals.

The computer 3102 provides to the screen 3104 graphic information for generating a play environment on the screen, graphic information for showing the selected function of the tool 3100 in the play environment and graphic information for showing the elected functionality of the tool 3100 in the play environment.

It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

What is claimed is:

1. An interactive play system comprising:
    a computer including a display and an operating play software; and
    a multifunctional physical tool capable of performing a plurality of functionalities operative in conjunction with said computer and receiving at least an optical input from said display, said multifunctional physical tool including a functionality selection portion that allows a user to select a functionality as one of various different types of tool,
    wherein following the user selection type of tool, the display displays a plurality of functional selections according to the selected type of tool for the user to further select a functional selection from the displayed functional selections.

2. An interactive play system according to claim 1, wherein said multifunctional physical tool is operative, when appropriately positioned relative to objects appearing on said display and actuated by the user, to effect simulated work on said objects, said simulated work being selected by user manipulation of said multifunctional physical tool.

3. An interactive play system according to claim 2, wherein said multifunctional physical tool is manipulable for said functional selection by replacement of at least one portion of said multifunctional physical tool.

4. An interactive play system according to claim 3, wherein said multifunctional physical tool is manipulable for said functional selection by user engagement with a selected portion of said multifunctional physical tool.

5. An interactive play system according to claim 4, wherein the selection of said at least one type of tool of said multifunctional physical tool is carried out by said operating play software.

6. An interactive play system according to claim 3, wherein said multifunctional physical tool is manipulable for said functional selection by pointing the multifunctional physical tool at an icon on said display.

7. An interactive play system according to claim 6, wherein the selection of said at least one type of tool of said multifunctional physical tool is carried out by said operating play software.

8. An interactive play system according to claim 3, wherein the selection of said at least one type of tool of said multifunctional physical tool is carried out by said operating play software.

9. An interactive play system according to claim 2, wherein said multifunctional physical tool is manipulable for said functional selection by user engagement with a selected portion of said multifunctional physical tool.

10. An interactive play system according to claim 9, wherein the selection of said at least one type of tool of said multifunctional physical tool is carried out by said operating play software.

11. An interactive play system according to claim 2, wherein said multifunctional physical tool is manipulable for said functional selection by pointing the multifunctional physical tool at an icon on said display.

12. An interactive play system according to claim 11, wherein the selection of said at least one type of tool of said multifunctional physical tool is carried out by said operating play software.

13. An interactive play system according to claim 2, wherein the selection of said at least one type of tool of said multifunctional physical tool is carried out by said operating play software.

14. An interactive play system according to claim 1, wherein said multifunctional physical tool is manipulable for said functional selection by replacement of at least one portion of said multifunctional physical tool.

15. An interactive play system according to claim 14, wherein said multifunctional physical tool is manipulable for said functional selection by user engagement with a selected portion of said multifunctional physical tool.

16. An interactive play system according to claim 15, wherein the selection of said at least one type of tool of said multifunctional physical tool is carried out by said operating play software.

17. An interactive play system according to claim 14, wherein said multifunctional physical tool is manipulable for said functional selection by pointing the multifunctional physical tool at an icon on said display.

18. An interactive pay system according to claim 17, wherein the selection of said at least one type of tool of said multifunctional physical tool is carried out by said operating play software.

19. An interactive play system according to claim 14, wherein the selection of said at least one type of tool of said multifunctional physical tool is carried out by said operating play software.

20. An interactive play system according to claim 1, wherein said multifunctional physical tool is manipulable for said functional selection by user engagement with a selected portion of said multifunctional physical tool.

21. An interactive play system according to claim 20, wherein selection of said at least one type of tool of said multifunctional physical tool is carried out by said operating play software.

22. An interactive play system according to claim 1, wherein said multifunctional physical tool is manipulable for said functional selection by pointing the multifunctional physical tool at an icon on said display.

23. An interactive play system according to claim 22, wherein the selection of said at least one type of tool of said multifunctional physical tool is carried out by said operating play software.

24. An interactive play system according to claim 1, wherein the selection of said at least one type of tool of said multifunctional physical tool is carried out by said operating play software.

25. An interactive play system according to claim 1, wherein said display is a CRT display.

26. An interactive play system according to claim 1, wherein said display is a liquid crystal display.

27. An interactive play system according to claim 1, wherein said multifunctional physical tool comprises a light pen.

28. An interactive play system according to claim 1, wherein said multifunctional physical tool provides force feedback.

29. An interactive play system according to claim 1, wherein said multifunctional physical tool comprises a light signal receiver which receives a light beam from said display and provides an indication of a position of the multifunctional physical tool relative to said display.

30. An interactive play system according to claim 1, wherein said type of tool is selected from a sports tool, a magic tool, a repair tool, a construction tool, a medical tool and a personal care tool.

31. An interactive play method comprising:
providing a computer including a display and an operating play software; and
providing a multifunctional and multifunctionality physical tool capable of performing a plurality of functionalities operative in conjunction with said computer and receiving at least an optical input from said display, said multifunctional and multifunctionality physical tool including a functionality selection portion that allows a user to select a functionality as one of various different types of tools,
wherein following the user selection type of tool, the display displays a plurality of functional selections according to the selected type of tool for the user to further select a functional selection from the displayed functional selections.

32. An interactive play method according to claim 31, wherein said multifunctional and multifunctionality physical tool is operative, when appropriately positioned relative to objects appearing on said display and actuated by the user, to effect simulated work on said objects, said simulated work being selected by user manipulation of said multifunctional and multifunctionality physical tool.

33. An interactive play method according to claim 32, wherein said multifunctional and multifunctionality physical tool is manipulable for said functional selection by replacement of at least one portion of said multifunctional and multifunctionality physical tool.

34. An interactive play method according to claim 33, wherein said multifunctional and multifunctionality physical tool is manipulable for said functional selection by user engagement with a selected portion of said multifunctional and multifunctionality physical tool.

35. An interactive play method according to claim 34, wherein the selection of said at least one type of tool of said multifunctional and multifunctionality physical tool is carried out by said operating play software.

36. An interactive play method according to claim 33, wherein said multifunctional and multifunctionality physical tool is manipulable for said functional selection by pointing the multifunctional and multifunctionality physical tool at an icon on said display.

37. An interactive play method according to claim 36, wherein the selection of said at least one type of tool of said multifunctional and multifunctionality physical tool is carried out by said operating play software.

38. An interactive play method according to claim 33, wherein the selection of said at least one type of tool of said multifunctional and multifunctionality physical tool is carried out by said operating play software.

39. An interactive play method according to claim 32, wherein said multifunctional and multifunctionality physical tool is manipulable for said functional selection by user engagement with a selected portion of said multifunctional and multifunctionality physical tool.

40. An interactive play method according to claim 39, wherein the selection of said at least one type of tool of said multifunctional and multifunctionality physical tool is carried out by said operating play software.

41. An interactive play method according to claim 32, wherein said multifunctional and multifunctionality physical tool is manipulable for said functional selection by pointing the multifunctional and multifunctionality physical tool at an icon on said display.

42. An interactive play method according to claim 41, wherein the selection of said at least one type of tool of said multifunctional and multifunctionality physical tool is carried out by said operating play software.

43. An interactive play method according to claim 32, wherein the selection of said at least one type of tool of said multifunctional and multifunctionality physical tool is carried out by said operating play software.

44. An interactive play method according to claim 31, wherein said multifunctional and multifunctionality physical tool is manipulable for said functional selection by replacement of at least one portion of said multifunctional and multifunctionality physical tool.

45. An interactive play method according to claim 44, wherein said multifunctional and multifunctionality physical tool is manipulable for said functional selection by user engagement with a selected portion of said multifunctional and multifunctionality physical tool.

46. An interactive play method according to claim 45, wherein the selection said at least one type of tool of said multifunctional and multifunctionality physical tool is carried out by said operating play software.

47. An interactive play method according to claim 44, wherein said multifunctional and multifunctionality physical tool is manipulable for said functional selection by pointing the multifunctional and multifunctionality physical tool at an icon on said display.

48. An interactive play method according to claim 47, wherein the selection of said at least one type of tool of said multifunctional and multifunctionality physical tool is carried out by said operating play software.

49. An interactive play method according to claim 44, wherein the selection of said at least one type of tool of said multifunctional and multifunctionality physical tool is carried out by said operating play software.

50. An interactive play method according to claim 31, wherein said multifunctional and multifunctionality physical tool is manipulable for said functional selection by user engagement with a selected portion of said multifunctional and multifunctionality physical tool.

51. An interactive play method according to claim 50, wherein the selection of said at least one type of tool of said multifunctional and multifunctionality physical tool is carried out by said operating play software.

52. An interactive play method according to claim 31, wherein said multifunctional and multifunctionality physical tool is manipulable for said functional selection by pointing the multifunctional and multifunctionality physical tool at an icon on said display.

53. An interactive play method according to claim 52, wherein the selection of said at least one type of tool of said multifunctional and multifunctionality physical tool is carried out by said operating play software.

54. An interactive play method according to claim 31, wherein the selection of said at least one type of tool of said multifunctional and multifunctionality physical tool is carried out by said operating play software.

55. An interactive play method according to claim 31, wherein said display is a CRT display.

56. An interactive play method according to claim 31, wherein said display is a liquid crystal display.

57. An interactive play method according to claim 31, wherein said multifunctional and multifunctionality physical tool comprises a light pen.

58. An interactive play method according to claim 31, wherein said multifunctional and multifunctionality physical tool provides force feedback.

59. An interactive play method according to claim 31, wherein said multifunctional and multifunctionality physical tool comprises a light signal receiver which receives a light beam from said display and provides an indication of a position of the tool relative to said display.

60. An interactive play method according to claim 31, wherein said type of tool is selected from a sports tool, a magic tool, a repair tool, a construction tool, a medical tool and a personal care tool.

* * * * *